US006614165B1

(12) United States Patent
Aoki et al.

(10) Patent No.: US 6,614,165 B1
(45) Date of Patent: Sep. 2, 2003

(54) PHOSPHOR MATERIAL FOR PLASMA DISPLAY PANEL, A PLASMA DISPLAY PANEL AND A METHOD FOR PRODUCING A PLASMA DISPLAY PANEL

(75) Inventors: Masaki Aoki, Minoo (JP); Hiroyuki Kado, Osaka (JP); Shigeo Suzuki, Hirakata (JP); Hiroyuki Kawamura, Katano (JP); Mitsuhiro Ohtani, Sakai (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/530,892

(22) PCT Filed: Nov. 5, 1998

(86) PCT No.: PCT/JP98/04976

§ 371 (c)(1),
(2), (4) Date: May 5, 2000

(87) PCT Pub. No.: WO99/24999

PCT Pub. Date: May 20, 1999

(30) Foreign Application Priority Data

| Nov. 6, 1997 | (JP) | 9-304184 |
| Dec. 5, 1997 | (JP) | 9-335353 |
| Dec. 17, 1997 | (JP) | 9-347465 |
| Jan. 5, 1998 | (JP) | 10-000140 |
| Mar. 4, 1998 | (JP) | 10-051722 |
| May 15, 1998 | (JP) | 10-132983 |
| Jul. 8, 1998 | (JP) | 10-193000 |

(51) Int. Cl.$^7$ ............................. H01J 1/62; H01J 63/04; H01J 17/49
(52) U.S. Cl. .................. 313/485; 313/486; 313/487; 313/496; 313/482; 250/301.4 R
(58) Field of Search .................. 252/301.4 R; 313/485, 313/486, 487, 582

(56) References Cited

U.S. PATENT DOCUMENTS

| 3,937,998 A | * | 2/1976 | Verstegen et al. ........... 313/487 |
| 4,441,049 A | * | 4/1984 | Verstegen et al. ..... 252/301.4 R |
| 5,611,959 A | * | 3/1997 | Kijima et al. .......... 252/301.4 R |
| 6,096,243 A | * | 8/2000 | Oshio et al. .......... 252/301.4 R |
| 6,280,655 B1 | * | 8/2001 | Xu et al. .............. 252/301.4 R |
| 2002/0025901 A1 | * | 2/2002 | Ono et al. ................... 501/119 |

FOREIGN PATENT DOCUMENTS

| EP | 0 766 285 | 4/1997 |
| JP | 47-39840 | 10/1972 |

(List continued on next page.)

OTHER PUBLICATIONS

Patent Abstracts of Japan vol. 2002, No. 09, Sep. 4, 2002 & Japan 2002 138277 A, May 14, 2002, abstract.

(List continued on next page.)

*Primary Examiner*—Ashok Patel
*Assistant Examiner*—Mariceli Santiago
(74) *Attorney, Agent, or Firm*—Wenderoth, Lind & Ponack, L.L.P.

(57) ABSTRACT

The plasma display panel of the present invention has, for achieving high luminance and high reliability, a plurality of discharge spaces formed between a front panel and a back panel that are disposed to oppose each other, and phosphor layers, formed in the discharge spaces, each including phosphor particles of one of blue, red and green colors, wherein the phosphor particles of at least one of blue, red and green colors included in the phosphor layer are flake-like particles.

15 Claims, 18 Drawing Sheets

FOREIGN PATENT DOCUMENTS

| | | |
|---|---|---|
| JP | 49-99609 | 9/1974 |
| JP | 52-144385 | 12/1977 |
| JP | 59-102979 | 6/1984 |
| JP | 61-258891 | 11/1986 |
| JP | 62-12093 | 1/1987 |
| JP | 10-130638 | 5/1988 |
| JP | 2-223132 | 9/1990 |
| JP | 3-184253 | 8/1991 |
| JP | 3-221583 | 9/1991 |
| JP | 5-234520 | 10/1993 |
| JP | 6-150830 | 5/1994 |
| JP | 7-21916 | 1/1995 |
| JP | 7-245062 | 9/1995 |
| JP | 8-115673 | 5/1996 |
| JP | 8-134443 | 5/1996 |
| JP | 10-115673 | 5/1996 |
| JP | 8-162019 | 6/1996 |
| JP | 8-269448 | 10/1996 |
| JP | 8-287835 | 11/1996 |
| JP | 9-40945 | 2/1997 |
| JP | 9-59617 | 3/1997 |
| JP | 9-63482 | 3/1997 |
| JP | 9-151372 | 6/1997 |
| JP | 9-157644 | 6/1997 |
| JP | 10-154466 | 6/1998 |

OTHER PUBLICATIONS

Database WPI Section Ch, Week 199719 Derwent Publications Ltd., London, Great Britain, AN 1997–209621 XP 002214815 & Japan 09 059617 A, Mar. 4, 1997, abstract.

Database WPI Section Ch, Week 199628 Derwent Publications Ltd., London, Great Britain, AN 1996–274573 XP 002214816 & Japan 08 115673 A, May 7, 1996, abstract.

Database WPI Section Ch, Week 199807 Derwent Publications Ltd., London, Great Britain, AN 1998–072009 XP 002214817 & Japan 09 310067 A, Dec. 2, 1997, abstract.

Patent Abstracts of Japan vol. 1996, No. 10, Oct. 31, 1996 & Japan 08 162019 A, Jun. 21, 1996, abstract.

Functional Materials, vol. 16, No. 2, Feb. 1996, pp. 6–7.

Japanese Patent Laid–Open Publication No. 5–342991 with an English Abstract.

Nobuhiro Iwase, "Phosphor for Plasma Display Panel", Electronics Packaging Technology, vol. 13, No. 7, Jul. 1997, pp. 23–26.

Shigeo Mikoshiba, "PDP that has reached this far: Current Status and Foreseeing the Development in the Future", Flat–Panel Display, Part 5–1, 1997, pp. 198–199.

Keiji Ichinomiya et al., "Phosphors for Plasma Display", Transaction of the $263^{rd}$ Conference of Phosphor Engineering Association, pp. 9–13.

Keiji Ichinomiya et al., "Phosphors for Plasma Display Panels", Optronics, No. 6, 1997, pp. 149–155.

Yukio Murakami, "Color Reproducibility of Plasma Display", Optical Technology Contact, vol. 34, No. 1, 1996, pp. 23–24.

Nobu Kameya, "Phophor for PDP as observed in the PDP Technical Symposium", monthly LCD Intelligence, Sep., 1996, p. 58–59.

Phosphor Handbook, Ohm publishing Co., pp. 219–225.

National Technical Report vol. 43, No. 2, Apr. 1997, p. 70.

\* cited by examiner

PHOSPHOR MATERIAL FOR PLASMA DISPLAY PANEL, A PLASMA DISPLAY PANEL AND A METHOD FOR PRODUCING A PLASMA DISPLAY PANEL

TECHNICAL FIELD

The present invention relates to a phosphor material and a phosphor material powder that emit light with a high efficiency, a plasma display panel used in display devices and a method of producing the same.

BACKGROUND ART

The CRT has been commonly used as the display device for television sets. The CRT, although better in resolution and picture quality than the plasma display panel and the liquid crystal display, is not suited to large screens having diagonal size of 40 inches or more for the reason of depth size and weight. The liquid crystal display is limited in the screen size and the viewing angle, in spite of such advantages as the low power consumption and low drive voltage.

The plasma display panel, on the other hand, can be used in a large-screen display because there is no problem of depth size and weight, and 40-inch class products using the plasma display panel have already been developed (for example, see Functional Materials, February issue, 1996, Vol. 16, pp. 2, 7).

Constitution of a plasma display panel of the prior art will be described below with reference to the accompanying drawing. FIG. 23 is a sectional view showing schematic constitution of the AC type plasma display panel.

In FIG. 23, numeral 41 denotes a front cover plate (front glass substrate) with a display electrode 42 formed on the front glass substrate 41. The front cover plate 41 with the display electrode 42 formed thereon is also covered by a dielectric glass layer 43 and a protective layer 44 made of magnesium oxide (MgO) (see, for example, Unexamined Patent Publication (Kokai) No. 5-342991).

Numeral 45 denotes a back plate (back glass substrate), with an address electrode 46, barrier rib 47 and spherical phosphor layer 48 being provided on the back glass substrate 45, and numeral 49 denotes an electric discharge space filled with a discharge gas. The phosphor layer comprises phosphor layers of three colors, red, green and blue, disposed in this order for color display. The phosphor layers of different colors are excited to emit light by ultraviolet rays of short wavelength (147 nm) emitted by electric discharge.

As the phosphor layer 48 of the plasma display panel, (YGd)BO$_3$: Eu is used for red, BaMgAl$_{10}$O$_{17}$:Eu is used for blue and Zn$_2$SiO$_4$:Mn is used for green today (for example, Electronics Packaging Technology; July, 1997; Vol. 113, No. 7, pp. 23–26).

The plasma display panels of 40- to 42-inch class described above that are produced at present have luminance of 150 to 250 cd/m$^2$ at the pixel level of NTSC (640×480 pixels, cell pitch 0.43 mm×1.29 mm, area of one cell 0.55 mm$_2$) (for example, refer to Functional Materials, February issue, 1996, Vol. 16, pp. 2, 7). Recently, plasma display panels of 40- to 42-inch class having luminance of 250 to 450 cd/m$^2$ at the pixel level of NTSC have also been reported (for example, see Flat Panel Display, 1997, Part 5-1, pp. 198–199). The conventional CRT technology is said, by contrast, to be capable of achieving a luminance of about 500 cd/m$^2$.

The high-definition television of full specification that is at the focus of attention recently requires 1920×1125 pixels, resulting in a resolution as fine as cell pitch of 0.15 mm×0.48 mm and cell area of 0.072 mm$^2$ in the case of 42-inch class. When a high-definition television set is produced with 42-inch plasma display panel, screen area per one pixel become as small as ⅐ to ⅛ that of the NTSC display. As a result, when the high-definition television set is produced with the 42-inch plasma display panel of the conventional cell configuration, emission intensity of the display panel becomes ⅐ to ⅛ that of the NTSC display, namely 0.15 to 0.171 m/W.

Thus luminance of a high-definition television produced with the 42-inch plasma display panel is predicted to be as low as 30 to 40 cd/m$^2$, given the same phosphor, gas composition and gas pressure, making it desirable to improve the luminance.

As described above, when a television set of such a small pixel size as in the high-definition television is produced using the plasma display panel with similar brightness, luminance must be greatly increased.

There are also such problems as described below with regard to phosphor material.

The first problem is that phosphor materials of different colors have different levels of luminance.

While several types of phosphor have been investigated for each of red, green and blue light in the plasma display panel, green phosphor has the highest luminance and blue phosphor has the lowest luminance in any of these types.

For example, when YBO$_3$:Eu is used as the red phosphor, Zn$_2$SiO$_4$:Mn is used as the green phosphor and BaMgAl$_{10}$O$_{17}$:Eu is used as the blue phosphor (Eu content 0.15), luminance ratio of the colors of red, green and blue is about 2:3:1, with a low color temperature of about 5000 degrees.

Accordingly in the plasma display panel of the prior art, color temperature is increased by electronically suppressing the light emission by the green phosphor that has high luminance, thereby to improve the white balance. However, this configuration leads to lower brightness of the plasma display panel as a whole due to the reduction in the emission of light from the phosphor having high luminance.

This indicates that increasing the luminance of blue light is very effective in solving the problem, since color temperature can be increased without reducing the luminance of green and red light by increasing the luminance of blue light that is the lowest of the phosphors.

Second, phosphor layers of the plasma display panels of the prior art are formed by applying an ink that contains phosphor particles by a printing process or coating a photosensitive sheet that contains phosphor particles. In either of these processes, it is necessary to fire the panel at a temperature of around 500° C. after forming the phosphor layer, in order to remove an organic binder component included in the ink or the sheet. It is also necessary to fire the panel at a temperature of 400° C. or higher to have the front cover plate and the back plate bonded with each other.

In these firing processes, the phosphors used in the panel are subject to a certain extent of thermal change that results in degradation of luminance and/or chromaticity.

As described above, the plasma display panel has the problem of the thermal deterioration of the phosphor material in the firing process that are required for the production (for example, Transaction of the 263rd Conference of Phosphor Engineering Association, pp. 9–13, 1996; Optonics, 1997, No.6, pp. 149–155).

In the firing processes, the phosphors are subject to a certain extent of thermal change that results in degradation of luminance and/or chromaticity. $Ba_{(1-x)}MgAl_{10}O_{17}:EU_x$ used as the blue phosphor at present experiences particularly significant thermal deterioration.

The $Ba_{(1-x)}MgAl_{10}O_{17}:Eu_x$ used as the blue phosphor can easily be damaged by vacuum ultraviolet rays (wavelength 147 nm, 172 nm) that excite the plasma display panel, and the emission intensity decreases as the panel is operated longer, thus giving rise to a problem of service life.

As described above, the blue phosphor material of the plasma display panel has the problems of thermal deterioration of the phosphor material in the firing processes required for the producing and short service life.

There have been efforts being made to mitigate the thermal deterioration of the phosphor.

For example, the Optical Technology Contact, Vol. 34, No. 1 (1996) pp. 23–24 reports that the $BaMgAl_{10}O_{17}:Eu^{2+}$ that had been known as an excellent blue phosphor showed such problems as deterioration during operation of the panel and change in chromaticity, and that $BaMgAl_{10}O_{17}:Eu^{2+}$ was developed to solve such problems with an improvement achieved in mitigating the decrease in luminance caused by firing in the panel producing process.

As demands for high quality display increase, however, such technologies are required that prevents the deterioration of the luminance and of chromaticity of the phosphor layer and improve the emission intensity (luminance divided by the y value of chromaticity) in order to improve the luminance and picture quality of the plasma display panel.

DISCLOSURE OF THE INVENTION

First object of the present invention is to provide a phosphor material and a phosphor material powder of high luminance, particularly a phosphor material and a phosphor material powder that are suited to a plasma display panel and a method of producing the same.

Second object of the present invention is to provide a plasma display panel having high luminance and high reliability.

The first plasma display panel of the present invention has, for the purpose of achieving the first object described above, a plurality of discharge spaces formed between a front panel and a back panel that are disposed to oppose each other, and phosphor layers, formed in the discharge spaces, each including phosphor particles of one of blue, red and green colors, wherein the phosphor particles of at least one of blue, red and green colors included in the phosphor layer are flake-like particles.

Phosphors used in the plasma display panel of the prior art have generally made by firing for a long period of time at high temperatures (for example, 1200° C. though the firing temperature depends on the composition of the phosphor) at which crystals are likely to grow into spherical shape. As a result, the phosphor particles used in the plasma display panel of the prior art have been of near spherical shape having large diameters (about 5 to 10 µm). Such phosphor particles of near spherical shape have been advantageous in transmission type devices such as CRT and fluorescent lamp where visible light must be transmitted between the phosphor particles.

In the plasma display panel, however, since it is a reflection type panel in which fluorescence is generated by ultraviolet rays of short wavelengths (147 nm, 173 nm) emitted by electric discharge and the fluorescent light is emitted in the direction opposite to the incident direction of the ultraviolet rays, use of the phosphor particles of near spherical shape results in lower coverage ratio of the barrier ribs and the base of the barrier rib, thus making it impossible to make full use of the ultraviolet rays. Coverage ratio in this specification refers to an index that represents the proportion of the surface of the walls covered by the phosphor material or the phosphor particles to the total area of wall surface whereon the phosphor layer is formed. As the coverage ratio increases, higher proportion of the light incident on the phosphor layer is absorbed by the phosphor material and the phosphor particles.

When flaky phosphor particles, namely particles of thin and flat shape of which breadth is far greater than the thickness are used, as in the case of the first plasma display panel of the present invention, the barrier ribs and the base in the phosphor layer are covered by the phosphor particles with higher coverage ratio, which increases the proportion of ultraviolet rays absorbed in the phosphor layer. As a result, higher luminance than the prior art can be achieved in the first plasma display panel of the present invention. Also because ultraviolet rays having wavelength of 143 nm or 173 nm can penetrate only through the superficial portion of the phosphor layer exposed to the discharge space (to depth not greater than 0.1 µm) unlike electron beams used in the CRTs (refer to, for example, monthly "LCD Intelligence", September, 1996, pp. 58), the constitution of the present invention that increases the percentage of loading and coverage ratio of the phosphor layer with the phosphor particles is very effective in absorbing much of the ultraviolet rays in the superficial portion of the phosphor layer.

Also because the percentage of loading and coverage ratio of the phosphor layer with the phosphor particles can be increased in the first plasma display panel of the present invention, emission intensity of the phosphor layer can be increased. Moreover, since the phosphor particles themselves act as reflectors for visible light, increasing the percentage of loading by phosphor increases the luminance of reflection at the same time. This effect is made conspicuous when the flaky phosphor particles are used in the phosphor layers of every color.

In the first plasma display panel of the present invention, as described above, since the phosphor layers that include the flaky phosphor particles are formed, efficiency of absorbing ultraviolet rays in the phosphor layer can be increased and thereby increasing the luminance of the plasma display panel.

Such flaky phosphor particles as described above can be easily made changing the firing conditions, starting materials or atmosphere of firing when making the phosphor. Specifically, phosphor particles that have better crystallizability in the very superficial portion of the phosphor layer and a higher profile ratio (breadth/thickness) can be obtained by setting the firing temperature somewhat higher and performing the firing for a shorter period of time.

Blue and green phosphor particles can be relatively easily made in a shape of hexagonal flake because these substances have hexagonal system of crystalline structure (see, for example, Phosphor Handbook, Ohm Publishing Co., pp. 219, pp. 225). Red phosphor particles, however, have cubic system and are therefore difficult to make in flaky shape. However, it becomes relatively easy to make red phosphor particles of flaky shape by using yttrium hydroxide $(Y_2(OH)_3)$ as the starting material.

When the flake of the phosphor particle is too thin or too small in breadth, however, the phosphor particles coagulate resulting in lower luminance on the contrary to the intention. Therefore, in order to make a plasma display panel of higher luminance, it is preferable for the first plasma display panel of the present invention, according to our study, to set the breadth and thickness of the flakes of phosphor particles as follows, although it depends on the color.

The blue phosphor particles described above may comprise flaky particles based on a phosphor represented by general formula of $Ba_{(1-x)}Eu_xMgAl_{10}O_{17}$ ($0.03 \leq x \leq 0.25$) as the major component, while preferably the breadth thereof is in a range from 0.3 to 6 µm, thickness is in a range from 0.1 to 2 µm, and profile ratio (breadth/thickness) is in a range from 3 to 25.

The phosphor represented by the general formula $Ba_{(1-x)}Eu_xMgAl_{10}O_{17}$ is a phosphor represented by $BaMgAl_{10}O_{17}:Eu^{2+}$.

The green phosphor particles may comprise flaky particles made of a phosphor represented by a general formula of $(Zn_{1-x}Mn_x)SiO_4$. ($0.01 \leq x \leq 0.05$) as the major component, while preferably the breadth thereof is in a range from 0.3 to 6 µm, thickness is in a range from 0.1 to 2 µm, and profile ratio (breadth/thickness) is in a range from 3 to 25.

The phosphor represented by the general formula $Zn_{1-x}Mn_x) SiO_4$ is represented as $Zn_2SiO_4:Mn^{2+}$.

The red phosphor particles may comprise flaky particles made of a phosphor represented by a general formula of $Y_{1-x}Eu_xBO_3$ ($0.05 \leq x \leq 0.15$) as the major component, while preferably the breadth thereof is in a range from 0.5 to 6 µm, thickness is in a range from 0.2 to 2 µm, and profile ratio (breadth/thickness) is in a range from 2.5 to 15.

The phosphor represented by the general formula $Y_{1-x}Eu_xBO_3$ is a material represented by $YBO_3: Eu^{3+}$.

The phosphor particles having a high profile ratio as described above are preferably made by adding a somewhat greater amount of activation agent in order to ensure sufficient number of luminance centers for the amount of ultraviolet rays absorbed.

Also in the first plasma display panel of the present invention, the discharge space can be formed on the back panel by partitioning the surface with barrier ribs that are formed by plasma spraying. The phosphor layers can be formed on the barrier ribs and on the bottom surface of the discharge space by firing after continuously discharging the phosphor ink, that includes the phosphor particles, a solvent and a resin binder, from a nozzle and then drying.

In the first plasma display panel of the present invention, the barrier ribs preferably comprise a first layer made of one white material selected from among a group consisting of alumina ($Al_2O_3$), spinel ($MgO.Al_2O_3$) and zircon ($ZrO_2$) and a second layer made of a black material selected from among a group consisting of chromium oxide ($Cr_2O_3$), alumina titania ($Al_2O_3$—$TiO_3$), chromium oxide-cobalt oxide ($Cr_2O_3$—CoO), chromium oxide-manganese oxide ($Cr_2O_3$—$MnO_2$), and chromium oxide-iron oxide ($Cr_2O_3$)—$Fe_2O_3$).

A plasma display panel of even more higher luminance and higher display contrast can be obtained by using the flaky phosphor particles and coating the area between the barrier ribs that are black-colored on the upper portion (second layer) with the particles by ink jet process (application of the ink by continuously discharging the ink from a fine tube).

A method of producing the first plasma display panel of the present invention is a method of producing a plasma display panel comprising a plurality of discharge spaces formed between the front panel and the back panel disposed to oppose each other, and phosphor layers that are formed in the discharge spaces and include phosphor particles of one of blue, red and green colors, wherein the phosphor layers are formed by spraying the phosphor ink that includes the phosphor particles, the solvent, a resin binder and a dispersion agent from the nozzle.

In the method of producing the first plasma display panel, it is preferable to control the viscosity of the phosphor ink within a range from 15 to 1000 centipoise.

In the method of producing the first plasma display panel, it is also preferable to use ethyl cellulose or acrylic resin for the resin binder.

A first phosphor material according to the present invention is a blue phosphor material for the plasma display panel, one selected from a group consisting of a phosphor represented by general formula $Ba_{(1-x)}Eu_xMgAl_{10}O_{17}$, a phosphor represented by general formula $Ba_{2(1-x)}Eu_{2x}Mg_2Al_{18}O_{35}$ a phosphor represented by general formula $Ba_{2(1-x)}Eu_{2x}Mg_2Al_{18}O_{35}$ and a phosphor represented by general formula $Ba_{3(1-x)}Eu_{3x}Mg_5Al_{18}O_{35}$ where value of x is limited as $0.01 \leq x \leq 0.15$, and has a laminar structure The material represented by $BaMgAl_{10}O_{17}:Eu$ that has been used as the blue phosphor is a laminar compound having β-alumina structure or magnetoplumbite structure (see, for example, Phosphor Handbook, Ohm Publishing Co., Dec. 15, 1987, pp.225)

This conventional blue phosphor material has such a crystal structure as a layer including barium (Ba) (R layer) and a layer without barium (Ba) (spinel layer, S layer) are arranged alternately one on another (plate crystal), wherein europium ion ($Eu^{2+}$) that serves as the luminescence center is substituted at the lattice position of Ba ion (Eu ions are not substituted in the spinel layer).

The present inventors completed the first phosphor material base on the assumption that luminance increases as the layer containing europium ion ($Eu^{2+}$) that serves as the luminescence center (layer containing Ba) is made in such a crystal system that exists with a high concentration in the β-alumina structure. Specifically, the first phosphor material of the present invention is made in such a composition that the blue phosphor material for the plasma display panel employs a crystal system of β-alumina or magnetoplumbite structure such as $Ba_2Mg_4Al_8O_{18}$, $Ba_3Mg_5Al_{18}O_{35}$, or $Ba_2Mg_2Al_{12}O_{22}$ as the base material, where there are more layers that include Ba than in the base material based on $BaMgAl_{10}O_{17}$: Eu used in the prior art, and improved in the luminance by substituting Ba of these crystals with Eu.

The second plasma display panel of the present invention has a plurality of discharge spaces formed between the front panel and the back panel disposed to oppose each other, and the phosphor layers that include phosphor particles of one of blue, red and green colors and are formed in the discharge spaces.

The blue phosphor that constitutes the phosphor layer described above is one or more kinds of phosphor selected from a group consisting of a phosphor represented by general formula $Ba_{(1-x)}Eu_xMgAl_{10}O_{17}$, a phosphor represented by general formula $Ba_{2(1-x)}Eu_{2x}Mg_2Al_{12}O_{22}$, a phosphor represented by general formula $Ba_{2(1-x)}Eu_{2x}Mg_4Al_8O_{18}$ and a phosphor represented by general formula $Ba_{3(1-x)}Eu_{3x}Mg_5Al_{18}O_{35}$ with the condition of $0.01 \leq x \leq 0.1$.

In the material represented by $BaMgAl_{10}O_{17}:Eu$ used as the blue phosphor of the prior art, the amount of Eu ions serving as the luminescence center that substitute the Ba ions in the Ba layer is usually set around 10 to 15 atomic percent, unlike in the case of the blue phosphor used in the second plasma display panel.

This is because, though the initial luminance increases as the substitution ratio by $Eu^{2+}$ ions is increased (for example, National Technical Report Vol. 43, No.2, Apr. 1997, pp.70), the luminance decreases in the phosphor firing process (500 to 600° C.) when the content of Eu ions exceeds 10 atomic % and therefore substitution ratio by $Eu^{2+}$ ions is set around 10 atomic % to 15 atomic % (for example, OPTRONICS, 1997, No. 6, pp. 154).

However, it was found through our research that it is important to evaluate the picture quality of the display panel in terms of chromaticity as well as luminance, and it is important to evaluate the emission intensity (luminance divided by the y value of chromaticity) that includes both of these parameters.

When compared in terms of the emission intensity, comparable values are obtained after firing at a temperature around 50° C. with substitution of within 10 atomic %. In the plasma display panel, further firing at a temperature around 400° C. is required in order to bond the front and back panels. By setting the substitution ratio by $Eu^{2+}$ ions in this process to such a level as in the configuration of the present invention, it is made possible to achieve the phosphor layer having higher emission intensity than the phosphor layer of the prior art. Particularly when the substitution ratio by $Eu^{2+}$ ions is set within 10 atomic % and not less than 1 atomic %, a display panel having high performance in terms of both luminance and chromaticity can be obtained. In the second plasma display panel of the present invention, based on these results, it is intended to prevent thermal deterioration of the blue phosphor in the phosphor firing process by limiting the proportion of the Ba ions that can be substituted width Eu ions within 10 atomic % of the Ba content.

As described above, use of the blue phosphor material of the present invention makes it possible to form the phosphor layer of high luminance and high heat resistance, being capable of suppressing thermal deterioration in the firing process during the production of the plasma display panel, and achieve the plasma display panel of high luminance and good picture quality.

The first phosphor material powder according to the present invention includes the phosphor particles and non-fluorescent white particles that have average particle size smaller than the average particle size of the phosphor particles mixed therein.

The phosphor material powder of the prior art comprises only is the phosphor particles. In a phosphor layer formed from these phosphor particles, the percentage of loading of phosphor particles in the layer increases as the particle size of the phosphor becomes smaller and, as a result, the effect of reflection in the layer becomes greater thus making it possible to extract the emitted visible light efficiently through the front surface of the layer.

At the same time, however, specific surface area of the phosphor increases as the phosphor particles become smaller, that makes crystal defects more likely to occur which leads to deterioration of light emission characteristic, thus forming a tradeoff relationship.

When using such a phosphor material made by mixing the phosphor particles and non-fluorescent white particles that have average particle size smaller than the average particle size of the phosphor particles is used as the first phosphor material powder of the present invention, by contrast, efficient emission of light is achieved with phosphor particles of relatively large particle size. Moreover, when a layer is formed, percentage of loading is increased as the voids between the phosphor particles of relatively large particle sizes is filled with the non-fluorescent white particles of relatively small particle sizes, resulting in improved reflectivity in the layer and making it possible to extract the emitted light efficiently through the front surface of the layer.

In the first phosphor material powder of the present invention, average particle size of the phosphor particles is preferably in a range from 1.5 μm to 5 μm inclusive, and average particle size of the non-fluorescent white particles is preferably 1.5 μm or smaller. It is also preferable that average particle size of the phosphor particles is twice that of the non-fluorescent white particles or larger.

The percentage of loading can be increased further by making average particle size of the phosphor particles five times or more larger than that of the non-fluorescent white particles.

With the average particle size of the phosphor particles denoted as A, minimum particle size thereof be dmin, maximum particle size be dmax and coefficient of particle size concentration be x (%) with x being calculated as x=100A/(A+dmax−dmin), it is preferable to make the coefficient of particle size concentration of the particle size distribution of at least either the phosphor particles or the non-fluorescent white particles not less than 50% within 100%, which makes it possible to effectively fill the voids between the larger phosphor particles with the smaller non-fluorescent white particles.

The percentage of loading can be increased further by setting the coefficients of particle size concentration of the phosphor particles and the non-fluorescent white particles in a range from 80% to 100% inclusive.

In order to increase the percentage of loading further, total number of the non-fluorescent white particles is preferably less than the total number of the phosphor particles.

The phosphor particles described above may also be a blue phosphor represented by general formula $Ba_{(1-x)}Eu_xMgAl_{10}O_{17}$.

The phosphor particles described above may also be a green phosphor represented by general formula $(Zn_{1-x}Mn_x)SiO_4$.

The phosphor particles may be a green phosphor represented by general formula $Ba_{(1-x)}Mg_xAl_{12}O_{19}$.

The phosphor particles may also be a red phosphor represented by general formula $Y_{1-x}Eu_xBO_3$.

The phosphor particles may also be a red phosphor represented by general formula $Y_{1-x-y}Gd_xEu_yBO_3$.

The percentage of loading can also be increased by using the phosphor particles or the non-fluorescent white particles that are spherical or substantially sphere-shaped particles.

It is also effective to use $Al_2O_3$ or $TiO_2$ that has high reflectivity for visible light as the non-fluorescent white particles.

The third plasma display panel of the present invention has a plurality of discharge spaces formed between a front panel and a back panel disposed to oppose each other, with a phosphor layer that includes phosphor particles of one of blue, red and green colors being formed in each of the discharge spaces, while the phosphor layers include the first phosphor material powder of the present invention. In the third plasma display panel that uses the first phosphor material powder of the present invention as described above, the percentage of loading of the phosphor material powder in the phosphor layer can be increased thus giving is the layers good reflective characteristics. Thus it is made possible to extract the visible light emitted by the phosphor efficiently through the entire surface of the panel, and increase the luminance and the emission efficiency.

In third plasma display panel of the present invention, thickness of the phosphor layers is preferably in a range from 5 μm to 50 μm.

The second phosphor material powder of the present invention is an aggregate of phosphor particles, and is characterized in that the number of phosphor particles having particle sizes not less than the peak particle diameter Dp is less than the number of phosphor particles having particle sizes not greater than the peak particle diameter Dp, with Dp representing the peak particle diameter in the particle size distribution of the phosphor particles.

Conventional phosphor material powder generally has a nearly symmetrical particle size distribution with the peak particle size at the center thereof. The phosphor layer that includes the phosphor material powder has higher reflecting effect inside the layer when the percentage of loading is higher, thus making it possible to extract the emitted visible light effectively through the front surface of the layer. The second phosphor material of the present invention is made by reducing the number of relatively large particles in the particle size distribution to achieve the such a particle size distribution as described above, thus making it possible to fill the voids between the phosphor particles with smaller phosphor particles more densely, and extract the emitted visible light efficiently through the front surface of the layer.

In the second phosphor material powder of the present invention, the number of phosphor particles having particle sizes not less than peak particle diameter Dp is preferably within 70% of the number of phosphor particles having particle sizes not greater than the peak particle diameter Dp.

In the second phosphor material powder of the present invention, the number of phosphor particles having particle sizes not less than the peak particle diameter Dp is more preferably within 50% of the number of phosphor particles having particle sizes not greater than peak particle diameter Dp, which enables it to improve the percentage of loading further.

The second phosphor material powder of the present invention is an aggregate of phosphor particles, and is prepared to have such a particle size distribution as Dmax–Dp is less than Dp–Dmin, with Dp representing the peak particle diameter, Dmin the minimum particle size and Dmax the maximum particle size of the phosphor particles.

In the second phosphor material powder of the present invention, the particle size distribution is preferably such as (Dmax–Dp) is less than 0.5 times the value of (Dp–Dmin).

In the second phosphor material powder of the present invention, the particle size distribution is preferably such that (Dmax–Dp) is less than 0.3 times the value of (Dp–Dmin). This enables it to improve the percentage of loading of the phosphor particles further.

In the second phosphor material powder of the present invention, peak particle diameter Dp of the particle size distribution of the phosphor particles is preferably from 1.5 μm to 5 μm inclusive.

In the second phosphor material powder of the present invention, the phosphor particles may also comprise such a phosphor that the phosphor particles emit visible light upon excitation by ultraviolet rays.

In the second phosphor material powder of the present invention, the phosphor particles may also comprise blue phosphor material represented by general formula $Ba_{(1-x)}Eu_xMgAl_{10}O_{17}$.

In the second phosphor material powder of the present invention, the phosphor particles may also comprise a green phosphor material represented by general formula of $(Zn_{1-x}Mn_x)SiO_4$.

In the second phosphor material powder of the present invention, the phosphor particles may also comprise a green phosphor represented by general formula $Ba_{1-x}Mg_xAl_{12}O_{19}$.

In the second phosphor material powder of the present invention, the phosphor particles may also comprise a red phosphor represented by general formula $Y_{1-x}Eu_xBO_3$.

In the second phosphor material powder of the present invention, the phosphor particles may also comprise a red phosphor represented by general formula $Y_{1-x-y}Gd_xEu_yBO_3$.

In the second phosphor material powder of the present invention, the phosphor particles have preferably spherical or near spherical shape, which enables it to improve the percentage of loading further.

The fourth plasma display panel of the present invention has a plurality of discharge spaces formed between a front panel and a back panel disposed to oppose each other, with a phosphor layer that includes phosphor particles of one of blue, red and green colors being formed in each of the discharge spaces, while the phosphor layers include the second phosphor material powder of the present invention. Thus the percentage of loading of the phosphor material powder in the phosphor layer can be increased giving the layers good reflective characteristics. This makes it possible to extract the visible light emitted by the phosphor efficiently through the entire surface of the panel, and make a plasma display panel of high luminance and high emission efficiency.

In the fourth plasma display panel of the present invention, thickness of the phosphor layer is preferably in a range from 5 μm to 50 μm inclusive.

The second phosphor material of the present invention is represented by general formula $Ba_{(1-x-y)}Sr_yMg_aAl_bO_c$: $Eu_x$, where the value of x is in a range from 0.01 to 0.08 inclusive.

In the phosphor material such as $Ba_{(1-x)}MgAl_{10}O_{17}$: $Eu_x$ used for the blue phosphor in the prior art, value of x that represents substitution ratio by $Eu^{2+}$ ions is generally in a range from 0.1 to 0.15.

This is because the highest luminance can be achieved when the value of x is in a range from 0.1 to 0.15 after firing at a temperature around 500° C., because the heat resistance tends to increase as the substitution ratio by $Eu^{2+}$ ions decreases, although the initial luminance increases as the substitution ratio by $Eu^{2+}$ ions is increased.

With respect to the picture quality of the display panel, it is important to evaluate the chromaticity as well as the luminance, and accordingly it is important to evaluate the emission intensity (luminance divided by the y value of chromaticity) that includes both of these parameters When compared by the emission intensity, substantially the same values are obtained after firing at a temperature around 500° C. when the value of x is 0.1 or less.

The plasma display panel requires another firing process at a temperature around 400° C. to bond the front and back panels, that causes deterioration in the emission intensity although this temperature of the second firing is lower than the phosphor firing temperature that is around 500° C. A phosphor layer of higher emission intensity than that of the phosphor layer of the prior art can be achieved by setting the substitution ratio by $Eu^{2+}$ ions as in the configuration of the present invention, thereby increasing the heat resistance. The present invention was completed by finding this fact.

In the second phosphor material of the present invention, the value of x is preferably in a range from 0.02 to 0.075 inclusive, and more preferably in a range from 0.03 to 0.06 inclusive.

Service life (ultraviolet radiation resistance) of the $Ba_{(1-x)}MgAl_{10}O_{17}:Eu_x$ generally increases as the substitution ratio by $Eu^{2+}$ ions is increased. However, the service life and the heat resistance are in the relation of trade-off. Service life of the $Ba_{(1-x)}MgAl_{10}O_{17}:Eu_x$ can be increased by substituting a part of Ba with Sr. Therefore, when the substitution ratio by $Eu^{2+}$ ions is decreased as in the second phosphor material of the present invention and substitution ratio by Sr is set as in the present invention at the same time, a phosphor of higher heat resistance and longer service life than the phosphor of the prior art can be obtained.

In the second phosphor material of the present invention, the value of y is preferably in a range from 0.01 to 0.2 inclusive, more preferably in a range from 0.02 to 0.15 inclusive and further more preferably in a range from 0.02 to 0.1 inclusive.

Moreover, the value of x+y is preferably in a range from 0.05 to 0.2 inclusive, and more preferably in a range from 0.09 to 0.15 inclusive.

In the second phosphor material of the present invention, the parameters in the general formula described above may be such as a is 1, b is 10 and c is 17, or alternatively a is 1, b is 14 and c is 23.

Further in the second phosphor material of the present invention, when applied to the plasma display panel, it is preferable that the phosphor emits visible light when excited by ultraviolet rays and more preferably emits visible light when excited by ultraviolet rays of wavelength 200 nm or less.

The fifth plasma display panel of the present invention has a plurality of discharge spaces formed between the front panel and the back panel disposed to oppose each other, with a phosphor layer that includes phosphor particles of one of blue, red and green colors being formed in each of the discharge spaces, while the phosphor layers that contain the blue phosphor particles include the second phosphor material powder of the present invention.

When the second phosphor material of the present invention is used, as described above, phosphor layers of high heat resistance and high durability can be formed while restraining thermal deterioration during the firing process and suppressing deterioration of the emission intensity when illuminating, thus making it possible to achieve a plasma display panel that has high emission intensity, long service life and high picture quality.

In the fifth plasma display panel of the present invention, the phosphor layers that contain the blue phosphor particles may be produced through at least one process of firing at a temperature of 400° C. or higher.

In the fifth plasma display panel of the present invention, the phosphor layers that contain the blue phosphor particles may also be produced through at least one process of firing at a temperature of 500° C. or higher.

In the fifth plasma display panel of the present invention, the phosphor layers that contain the blue phosphor particles may also be produced through at least two firing processes. In this case, firing temperature for the phosphor layers that contain the blue phosphor particles is preferably lower in the second firing process than in the first firing process.

The third phosphor material of the present invention is a phosphor material of which base material is partially substituted with $Eu^{2+}$ ions, with the substitution ratio by $Eu^{2+}$ ions being 8 atomic % or lower.

In the third phosphor material of the present invention, substitution ratio by $Eu^{2+}$ ions is preferably in a range from 1 to 6 atomic %.

In the blue phosphor material wherein a certain element in the base material is substituted with $Eu^{2+}$ ions that serve as deactivating agent, including a phosphor represented by general formula of $BaMgAl_yO_z$, the phosphors of substitution ratio by $Eu^{2+}$ ions in a range from 10 to 15 atomic % have been used in the prior art.

With the third phosphor material of the present invention, luminance and emission intensity can be made higher than in the prior art by forming the phosphor layer using the phosphor material of the present invention. The invention was completed upon finding that picture quality and luminance of the plasma display panel can be improved by using such phosphor materials as the blue phosphor material.

With the third phosphor material of the present invention, as described above, it is made possible to form the phosphor layer having heat resistance higher than in the prior art and improve the luminance and emission intensity of the phosphor layer, by setting the Ba substitution ratio by $Eu^{2+}$ ions within 8 atomic % or preferably in a range from 1 to 6 atomic % in the phosphor material in which the element to be substituted in the base material is substituted by $Eu^{2+}$ ions, particularly a phosphor represented by the general formula of $BaMgAl_{10}O_{17}: Eu^{2+}$.

Thus high luminance and high emission intensity can be achieved by setting the substitution ratio by $Eu^{2+}$ ions to a low level as described above, even when the plasma display panel is produced by firing the panel after coating with the phosphor material thereby burning out the binder and forming the phosphor layer and then firing again in the panel sealing process, namely even when the phosphor material is subjected to firing twice.

The third phosphor material of the present invention preferably contains $BaMgAl_yO_z$ as the base material with the substitution ratio of Ba by $Eu^{2+}$ ions being set within 8 atomic % or preferably in a range from 1 to 6 atomic % also in this case.

Also in the third phosphor material of the present invention, values of y and z in the formula $BaMgAl_yO_z$ of the base material are preferably 10 and 17, respectively.

The values of y and z in the formula $BaMgAl_yO_z$ of the base material may also be 14 and 23, respectively.

The sixth plasma display panel of the present invention has a plurality of discharge spaces formed between the front panel and the back panel disposed to oppose each other, with a phosphor layer that include phosphor particles of one of blue, red and green colors being formed in each of the discharge spaces, while the blue phosphor particles included in the phosphor layers are made of the third phosphor material powder of the present invention.

When the third phosphor material of the present invention is used for the blue phosphor material, as described above, thermal deterioration of the phosphor layer can be suppressed in the firing process during production of the plasma display panel, thus making it possible to improve the picture quality and luminance of the plasma display panel.

A method for forming the phosphor layer according to the present invention is a method of forming the phosphor layer on a substrate, comprising a phosphor material applying step of applying the phosphor material together with a binder, wherein a part of Ba atoms of $BaMgAl_yO_z$ of the base material are substituted with $Eu^{2+}$ ions with the substitution ratio by $Eu^{2+}$ ions being within 8 atomic %, and a firing step of firing the substrate whereon the phosphor material is applied.

The phosphor applying step of this forming method may be a process of coating the substrate with an ink or a sheet made by mixing particles of the phosphor material and the binder.

A second method of producing the plasma display panel according to the present invention comprises a phosphor applying step of applying the phosphor material together with the binder onto a first panel substrate, the phosphor material being such as a part of Ba atoms of $BaMgAl_yO_z$ of the base material are substituted with $Eu^{2+}$ ions with the substitution ratio by $Eu^{2+}$ ions being in a range from 1 to 6 atomic %, a firing step of firing the first panel substrate whereon the phosphor material has been applied, and a sealing step wherein the first panel and the second panel are placed one on another and sealed following the firing step.

The phosphor applying step of the second producing method may be a process of applying the ink or the sheet made by mixing particles of the phosphor material and the binder onto the first panel substrate.

Further according to the second producing method, the sealing step may be a process of placing the first panel and the second panel are placed one on another via a sealing agent then firing and thereby sealing the assembly, following the firing step described above.

PREFERRED EMBODIMENTS OF THE INVENTION

Embodiment 1

Figure 1A:
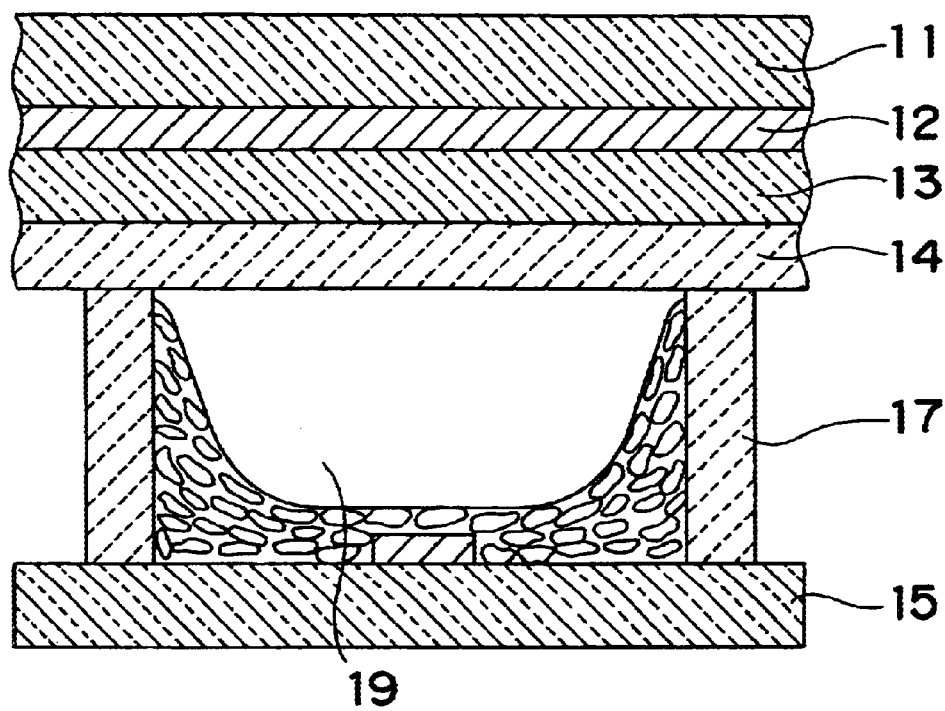
FIG. 1A is a schematic sectional view of an AC discharge type plasma display panel according to the first embodiment of the present invention.

FIG. 1A is a schematic sectional view of an AC discharge type plasma display panel (PDP) according to first embodiment of the present invention. While FIG. 1A shows only one cell, the plasma display panel comprises a number of cells that emit red, green and blue light being arranged alternately.

Figure 2:
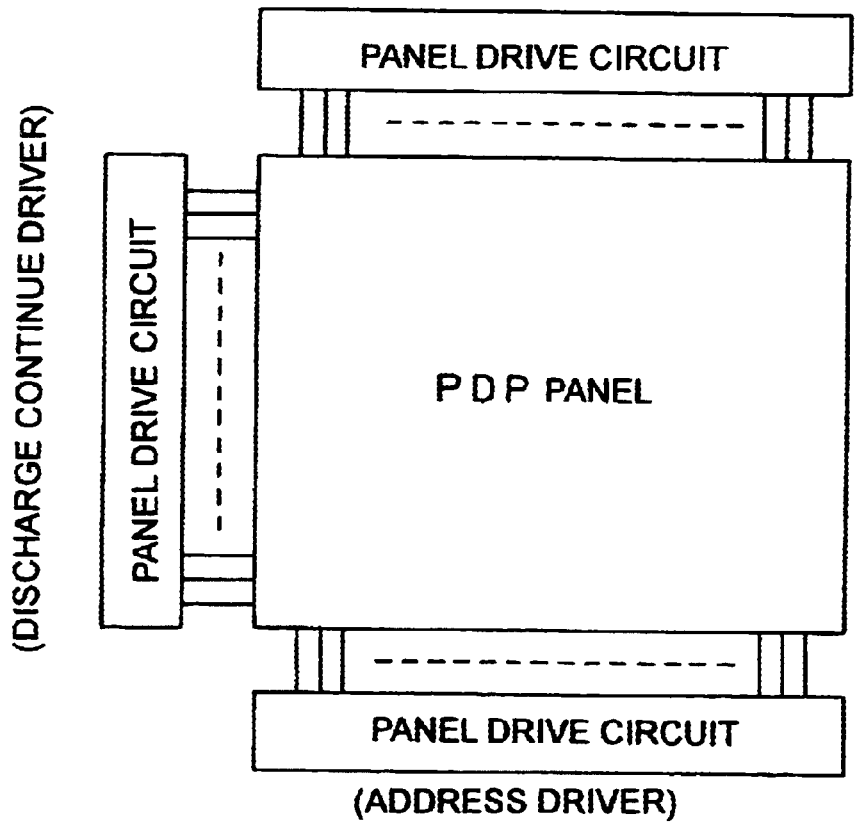
FIG. 2 is a block diagram of a plasma display panel display apparatus according to the first embodiment.

The plasma display panel comprises a front panel consisting of discharge electrodes 12 and a dielectric glass layer 13 being disposed on a front glass substrate 11, and a back panel consisting of address electrodes 16, barrier ribs 17 and phosphor layers 18 using a flaky phosphor material being disposed on a back glass substrate 15, wherein the front panel and the back panel are laminated with each other to form discharge spaces 19 between the front panel and the back panel that are filled with a discharge gas, while the plasma display panel is driven by applying voltages on the discharge electrodes 12 and the address electrodes 16 by drive circuits shown in FIG. 2.

The discharge electrodes 12 are disposed so as to form an orthogonal matrix with the address electrodes 16.

(Production of Front Panel 101)

The front panel 101 is made by forming the discharge electrodes 12 on the front glass substrate 11, forming the lead- or bismuth-based dielectric glass layer 13 to cover thereon, and forming a protective layer 14 on the surface of the dielectric glass layer 13.

The discharge electrodes 12 are electrodes made of silver, and is formed by firing a silver paste that is screen-printed.

The lead-based dielectric glass layer 13 is formed to a thickness of about 20 μm by firing a coat at 560° C. for 20 minutes, the coat being applied by screen printing of, for example, a mixture of 70% by weight of lead oxide [PbO], 15% by weight of boron oxide [$B_2O_3$], 10% by weight of silicon oxide [$SiO_2$], 5% by weight of aluminum oxide and an organic binder (α-terpineol with 10% of ethyl cellulose dissolved therein).

The protective layer 14 is made of magnesium oxide (MgO) and is formed, for example, to a thickness of about 0.5 to 1.0 μm by sputtering or CVD (chemical vapor deposition) process.

(Prodcution of Back Panel 102)

The address electrodes 16 are formed on the back glass substrate 15 by screen printing process similarly to the discharge electrodes 12.

The barrier ribs 17 may be formed by screen printing or the like, but may also be formed by spraying process as described below.

Figure 3A:
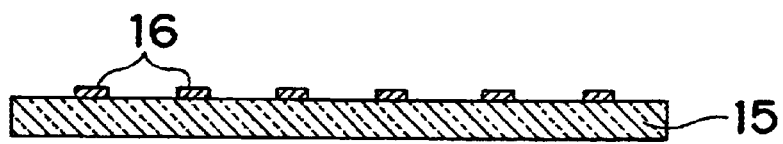
FIG. 3A through FIG. 3F show the method of forming barrier ribs in the first embodiment.
Figure 3B:
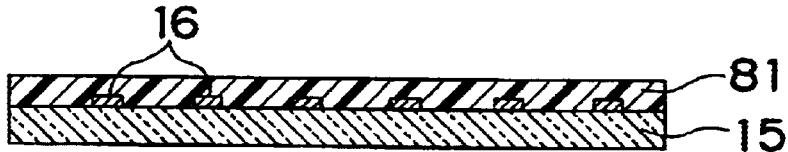
Figure 3C:
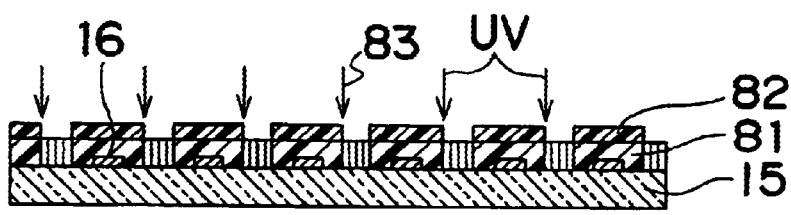

FIG. 3A through FIG. 3F show the method of forming the barrier ribs by the spraying process. First, surface of the back glass substrate 15 (FIG. 3A) whereon the address electrodes 16 have been formed is covered by a dry film 81 made of an acrylic photosensitive resin (FIG. 3B).

Figure 3D:
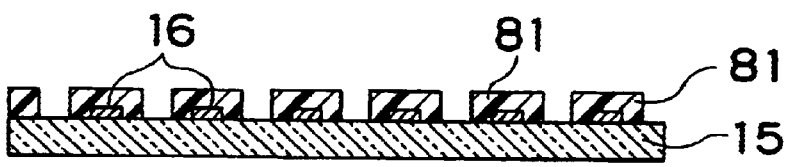
Figure 3E:
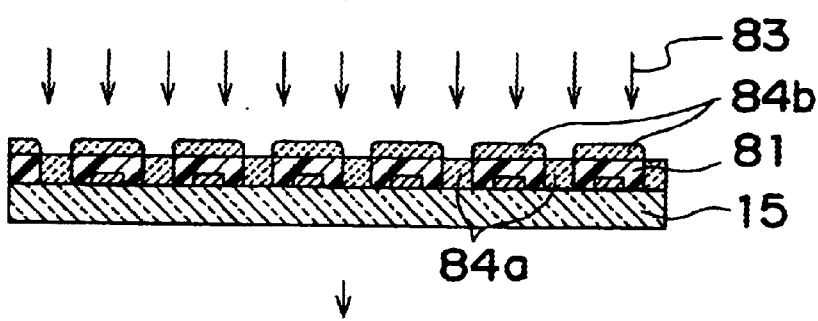

The dry film 81 is patterned by photolithography process. Specifically, the dry film 81 covered by a photo mask 82 is irradiated with ultraviolet (UV) rays 83 only on portions where the barrier ribs are to be formed (FIG. 3C), and developed. Thus the dry film 81 is removed from the portions where the barrier ribs are to be formed so that a mask of the dry film 81 is formed only on the portions where the barrier ribs are not to be formed (FIG. 3D). Development is carried out in an aqueous solution of alkali (specifically, aqueous solution of sodium carbonate) with about 1% of concentration.

The dry film is then subjected to plasma spraying of alumina ($Al_2O_3$), spinel ($MgO \cdot Al_2O_3$) and zircon ($ZrO_3$) that are the raw materials to make the barrier ribs. In order to improve the display contrast of the plasma display panel, an oxide such as $Cr_2O_3$, $TiO_2$, CoO, $Fe_2O_3$ or $MnO_2$ or a mixture thereof that have black color, too, may also be sprayed onto alumina, spinel and zircon.

Figure 4:
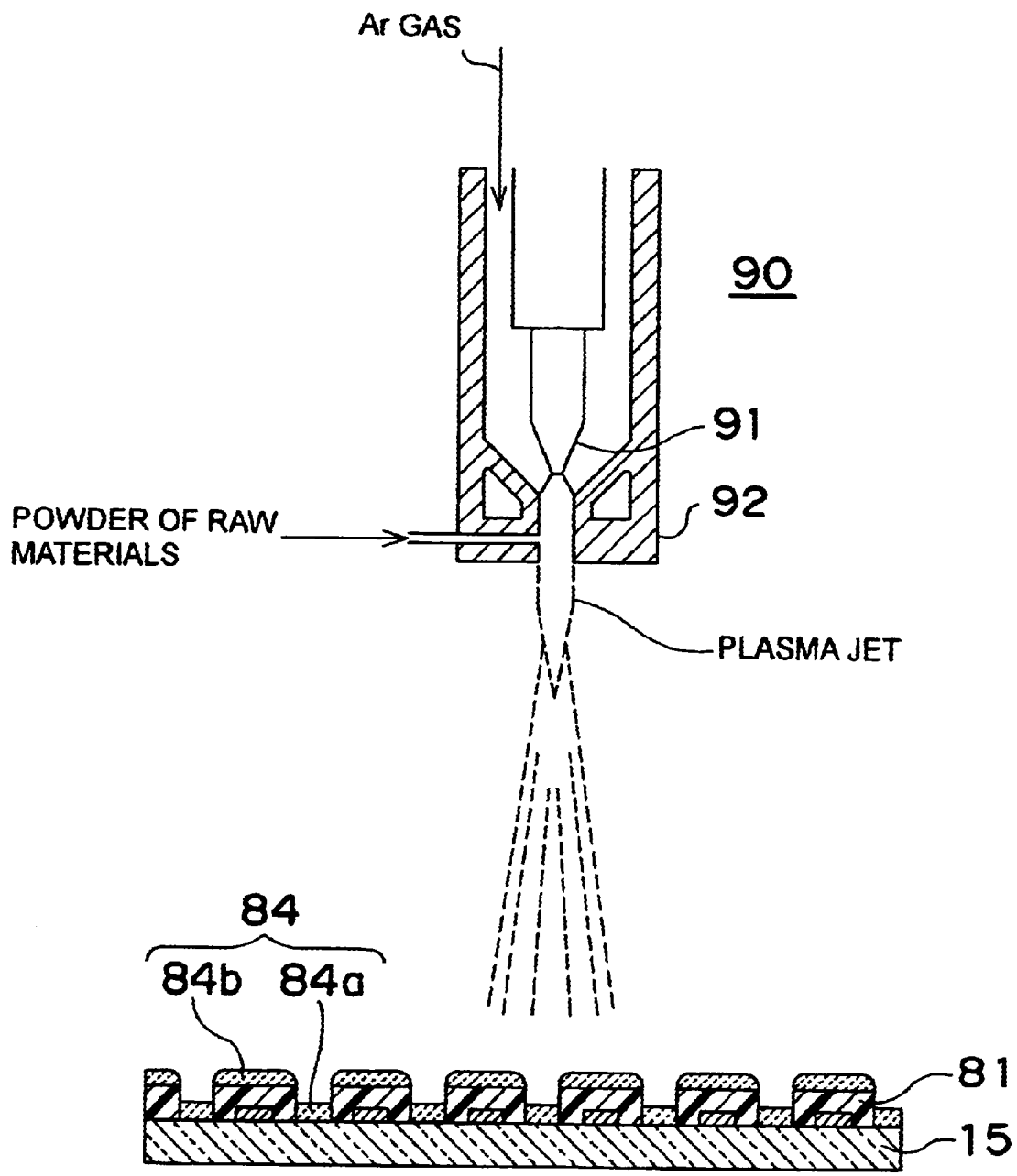
FIG. 4 is a diagram showing a process of plasma spraying according to the first embodiment.

FIG. 4 shows the plasma spray coating process. The plasma spray apparatus 90 generates a plasma jet by applying a voltage across a cathode 91 and an anode 92 thereby generating an arc discharge from the tip of the cathode 91 while supplying argon gas thereto.

Then powder of raw materials (alumina, $Cr_2O_3$, $TiO_2$, etc.) is supplied into the plasma jet so that the materials are melted in the plasma jet and sprayed onto the surface of the substrate 15.

Thus a sprayed film 84 of the raw material is formed on the surface of the substrate 15.

Figure 3F:
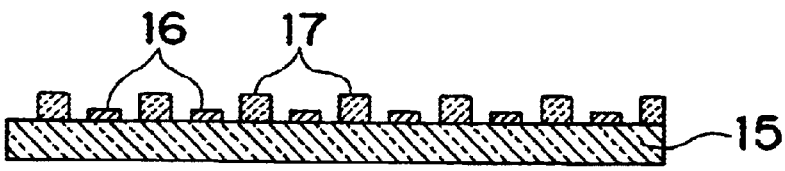

The substrate 15 with the film 84 formed thereon (FIG. 3E) is immersed in a solution of removing agent (sodium hydroxide solution) to remove the mask of the dry film 81 (lift-off process). This causes a portion 84b of the raw material film 84 formed on the mask of the dry film 81 to be removed with only a portion 84a directly formed on the substrate remaining and serving as the barrier rib 17 (FIG. 3F).

Then the phosphor layer 18 is formed in the groove between the barrier ribs 17. The process of forming the phosphor layer 18, to be described in detail later, consists of the application of a phosphor ink by continuously spouting the phosphor ink from a nozzle and firing thereof.

When the plasma display panel of the first embodiment is applied to a 40-inch class high definition television set, the barrier ribs are formed to a height of 0.1 to 0.15 mm at intervals of 0.15 to 0.3 mm.

(Production of Plasma Display Panel by Laminating Panels)

The front panel 101 and the back panel 102 produced as described above are put together by using sealing glass, while evacuating the inside of the discharge spaces 19 separated by the barrier ribs 17 to a high level of vacuum (for example, $8 \times 10^{-7}$ Torr), then filling the discharge spaces with a discharge gas (for example, He—Xe or Ne—Xe inert gas) at a predetermined pressure, thereby producing the plasma display panel.

Then a circuit block (panel drive circuits 151, 152, 153) that drive the plasma display panel are mounted as shown in FIG. 2, thereby producing the display apparatus of the plasma display panel.

In the first embodiment, the discharge gas includes 5% by volume of Xe and the sealing pressure is set in a range from 500 to 800 Torr.

(Phosphor Layer Forming Method)

Figure 5:
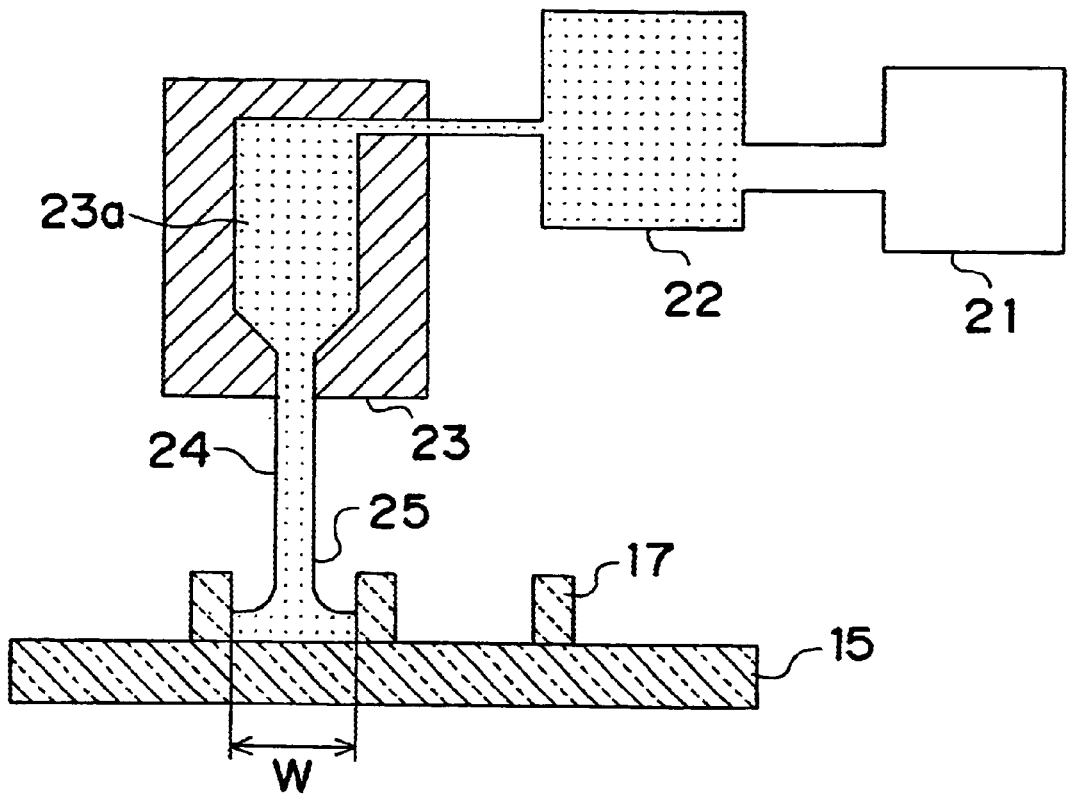
FIG. 5 is a schematic diagram showing an ink application device and the operation thereof according to the first embodiment.

FIG. 5 schematically shows the constitution of an ink application device 20 used when forming the phosphor layer 18.

As shown in FIG. 2, the ink application device 20 has a server 21 that stores the phosphor ink and a pressurizing pump 22 that pressurizes the ink and supplies it to a header 23. The header 23 is provided with an ink chamber 23a and a nozzle 24, so that the ink that has been pressurized and supplied to the ink chamber 23a is continuously spouted from the nozzle 24.

The header 23 is formed integrally with the ink chamber 23a and the nozzle 24 by mechanical machining and electric discharge machining of a metallic material.

The phosphor ink is made by mixing the phosphor particles of different colors, the binder and the solvent with a surfactant, silica and other components to obtain an appropriate level of viscosity.

For the phosphor particles that constitute the phosphor ink, those commonly used in the phosphor layers of plasma display panels can be used. Specific examples are as follows:

Blue phosphor: $BaMgAl_{10}O_{17}$: $Eu^{2+}$
Green phosphor: $BaAl_{12}O_{19}$: Mn or $Zn_2SiO_4$: Mn
Red phosphor: $(Y_xGd_{1-x})BO_3$: $Eu^{3+}$ or $YBO_3$: $Eu^{3+}$ In order to prevent clogging of the nozzle 24 and sedimentation of the particles, average particle size of the flaky phosphor particles used in the phosphor ink is preferably within 6 µm. In order to obtained a high emission efficiency in the phosphor layer, profile ratio (breadth/thickness) of the phosphor particles is preferably in a range from 3 to 25.

Viscosity of the phosphor ink is preferably controlled to be within 1000 centipoise (from 15 to 1000 centipoise) at 25° C.

Particle size of silica used as an additive is preferably in a range from 0.01 to 0.02 µm, with the content thereof being preferably from 1 to 10% by weight, and 0.1 to 5% by weight of a dispersing agent is preferably added.

In the ink application device 20, it is desirable to make the inner diameter of the nozzle 24 no smaller than 45 µm to prevent clogging of the nozzle and smaller than the groove width W between the barrier ribs 17, normally in a range from 45 to 150 µm.

In the server 21, the ink is stored while being mixed and agitated by an agitator (not shown) installed in the server 21.

Discharge pressure of the pressurizing pump 22 is controlled so that the ink discharged from the nozzle 24 forms a continuous stream.

The header 23 is adapted to scan over the back glass substrate 15, while scanning of the header 23 is effected by a header scanning mechanism (not shown) that drives the header 23 linearly in the first embodiment. According to the first embodiment, the glass substrate may also be linearly driven while fixing the header 23. With such a configuration as a continuous ink stream 25 is discharged from the nozzle 24 while scanning the header 23, a uniform line of the ink is formed on the glass substrate.

Figure 6:
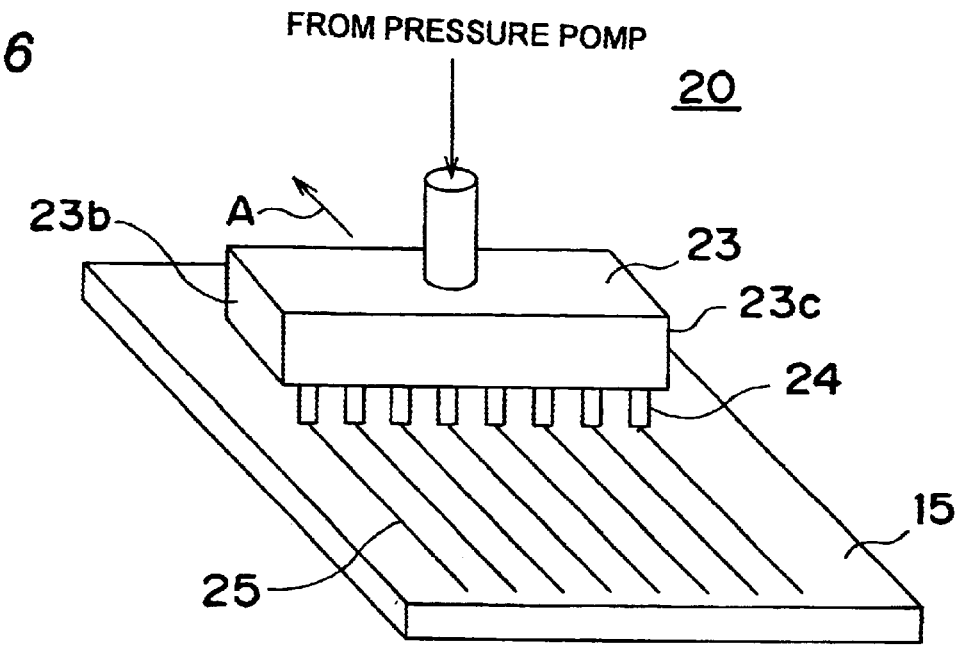
FIG. 6 is a diagram showing the operation of the ink application device that has a plurality of nozzles according to the first embodiment.

The ink application device 20 may also be made in such a configuration as shown in FIG. 6, where the header 23 has a plurality of nozzles 24 so that the ink is discharged from the nozzles 24 in parallel while scanning (scanning direction is indicated by an arrow A in FIG. 6). Providing the plurality of nozzles 24 makes it possible to formed a plurality of ink lines 25 in a single operation.

Application of the phosphor ink by the ink application device 20 is carried out along the barrier ribs 17 on the back glass substrate 15 for each of the red, blue and green colors. After drying the red, blue and green phosphor inks that have been applied successively in the respective grooves, the panel is fired (at around 500° C. for 10 minutes) thereby forming the phosphor layers 18.

The phosphor layers 18 are formed by applying the ink continuously, not by applying ink droplets as in the conventional ink jet process, and therefore the layers can be formed with a uniform thickness.

In case the ink application device 20 is made in such a configuration as each header 23 has three ink chambers and nozzles for the individual colors of red, blue and green, so that phosphor inks of three colors are discharged in parallel, it is made possible to apply the phosphor inks of the three colors in a single scanning operation.

Now the phosphor particles used in the phosphor layer 18 will be described below.

The phosphor particles used in the first embodiment consist of metal oxides that have been used in the prior art. Specific compositions of the phosphor particles of different colors are: $BaMgAl_{10}O_{17}:Eu^{2+}$ based on the crystal skeleton of $BaMgAl_{10}O_{17}$ with a predetermined amount of europium Eu included as an activation agent for the blue phosphor particles, $YBO_3:Eu^{3+}$ based on the crystal skeleton of $YBO_3$ with a predetermined amount of Eu included as an activation agent for the red phosphor particles and $Zn_2SiO_4: Mn^{2+}$ based on the crystal skeleton of $Zn_2SiO_4$ with a predetermined amount of Mn included as an activation agent for the green phosphor particles.

In the first embodiment, phosphor particles that have greater values of profile ratio (breadth/thickness) (flat and thinner) than the conventional ones for these phosphor particles.

Figure 1B:
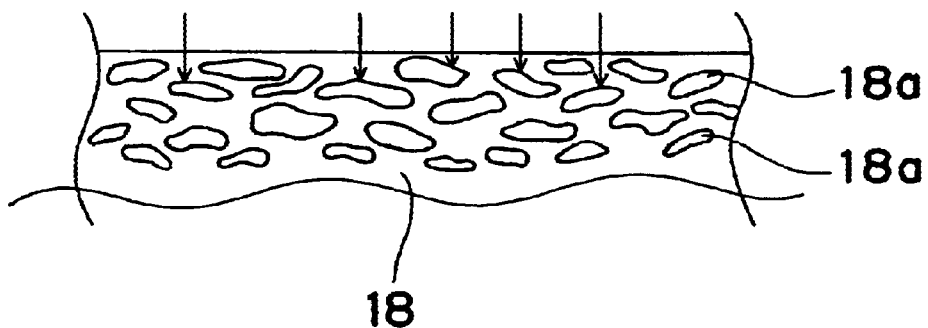
FIG. 1B is a schematic sectional view of a phosphor layer according to the first embodiment.
Figure 1C:
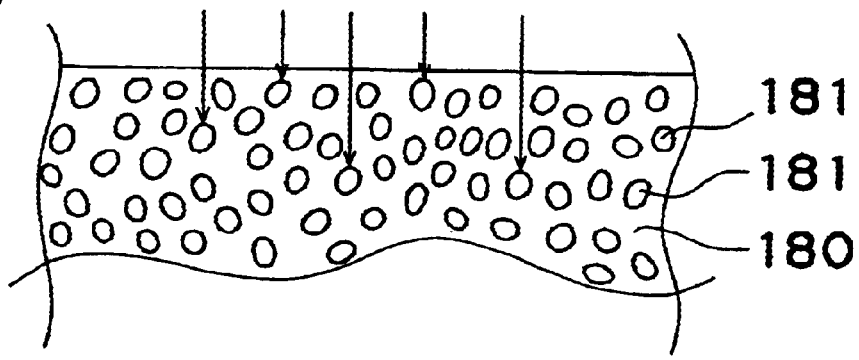
FIG. 1C is a schematic sectional view of a phosphor layer in a plasma display panel of the prior art.

Since the use of the phosphor particles having larger profile ratio makes it possible to increase the coverage ratio by the phosphor particles in the phosphor layer 18 of each cell, efficiency of absorbing the ultraviolet rays generated by electric discharge can be increased, thereby increasing the luminance of the panel. Specifically, when phosphor particles 181 having spherical shape are sued as shown in FIG. 1C, for example, since overlapping ratio (coverage ratio) between the phosphor particles 181 becomes relatively small in the incident direction (indicated by an arrow schematically in the drawing) of the ultraviolet ray, larger portion of the ultraviolet rays is absorbed by the phosphor particles 181 at relatively deeper positions from the surface. Light emitted from the phosphor particles 181 that have absorbed the ultraviolet rays at a relatively deeper positions in the phosphor layer 180 is likely to be absorbed by other phosphor particles 181 so that smaller portion thereof is emitted from the surface thus making less contribution to the improvement in the luminance of the panel, resulting in lower emission efficiency of the phosphor layer 180. With the constitution of the first embodiment, by contrast, since the laminar phosphor particles are used, overlapping ratio between the phosphor particles 18a in the incident direction (indicated by an arrow schematically in the drawing) of the ultraviolet ray can be made relatively larger, larger portion of the ultraviolet rays is absorbed by the phosphor particles 18a at positions relatively nearer to the surface. Light emitted from the phosphor particles 18a that have absorbed the ultraviolet rays at positions relatively nearer to the surface of the phosphor layer 18 is less likely to be absorbed by other phosphor particles 18a and is emitted from the surface, and therefore effectively contribute to the improvement in the luminance of the panel As a result, the emission efficiency of the phosphor layer 18 can be increased in the first embodiment.

Such flaky phosphor particles as described above can be made by firing at a relatively higher temperature for a shorter period of time than in the prior art, thereby suppressing the growth of crystal in the direction of thickness of the phosphor particles.

The red phosphor such as $YBO_3$ and $YGdBO_3$ may also be formed in flaky phosphor particles by using a hydroxide such as $Y_2(OH)_3$ as a starting material or employing hydrothermal synthesis (high temperature, high pressure synthesis) process.

Ranges of average flake diameters and average flake thickness are limited for the following reasons. When the average flake diameter is less than 0.3 µm or the average flake thickness is 0.1 µm or less, the phosphor particles that are too fine tend to coagulate, resulting in a decrease in the absorption efficiency. When the average flake diameter is 0.3 µm or less and the average flake thickness is 0.1 µm or less, much of the phosphor particles cannot be formed in the desired crystal structure, thus making it likely that the phosphor cannot provide enough luminance.

However, coagulation of the phosphor particles can be restrained to some extent by selecting a proper combination of the solvent wherein the phosphor particles are dispersed and other agents used when forming the phosphor layer. And in this case, phosphor particles of even smaller diameters and larger profile ratio (breadth/thickness) can be used.

Now the method for preparing the phosphor particles of different colors used in the first embodiment will be described below.

The blue phosphor particles are made by, first, mixing raw materials of barium carbonate ($BaCO_3$), magnesium carbonate ($MgCO_3$) and aluminum oxide ($\alpha\text{-}Al_2O_3$) in a proportion of 1:1:10 by the numbers of atoms of Ba, Mg and Al. Then a predetermined amount of europium oxide ($Eu_2O_3$) is added to the mixture. Then the mixture is mixed with a proper amount of a flux ($AlF_2$, $BaCl_2$) in a ball mill and the mixture is fired in a weakly reducing atmosphere ($H_2$, $N_2$) at a temperature in a range from 1400 to 1650° C. for a predetermined period of time (for example, 0.5 hours). Flaky crystal is obtained by sieving the fired mixture.

The profile ratio (breadth/thickness) can be changed by changing the firing temperature, ratio of the $H_2$ and $N_2$ flow rates and firing time.

The red phosphor particles are made by mixing raw materials of yttrium hydroxide $Y_2(OH)_3$ and boric acid ($H_3BO_3$) in a proportion of 1:1 by the numbers of atoms of Y and B. Then a predetermined amount of europium oxide ($Eu_2O_3$) is added to the mixture, which is mixed with a proper amount of flux in a ball mill. After firing the mixture at a temperature in a range from 1200 to 1450° C. in air for a predetermined period of time (for example, one hour), flaky powder is obtained by sieving the fired mixture.

The green phosphor particles are made by mixing raw materials of zinc oxide (ZnO) and silicon oxide ($SiO_2$) in a proportion of 2:1 by the numbers of atoms of Zn and Si. Then a predetermined amount of manganese oxide ($Mn_2O_3$) is added to the mixture, which is mixed in a ball mill. After firing the mixture at a temperature in a range from 1200 to 1350° C. in air for a predetermined period of time (for example, 0.5 hours), flaky powder is obtained by sieving the fired mixture.

The flake diameters and the flake thickness can be determined by observing the powder under an electron microscope, and the values given in this specification have been obtained with an electron microscope.

The red phosphor particles, that have cubic crystal system, have a profile ratio that is a little smaller than those of the blue and green phosphor particles which have hexagonal plate shape. Thus it is necessary to make the flake diameter of the red phosphor particles a little smaller. The profile ratio can be controlled by changing the firing temperature and the firing time.

While it is desirable to use phosphor particles of large profile ratio for all colors, phosphor particles of large profile ratio may also be used for only one color or two colors.

For example, such a constitution may be employed as phosphor particles of large profile ratio are used for only blue phosphor particles and conventional spherical particles are used for the red and green phosphor particles. With this constitution, luminance of the display panel can be improved.

In the plasma display panel of the prior art, low luminance of the blue phosphor is compensated for by reducing the amount of the red and green phosphor layer to be applied or reducing the luminance of the red and green phosphor layer by adding silica or other additive, thereby adjusting the white balance. Consequently, luminance of the blue phosphor has been the limiting factor for the luminance of the panel. According to the present invention, by contrast, entire luminance can be improved without such limitation by using the flaky phosphor material powder for the blue phosphor particles, thereby increasing the luminance as a whole.

Thus it is of a great value that the luminance of the blue phosphor layer is increased with the constitution of the present invention.

The phosphor layer 18 of the first embodiment is formed by the ink jet process. Since an ink of relatively low viscosity is used in this process, spherical phosphor particles having large diameters used in the prior art tend to precipitate thereby making it difficult to coat the side face of a barrier rib with phosphor layer with the phosphor particles being uniformly dispersed therein. The phosphor particles used in the first embodiment that have small diameters and large profile ratio, on the other hand, are less likely to precipitate in the ink and therefore makes it possible to coat the side face of a barrier rib with phosphor layer having the phosphor particles being uniformly dispersed. Thus it is made possible to increase the coverage ratio by the phosphor particles in the phosphor layer and increase the luminance at the same time.

Last, the use of the laminar phosphor particles and the low-viscosity ink makes it possible to completely cover the side faces of the barrier ribs and the bottom surface with the phosphor without generating gaps between the phosphor particles in the incident direction of the ultraviolet rays (FIG. 1B) even when the phosphor layer is thick due to many flaky particles being stacked one on another in the drying process after pouring the phosphor ink in to the space between the barrier ribs. Thus total weight of the phosphor can be reduced, contributing to the cost reduction of the panel.

Now first example of the first embodiment will be described below. In the description that follows, samples Nos.1 through 7 are samples of the examples according to the present invention, and samples Nos.8 through 10 are Comparative Examples. Tables 1, 2 and 3 show the conditions of making the blue, red and green phosphors.

TABLE 1

Conditions of making phosphor

Blue phosphor ($Ba_{1-x}Eu_xMgAl_{10}O_{17}$)

| Sample No. | Eu proportion X (Ratio in number of atoms) | Firing temperature (° C.) | Firing time (hour) | Ratio of $H_2/N_2$ gases | Average flake diameter ($\mu$m) | Average flake thickness ($\mu$m) | Profile ratio |
|---|---|---|---|---|---|---|---|
| 1 | 0.03 | 1400 | 0.5 | 0.05 | 0.3 | 0.1 | 3 |
| 2 | 0.05 | 1450 | 0.5 | 1 | 1.0 | 0.15 | 7 |
| 3 | 0.10 | 1500 | 0.5 | 0.15 | 2.0 | 0.2 | 10 |
| 4 | 0.15 | 1550 | 0.4 | 0.15 | 4.0 | 0.2 | 20 |
| 5 | 0.25 | 1600 | 0.3 | 0.15 | 6.0 | 0.24 | 25 |
| 6 | 0.10 | 1600 | 1.5 | 0.1 | 5.0 | 1 | 5 |
| 7 | 0.15 | 1650 | 2.0 | 0.2 | 6.0 | 2 | 3 |
| 8* | 0.15 | 1400 | 4.0 | 0.15 | 3.0 | 2 | 1.5 |

TABLE 1-continued

Conditions of making phosphor

Blue phosphor ($Ba_{1-x}Eu_xMgAl_{10}O_{17}$)

| Sample No. | Eu proportion X (Ratio in number of atoms) | Firing temperature (° C.) | Firing time (hour) | Ratio of $H_2/N_2$ gases | Average flake diameter ($\mu$m) | Average flake thickness ($\mu$m) | Profile ratio |
|---|---|---|---|---|---|---|---|
| 9* | 0.15 | 1650 | 3.0 | 0.1 | 7.0 | 3 | 2.3 |
| 10* | 0.15 | 1650 | 3.0 | 0.1 | 7.0 | 3 | 2.3 |

*Sample Nos. 8 through 10 are Comparative Examples.

TABLE 2

Conditions of making phosphor

Red phosphor ($Y_{1-x}Eu_xBO_3$)

| Sample No. | Eu proportion X (Ratio in number of atoms) | Firing temperature | Firing time | Average flake diameter | Average flake thickness | Profile ratio |
|---|---|---|---|---|---|---|
| 1 | 0.05 | 1200 | 1.0 | 0.5 | 0.2 | 2.5 |
| 2 | 0.05 | 1250 | 1.0 | 1.0 | 0.2 | 5.0 |
| 3 | 0.10 | 1300 | 1.0 | 2.0 | 0.5 | 4.0 |
| 4 | 0.10 | 1400 | 0.5 | 3.0 | 0.4 | 7.5 |
| 5 | 0.15 | 1450 | 0.3 | 3.0 | 0.2 | 15.0 |
| 6 | 0.15 | 1450 | 2.0 | 4.0 | 1.5 | 2.7 |
| 7 | 0.15 | 1450 | 3.0 | 5.0 | 2.0 | 2.5 |
| 8* | 0.15 | 1450 | 2.0 | 4.0 | 1.5 | 2.7 |
| 9* | 0.1 | 1300 | 0.5 | 3.0 | 0.4 | 7.5 |
| 10* | 0.1 | 1300 | 0.5 | 3.0 | 0.4 | 7.5 |

*Samples Nos. 8 through 10 are Comparative Examples.

TABLE 3

Conditions of making phosphor

Red phosphor [$(Zn_{1-x}Mn_x)_2SiO_4$]

| Sample No. | Mn proportion X (Ratio in number of atoms) | Firing temperature | Firing time | Average flake diameter | Average flake thickness | Profile ratio |
|---|---|---|---|---|---|---|
| 1 | 0.01 | 1200 | 0.5 | 0.3 | 0.1 | 3.0 |
| 2 | 0.01 | 1250 | 1.0 | 1.0 | 0.2 | 5.0 |
| 3 | 0.02 | 1300 | 0.5 | 2.0 | 0.2 | 10.0 |
| 4 | 0.02 | 1350 | 0.3 | 3.0 | 0.15 | 20.0 |
| 5 | 0.05 | 1350 | 0.5 | 4.0 | 0.5 | 8.0 |
| 6 | 0.05 | 1350 | 2.0 | 6.0 | 2.0 | 3.0 |
| 7 | 0.05 | 1350 | 2.0 | 6.0 | 2.0 | 3.0 |
| 8* | 0.05 | 1350 | 2.0 | 6.0 | 2.0 | 3.0 |
| 9* | 0.02 | 1300 | 0.5 | 2.0 | 0.2 | 10.0 |
| 10* | 0.02 | 1300 | 0.5 | 2.0 | 0.2 | 10.0 |

*Samples Nos. 8 through 10 are Comparative Examples.

TABLE 4

Conditions of preparing phosphor ink

| Sample No. | Composition of discharge gas | Type of resin and proportion (% by weight) | Type of solvent and proportion (% by weight) | Type of dispersion agent and proportion (% by weight) | Particle size ($\mu$m) and proportion of silica (% by weight) | Viscosity of ink (centipoise) |
|---|---|---|---|---|---|---|
| 1 | 34 | Ethylcellulose 5 | α-terpineol | None | 0.01 $\mu$m 1.0 | 15 |
| 2 | 40 | Acrylic resin 10 | α-terpineol | None | 0.02 $\mu$m 0.05 | 200 |
| 3 | 57 | Ethylcellulose 4 | Butyl carbitol 38 | Glyceryl trioleate 1 | None | 1000 |
| 4 | 35.9 | Ethylcellulose 3 | Butyl carbitol 60 | Glyceryl trioleate 0.1 | None | 100 |

TABLE 4-continued

Conditions of preparing phosphor ink

| Sample No. | Composition of discharge gas | Type of resin and proportion (% by weight) | Type of solvent and proportion (% by weight) | Type of dispersion agent and proportion (% by weight) | Particle size (μm) and proportion of silica (% by weight) | Viscosity of ink (centipoise) |
|---|---|---|---|---|---|---|
| 5 | 50 | Acrylic resin 10 | α-terpineol 41 | Glyceryl trioleate 0.1 | None | 300 |
| 6 | 35 | Ethylcellulose 5 | α-terpineol 61 | None | None | 30 |
| 7 | 35 | Ethylcellulose 5 | α-terpineol 61 | None | None | 30 |
| 8* | 35 | Ethylcellulose 5 | α-terpineol 61 | None | None | 30 |
| 9* | 35 | Ethylcellulose 5 | α-terpineol 61 | None | None | 30 |
| 10* | 35 | Ethylcellulose 5 | α-terpineol 61 | None | None | 30 |

*Samples Nos. 8 through 10 are Comparative Examples.

TABLE 5

Conditions of forming barrier ribs

| Sample No. | Composition of discharge gas | Material to make black barrier ribs (Upper portion) | Ratio of back barrier rib and white barrier rib (Upper portion/lower portion) |
|---|---|---|---|
| 1 | Alumina ($Al_2O_3$) | Chromium oxide ($Cr_2O_3$) | 1/5 |
| 2 | Alumina ($Al_2O_3$) | Alumina-titania ($Al_2O_3$ + $TiO_2$) | 1/10 |
| 3 | Alumina ($Al_2O_3$) | $Cr_2O_3$ + CoO (Cobalt oxide) | |
| 4 | Alumina ($Al_2O_3$) | $Cr_2O_3$ + $MnO_2$ (Manganese oxide) + CoO | 1/5 |
| 5 | Alumina ($Al_2O_3$) | $Cr_2O_3$ + $Fe_2O_3$ (Iron oxide) | 1/10 |
| 6 | Zircon ($ZrO_2$) | Alumina-titania ($Al_2O_3$ + $TiO_2$) | 1/10 |
| 7 | Spinel (MgO·$Al_2O_3$) | Alumina-titania ($Al_2O_3$ + $TiO_2$) | 1/10 |
| 8* | Alumina ($Al_2O_3$) | Alumina-titania ($Al_2O_3$ + $TiO_2$) | 1/10 |
| 9* | Alumina ($Al_2O_3$) | Alumina-titania ($Al_2O_3$ + $TiO_2$) | 1/10 |
| 10* | Alumina ($Al_2O_3$) | None | 0 |

TABLE 6

Panel manufacturing conditions and characteristics

| Sample No. | Composition of discharge gas | Discharge gas pressure (Torr) | Luminance (cd/m$^2$) | Display contrast of panel |
|---|---|---|---|---|
| 1 | Ne—Xe (5%) | 500 | 540 | 450:1 |
| 2 | Ne—Xe (5%) | 600 | 560 | 450:1 |
| 3 | Ne—Xe (5%) | 800 | 580 | 430:1 |
| 4 | Ne—Xe (5%) | 500 | 590 | 420:1 |
| 5 | Ne—Xe (5%) | 500 | 565 | 420:1 |
| 6 | Ne—Xe (5%) | 500 | 570 | 420:1 |
| 7 | Ne—Xe (5%) | 500 | 530 | 450:0 |
| 8* | Ne—Xe (5%) | 500 | 420 | 430:1 |
| 9* | Ne—Xe (5%) | 500 | 410 | 430:1 |
| 10* | Ne—Xe (5%) | 500 | 425 | 250:1 |

The plasma display panels of the sample Nos. 1 through 7 are plasma display panels produced according to the first embodiment described above, with phosphor particles that are different in flake diameter, thickness, profile ratio (breadth/thickness) and particle diameter by changing the firing temperature, firing time and gas flow rate, with various values being set for the concentration of activation agent to be added.

The plasma display panels of sample Nos. 1 through 7 are produced with the phosphor particles thereof being fired at progressively higher temperatures with the average flake diameter progressively increasing in this order. Average flake thickness is set to be smaller by setting the firing time shorter. Concentration of the activation agent did not had significant effect on the luminance within the range of concentrations for each color.

Dimensions of the plasma display panels of Examples and Comparative Examples were set as 20 μm for thickness of the dielectric glass layer, 0.5μm for thickness of the MgO protective layer and 0.08 mm for distance between discharge electrodes.

The plasma display panels of sample Nos. 8 through 10 are produced with similar settings as those of the plasma display panels of the sample No. 7, except for controlling the firing temperature and the firing time of the blue phosphor particles to obtain smaller profile ratio.

As for the ink composition, viscosity of the ink was controlled by combining the resin, solvent, dispersion agent or the like according to the particle size and profile ratio to make it possible to continuously spout the phosphor ink from the nozzles, and such a phosphor layer was obtained that had satisfactory shape of applied coat (capable of forming the phosphor layer also on the side surface of the barrier rib) with the viscosity of ink being in a range from 15 to 1000 centipoise.

In the process of forming the barrier ribs by the spray process, while a high luminance can be obtained by using only white alumina ($Al_2O_3$), zircon ($ZrO_2$) and spinel (MgO·$Al_2O_3$), display contrast of the panel can be improved by providing a black barrier rib material such as chromium oxide ($Cr_2O_3$), $Al_2O_3$—$TiO_2$, CoO, $MnO_2$ and $Fe_2O_3$ on top of the barrier ribs (samples Nos. 1 through 9).

Luminance was measured on the plasma display panels of samples Nos. 1 through 10, under electric discharge conditions of 150V for discharge holding voltage and 30 kHz for frequency. Results of the measurements are shown in Table 6.

Luminance was measured on each plasma display panel while illuminating in white color over the entire surface, as the emission layer of every color is set to achieve white balance while emitting light.

Ratio of luminance when the panel was illuminated to luminance when the panel was turned off was determined in a dark room to determine the display contrast.

Comparison of the results of measurements on the plasma display panels of samples Nos. 1 through 7 and the plasma display panels of samples Nos. 8 through 10 shows that greater improvement in luminance can be achieved when flake diameters of the blue phosphor particles are in a range from 0.3 to 6 $\mu$m, the flake thickness is in a range from 0.1 to 2 $\mu$m and profile ratio is in a range from 3 to 25.

In samples Nos. 9 and 10, luminance of blue light is low due to small profile ratio of the blue phosphor particles, and therefore white balance (set to color temperature of 900 degrees) is limited by the luminance of blue light even when the red and green phosphor particles have large profile ratio of 7.5 and 10, respectively, thus making no contribution to the improvement of the panel luminance. It is also shown that all of the samples Nos.1 through 9, where the black material is used on the top of the barrier ribs, have higher display contrast than the sample No. 10 where only the white material is used.

Embodiment 2

Figure 9:
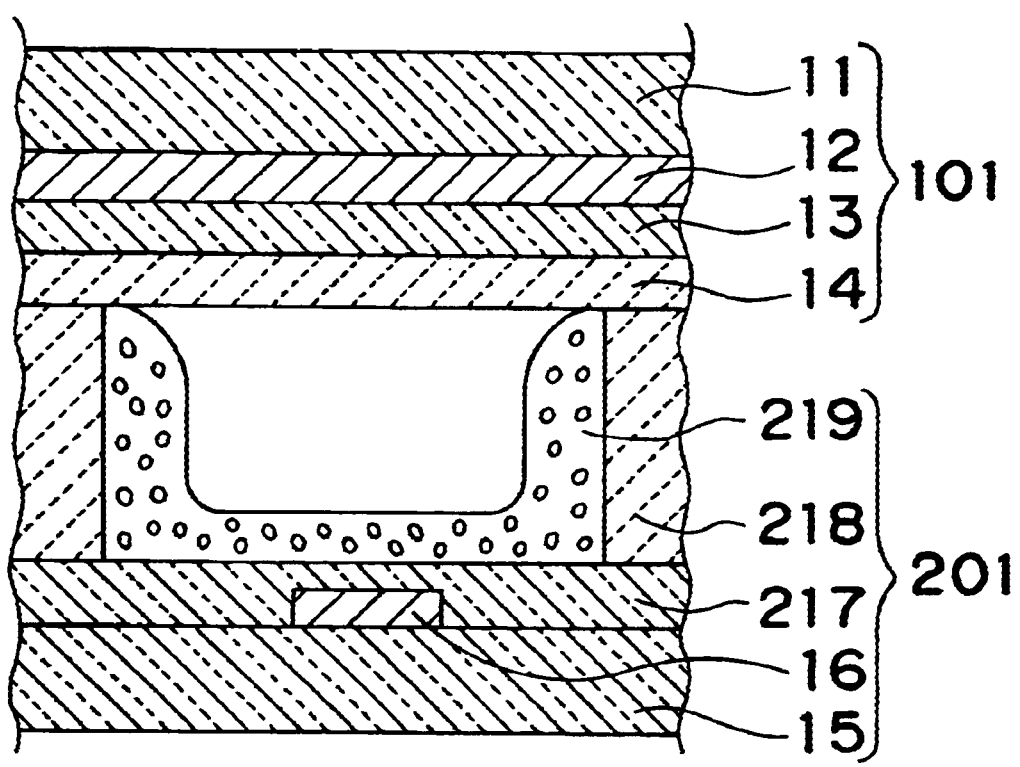
FIG. 9 is a schematic sectional view of the plasma display panel according to the second embodiment of the present invention.

FIG. 9 is a schematic sectional view of an AC discharge type plasma display panel (PDP) according to the second embodiment of the present invention. While FIG. 9 shows only one cell, the plasma display panel comprises a number of cells that emit red, green and blue light being arranged thereon.

The plasma display panel of the second embodiment comprises the front panel 101 consisting of the display electrodes 12, the dielectric glass layer 13 and the protective layer 14 being disposed on the front glass substrate (front cover plate) 11, and a back panel 201 consisting of the address electrodes 16, a visible light reflecting layer 217, barrier ribs 218 and phosphor layers 219 disposed on the back glass substrate (back plate) 15, wherein the front panel 101 and the back panel 201 are laminated with each other to form the discharge spaces between the front panel 101 and the back panel 201 that are filled with a discharge gas. Producing process will be described in detail below.

The front panel 101 is formed similarly to the first embodiment.

(Production of the Back Panel 201)

A silver electrode paste is screen-printed on the back glass substrate 15 and is then fired to form the address electrodes 16, over which the visible light reflecting layer 217 comprising $TiO_2$ particles and dielectric glass is formed by screen printing and firing, and the barrier ribs 218 made of glass are formed at predetermined intervals by repeating screen printing and then firing.

Then the phosphor layer 219 that includes one from among red phosphor particles, green phosphor particles and blue phosphor particles is formed in each of the spaces (that become discharge spaces when put together with the front panel 101) separated by the barrier ribs 218. The phosphor layer 219 is formed by continuously spouting the phosphor ink from the nozzles while scanning, and then firing at a temperature of around 500° C. in air, similarly to the first embodiment. The phosphor layer 219 may also be formed by applying the phosphor ink by screen printing process, or by making a sheet wherein the phosphor particles are dispersed and laminating the sheet.

The plasma display panel of the second embodiment was produced according to the specifications of a 40-inch class high definition television set, with the barrier ribs formed to a height of 0.1 to 0.15 mm at intervals of 0.15 to 0.3 mm, while the phosphor layers 219 are formed on the back cover surface and on side surfaces of the barrier ribs to thickness of 5 to 50 $\mu$m including phosphor particles of average particle size in a range from 0.5 to 3 $\mu$m.

(Production of the Plasma Display Panel by Laminating the Panels)

The front panel 101 and the back panel 201 made as described above are put together by using sealing glass so that the display electrodes 12 of the front panel 101 and the address electrodes 16 cross at right angles with each other, then after being fired at a temperature around 4500° C., the inside of the discharge spaces separated by the barrier ribs 218 was evacuated to a high level of vacuum ($8 \times 10^{-7}$ Torr), followed by filling of the discharge spaces with a discharge gas of predetermined composition at a predetermined pressure, thereby fabricating the plasma display panel.

In the second embodiment, the neon (Ne)-xenon (Xe) discharge gas was prepared to include 5% by volume of Xe and the sealing pressure was set in a range from 500 to 800 Torr.

(Phosphor Material)

The second embodiment employs the following materials for the phosphor materials that constitute the phosphor ink.

The blue phosphor material includes one or more of the following materials:

$Ba_{(1-x)}Eu_xMgAl_{10}O_{17}$, x=0.01 to 0.15, $Ba_{2(1-x)}Eu_{2x}Mg_2Al_{12}O_{22}$, x=0.01 to 0.15, $Ba_{2(1-x)}Eu_{2x}Mg_4Al_8O_{18}$, x=0.01 to 0.15, and $Ba_{3(1-x)}Eu_{3x}Mg_5Al_{18}O_{35}$, x=0.01 to 0.15.

As the green phosphor material and the red phosphor material, phosphor materials commonly used in the plasma display panels are employed. Specifically, the following materials may be used.

Green phosphor material: $Zn_2SiO_4:Mn^{2+}$

Red phosphor material: $Y_2O_3:Eu^{3+}$, $(Y_xGd_{1-x})BO_3:Eu^{3+}$

Figure 8A:
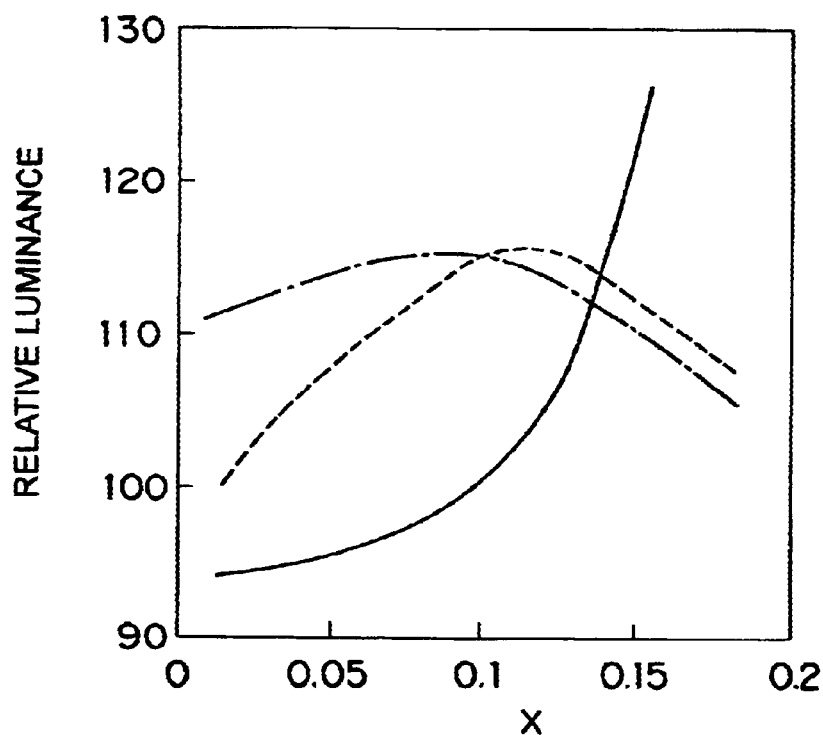
FIG. 8A is a graph showing relative luminance versus composition of the phosphor material used in the plasma display panel of the second embodiment according to the present invention.
Figure 8B:
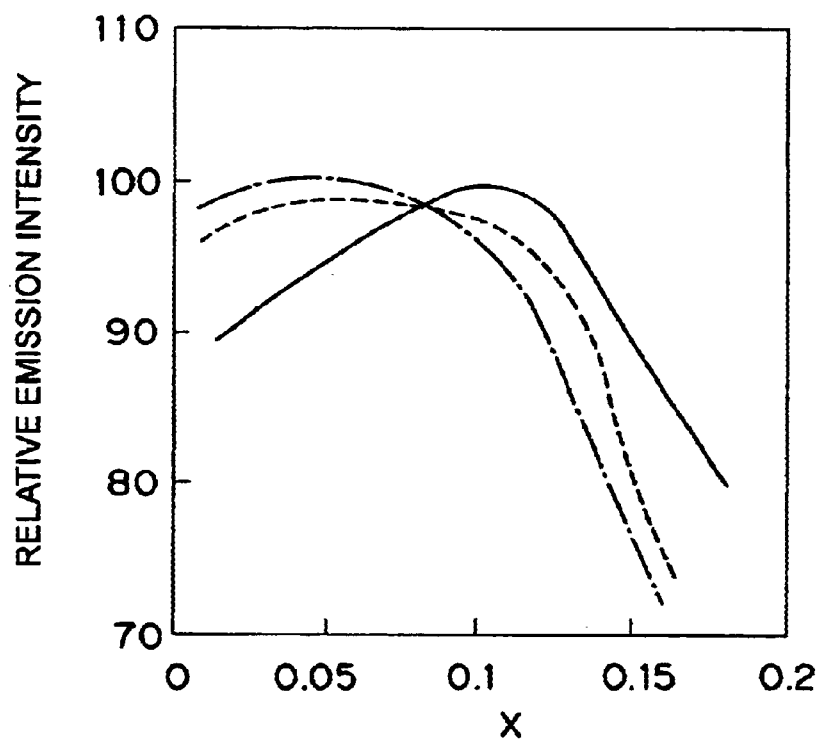
FIG. 8B is a graph showing emission intensity versus composition of the phosphor material used in the plasma display panel of the second embodiment according to the present invention.

To obtain the phosphor layer 219 having good light emitting characteristics, luminance (Y value), chromaticity (y value) and heat resistance (acid resistance) of the materials used must be taken into consideration. FIG. 8A and FIG. 8B show the relative luminance and relative emission intensity of the following blue phosphor materials before and after the firing process with the value of x being changed.

$Ba_{(1-x)}Eu_xMgAl_{10}O_{17}$ $Ba_{2(1-x)}Eu_{2x}Mg_2Al_{12}O_{22}$ $Ba_{2(1-x)}Eu_{2x}Mg_4Al_8O_{18}$ $Ba_{3(1-x)}Eu_{3x}Mg_5Al_{18}O_{35}$

Figure 7:
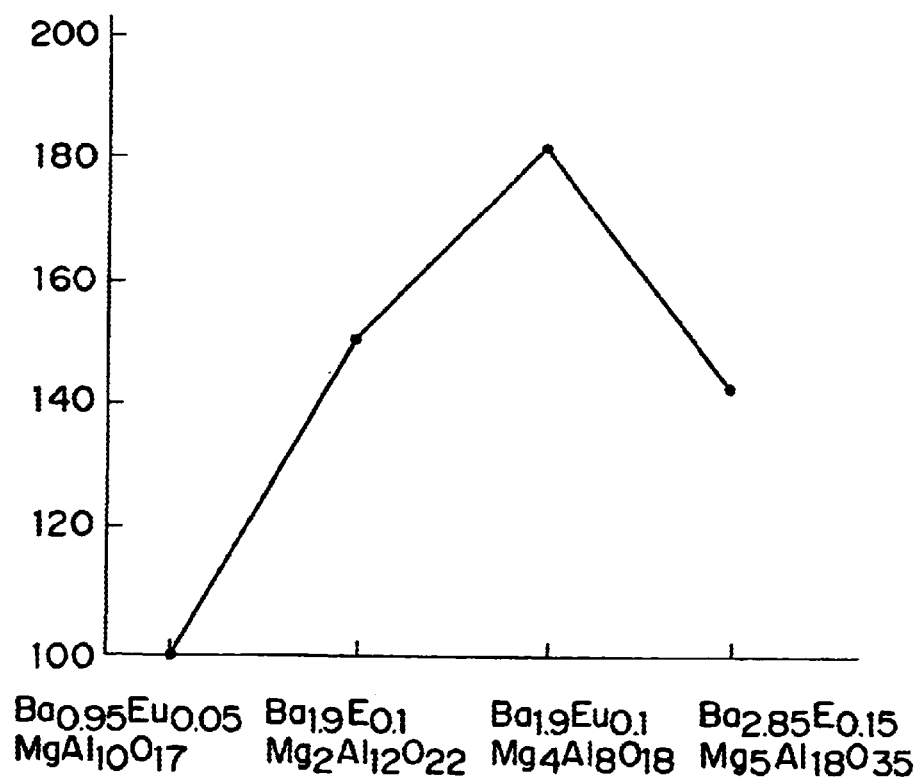
FIG. 7 is a graph showing the characteristics of a phosphor material used in a plasma display panel of the second embodiment according to the present invention.

FIG. 7 also shows the luminance of the above four kinds of blue phosphor when x=0.05 in relative values with the luminance of $Ba_{(1-x)}Eu_xMgAl_{10}O_{17}$ being set to 100.

The relative luminance and relative emission intensity in FIGS. 8A and 8B are given relative to the value of the film before firing when x=0.1 which is set to 100. Solid lines in FIGS. 8A, 8B show the characteristic of the blue phosphor materials before firing, dashed lines show the characteristic of the blue phosphor materials after firing at 520° C. in air, and alternate dot and dash lines show the characteristic after firing at 460° C. in air following the firing at 520° C.

The highest value of luminance after firing is obtained around the point of x=0.1. However, in comparison of the emission intensity (luminance/y value) that takes into account the change in y value of the chromaticity, substantially uniform values were obtained below x=0.1 after firing at 520° C., and the highest value was obtained around x=0.3 to 0.06 after another firing at 460° C.

Thus in the evaluation of the emission intensity, the emission intensity tends to decrease with firing in the region above x=0.08, while the emission intensity tends to increase with firing in the region below x=0.08, with best characteristic obtained around x=0.3 to 0.06.

This result may be explained by the tendency of $Eu^{2+}$ ions to be oxidized during firing that leads to a decrease in the emission intensity when Eu content is high. When Eu content is relatively low, on the other hand, less $Eu^{2+}$ ions are oxidized during firing while the emission intensity increases due to the removal of moisture, improvement in the crystallinity, etc. during firing.

The results described above show that the amount of Eu ions that can substitute Ba ions in the layer that contains Ba is in a range from 1 atomic % to 10 atomic %. The phosphor materials of different colors used in the second embodiment can be made as follows. Blue phosphor materials of $Ba_{(1-x)}Eu_xMgAl_{10}O_{17}$, $Ba_{2(1-x)}Eu_{2x}Mg_2Al_{12}O_{22}$, $Ba_{2(1-x)}Eu_{2x}Mg_4Al_8O_{18}$ and $Ba_{3(1-x)}Eu_{3x}Mg_5Al_{18}O_{35}$ are made by mixing barium carbonate ($BaCO_3$), magnesium carbonate ($MgCO_3$), aluminum oxide ($\alpha$-$Al_2O_3$) and europium oxide ($Eu_2O_3$) in predetermined proportion of the number of atoms.

Then the mixture is mixed with a proper amount of flux ($AlF_2$, $BaCl_2$) in a ball mill and the mixture is fired in a reducing atmosphere ($H_2$, $N_2$) at a temperature in a range from 1400 to 1650° C. for a predetermined period of time (for example, 0.5 hours).

The red phosphor material is made by mixing the raw materials of yttrium hydroxide $Y_2(OH)_3$ and europium oxide ($Eu_2O_3$) which is mixed with a proper amount of flux in a ball mill, then the mixture is fired at a temperature in a range from 1200 to 1450° C. in air for a predetermined period of time (for example, one hour). The green phosphor material is made by mixing the raw materials of zinc oxide (ZnO) and silicon oxide ($SiO_2$) in a proportion of 2: 1 by the numbers of atoms of Zn and Si. Then a predetermined amount of manganese oxide ($Mn_2O_3$) is added to the mixture, which is mixed in a ball mill, and then fired at a temperature in a range from 1200 to 1350° C. in air for a predetermined period of time (for example, 0.5 hours).

Now the second example of the second embodiment will be described below.

In Table 7, the plasma display panels (PDP) of samples No. 201, 203, 204, 206 through 208, 210 through 212, 214 through 216 and 218 through 220 are plasma display panels of Example 2 produced according to the second embodiment, while changing the value of x in the blue phosphor materials $Ba_{(1-x)}Eu_xMgAl_{10}O_{17}$, $Ba_{2(1-x)}Eu_{2x}Mg_2Al_{12}O_{22}$, $Ba_{2(1-x)}Eu_{2x}Mg_4Al_8O_{18}$, $Ba_{3(1-x)}Eu_{3x}Mg_5Al_{18}O_{35}$. The samples Nos. 202, 205, 209, 213 and 217 are plasma display panels of Comparative Examples.

TABLE 7

| Sample No. | Blue | Value of x | Red | Green | Color temperature non-adjusted luminance (cd/m²) | Color temperature-adjusted luminance (cd/m²) (9500° C.) |
|---|---|---|---|---|---|---|
| 201 | $Ba_{1-x}Eu_xMgAl_{10}O_{17}$ | 0.01 | $Y_2O_3$:Eu | $Zn_2SiO_4$:Mn | 500 | 450 |
| 202 | $Ba_{1-x}Eu_xMgAl_{10}O_{17}$ | 0.005 | $Y_2O_3$:Eu | $Zn_2SiO_4$:Mn | 460 | 400 |
| 203 | $Ba_{1-x}Eu_xMgAl_{10}O_{17}$ | 0.05 | $Y_2O_3$:Eu | $Zn_2SiO_4$:Mn | 520 | 460 |
| 204 | $Ba_{1-x}Eu_xMgAl_{10}O_{17}$ | 0.10 | $Y_2O_3$:Eu | $Zn_2SiO_4$:Mn | 550 | 350 |
| 205 | $Ba_{1-x}Eu_xMgAl_{10}O_{17}$ | 0.15 | $Y_2O_3$:Eu | $Zn_2SiO_4$:Mn | 560 | 310 |
| 206 | $Ba_{2(1-x)}Eu_{2x}Mg_2Al_{12}O_{22}$ | 0.01 | $(Y_1Gd)BO_3$:Eu | $Zn_2SiO_4$:Mn | 530 | 480 |
| 207 | $Ba_{2(1-x)}Eu_{2x}Mg_2Al_{12}O_{22}$ | 0.05 | $(Y_1Gd)BO_3$:Eu | $Zn_2SiO_4$:Mn | 550 | 495 |
| 208 | $Ba_{2(1-x)}Eu_{2x}Mg_2Al_{12}O_{22}$ | 0.10 | $(Y_1Gd)BO_3$:Eu | $Zn_2SiO_4$:Mn | 583 | 371 |
| 209 | $Ba_{2(1-x)}Eu_{2x}Mg_2Al_{12}O_{22}$ | 0.15 | $(Y_1Gd)BO_3$:Eu | $Zn_2SiO_4$:Mn | 593 | 355 |
| 210 | $Ba_{2(1-x)}Eu_{2x}Mg_4Al_8O_{18}$ | 0.01 | $(Y_1Gd)BO_3$:Eu | $Zn_2SiO_4$:Mn | 545 | 490 |
| 211 | $Ba_{2(1-x)}Eu_{2x}Mg_4Al_8O_{18}$ | 0.05 | $(Y_1Gd)BO_3$:Eu | $Zn_2SiO_4$:Mn | 567 | 510 |
| 212 | $Ba_{2(1-x)}Eu_{2x}Mg_4Al_8O_{18}$ | 0.10 | $(Y_1Gd)BO_3$:Eu | $Zn_2SiO_4$:Mn | 600 | 406 |
| 213 | $Ba_{2(1-x)}Eu_{2x}Mg_4Al_8O_{18}$ | 0.15 | $(Y_1Gd)BO_3$:Eu | $Zn_2SiO_4$:Mn | 610 | 365 |
| 214 | $Ba_{3(1-x)}Eu_{3x}Mg_5Al_{18}O_{35}$ | 0.01 | $(Y_1Gd)BO_3$:Eu | $Zn_2SiO_4$:Mn | 525 | 473 |
| 215 | $Ba_{3(1-x)}Eu_{3x}Mg_5Al_{18}O_{35}$ | 0.05 | $(Y_1Gd)BO_3$:Eu | $Zn_2SiO_4$:Mn | 546 | 491 |
| 216 | $Ba_{3(1-x)}Eu_{3x}Mg_5Al_{18}O_{35}$ | 0.10 | $(Y_1Gd)BO_3$:Eu | $Zn_2SiO_4$:Mn | 577 | 367 |
| 217 | $Ba_{3(1-x)}Eu_{3x}Mg_5Al_{18}O_{35}$ | 0.15 | $(Y_1Gd)BO_3$:Eu | $Zn_2SiO_4$:Mn | 588 | 353 |
| 218 | $Ba_{1-x}Eu_xMgAl_{10}O_{17}$ $Ba_{2(1-x)}Eu_{2x}Mg_4Al_8O_{18}$ | 0.5 | $(Y_1Gd)BO_3$:Eu | $Zn_2SiO_4$:Mn | 560 | 504 |
| 219 | $Ba_{1-x}Eu_xMgAl_{10}O_{17}$ $Ba_{2(1-x)}Eu_{2x}Mg_2Al_{12}O_{22}$ $Ba_{2(1-x)}Eu_{2x}Mg_4Al_8O_{17}$ | 0.5 | $(Y_1Gd)BO_3$:Eu | $Zn_2SiO_4$:Mn | 562 | 506 |
| 220 | $Ba_{1-x}Eu_xMgAl_{10}O_{17}$ $Ba_{2(2-x)}Eu_{2x}Mg_2Al_{12}O_{22}$ $Ba_{2(1-x)}Eu_{2x}Mg_4Al_8O_{17}$ $Ba_{3(1-x)}Eu_{3x}Mg_5Al_{18}O_{35}$ | 0.5 | $(Y_1Gd)BO_3$:Eu | $Zn_2SiO_4$:Mn | 558 | 502 |

In the production of the plasma display panels shown in Table 7, temperature of firing after forming the phosphor layer was set to 520° C. and temperature of firing conducted to laminate the panels was set to 460° C. Thickness of the phosphor layer was set to 20 $\mu$m and discharge gas pressure was set to 500 Torr (Ne—Xe 5%). Luminance of the plasma display panels was measured under electric discharge conditions of 150V for discharge holding voltage and 30 kHz for frequency.

The color temperature non-adjusted luminance given in Table 7 refers to the luminance of white display with the same signals given for all colors, and color temperature-adjusted luminance refers to the luminance when the signals of different colors are adjusted to achieve color temperature of 9500 degrees in white display.

In the plasma display panel of this example, it is necessary to adjust the white balance to improve the picture quality. Usually, since luminance of blue color is lower than the other colors, color temperature becomes around 6000 degrees when all colors are illuminated with the same signal, thus making it necessary to reduce the luminance of green and red light by regulating the signals in order to achieve color temperature of 9000 degrees that is required. For the control of color temperature, higher intensity of emission intensity of blue light is more advantageous.

Based on the evaluation of the display panel, the display panel of x=0.15 showed the highest luminance when the color temperature was not adjusted (in various blue crystal systems), while the luminance was improved by setting the value of x to 0.08 or lower after adjusting the color temperature.

Particularly remarkable improvement in luminance was obtained on the display panels where x was set to 0.05 and 0.01, while the improvement in luminance decreased in the display panel of x=0.005. This may be because the amount of $Eu^{2+}$ ions is too small resulting in lower probability of ultraviolet excitation.

Embodiment 3

Now the plasma display panel of the third embodiment of the present invention will be described below with reference to the accompanying drawing.

Figure 11:
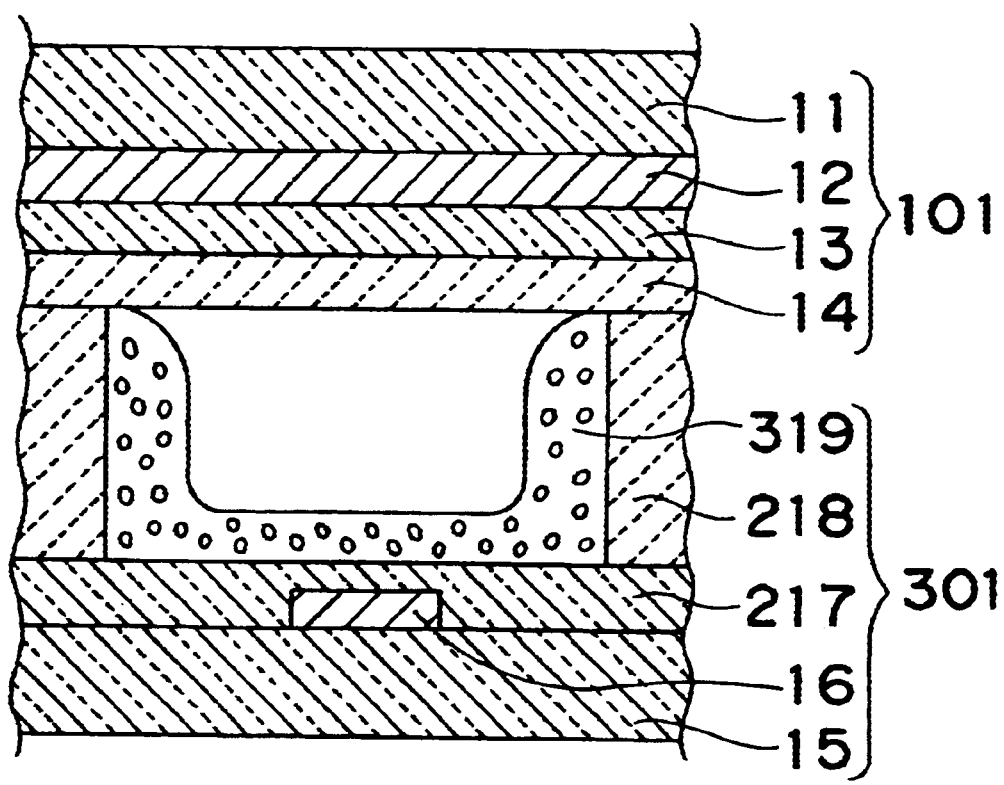
FIG. 11 is a schematic sectional view of the plasma display panel according to the third embodiment of the present invention.

FIG. 11 is a schematic sectional view showing the AC discharge type plasma display panel of the third embodiment of the present invention. The plasma display panel of the third embodiment has a constitution similar to that of the second embodiment, except that the phosphor layers 219 of the second embodiment is replaced by phosphor layers 319 that include phosphor particles and non-fluorescent white particles of smaller particle size than the phosphor particles in a predetermined proportion. The plasma display panel of the third embodiment, since the phosphor layers 319 that include the phosphor particles and the non-fluorescent white particles of smaller particle size than the phosphor particles in the predetermined proportion is used, has various excellent features to be described later. The phosphor layers 319 are formed by continuously spouting the phosphor ink from the nozzles while scanning thereby applying the phosphor ink and firing the ink, similarly to the second embodiment. While FIG. 3 shows only one cell, the plasma display panel comprises a number of cells that emit red, green and blue light being arranged thereon.

Now the phosphor layer 319 will be described in detail below.

(Phosphor Material)

In the second embodiment, the phosphor particles contained in the phosphor layers 319 may be those commonly used in the phosphor layers of the plasma display panel of the prior art. Specifically, the following materials may be used.

Blue phosphor particles: $BaMgAl_{10}O_{17}$: $Eu^{2+}$

Figure 10:
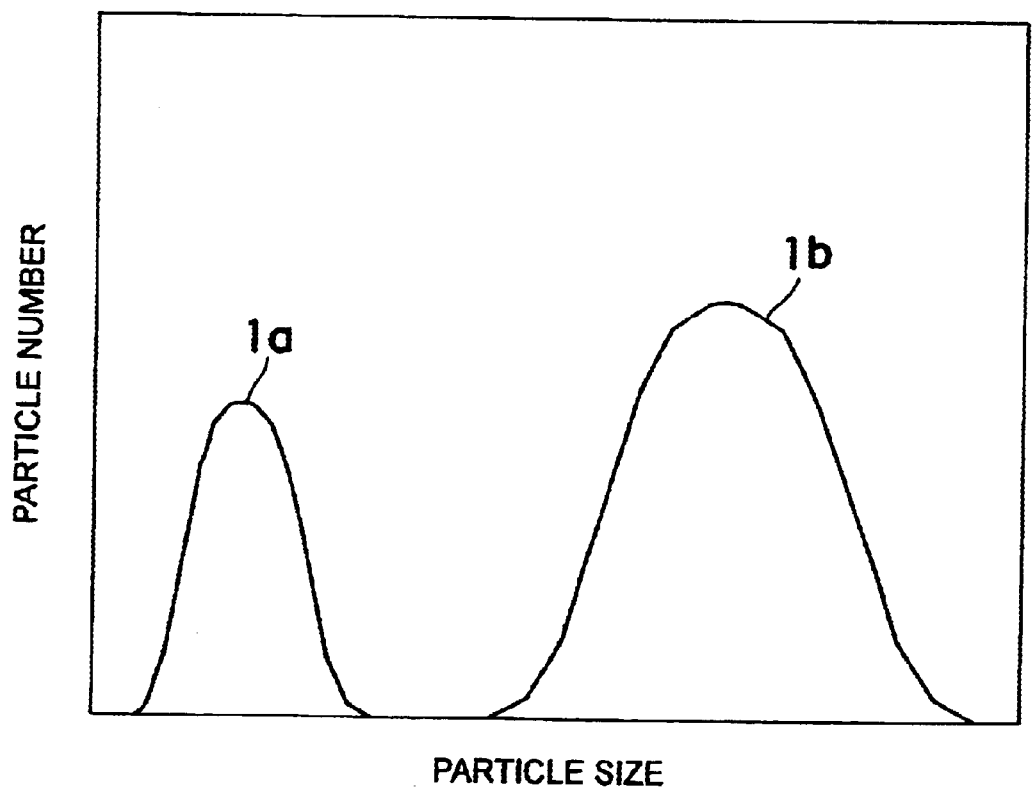
FIG. 10 is a graph showing the particle size distribution of a phosphor material powder used in a plasma display panel of the third embodiment according to the present invention.
Figure 12:
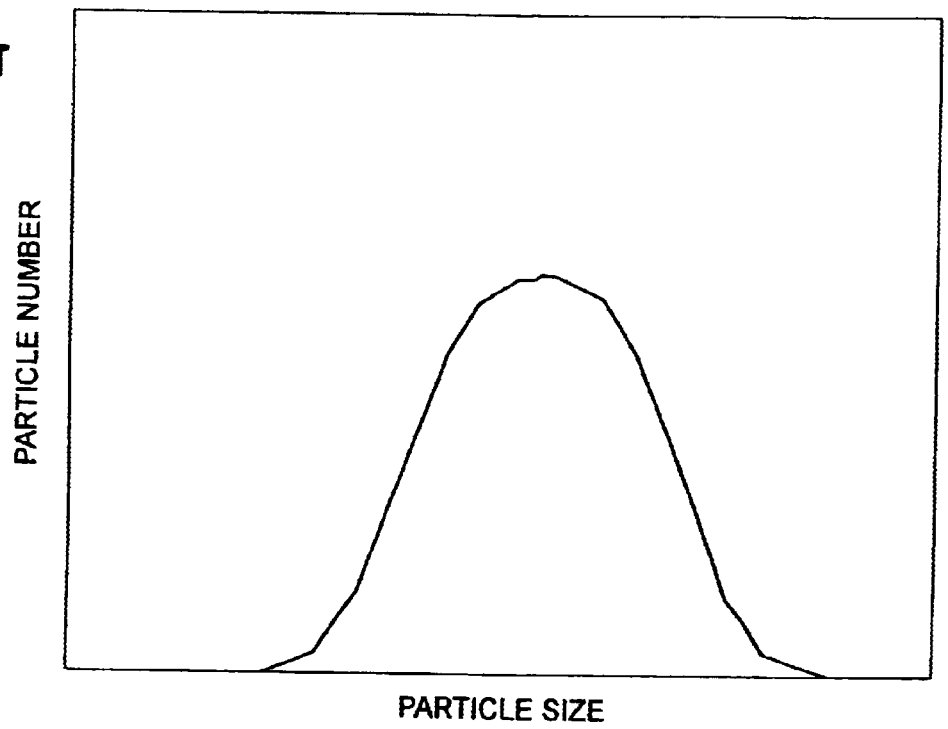
FIG. 12 is a graph showing the particle size distribution of a phosphor material powder used in the plasma display panel of the prior art.

Green phosphor particles: $Zn_2SiO_4$: $Mn^{2+}$ or $BaMgAl_{12}O_{19}$: $Mn^{2+}$ Red phosphor particles: $YBO_3$: $Eu^{3+}$, $(Y_xGd_{1-x})BO_3$: $Eu^{3+}$ To obtain the phosphor layer 319 having high light emission efficiency, it is effective to use phosphor material powder made by mixing phosphor particles and non-fluorescent white particles of smaller particle size than the phosphor particles (based on our finding). FIG. 12 schematically shows the particle size distribution of the conventional phosphor material, and FIG. 10 schematically shows the particle size distribution of the phosphor material of the third embodiment. In FIG. 10, distribution 1a of the non-fluorescent white particles is shown on the left and distribution 1b of the phosphor particles is shown on the right.

Percentage of loading of the phosphor particles in the phosphor layer generally increases as the particle sizes of the phosphor particles are decreased, leading to higher reflecting effect inside the layer when the percentage of loading is higher, thus making it possible to extract the emitted visible light effectively through the front surface of the layer.

At the same time, however, specific surface area of the particles increases as the phosphor particles become smaller, making crystal defects more likely to occur which leads to deterioration of light emission characteristic, thus forming a tradeoff relationship.

When such a phosphor material powder made by mixing the phosphor particles and the non-fluorescent white particles that have average particle size smaller than the average particle size of the phosphor particles is used, efficient emission of light is achieved with phosphor particles of relatively large particle size. Moreover, when a layer is formed with the phosphor material powder, percentage of loading is increased as the voids between the phosphor particles of relatively large particle sizes are filled with the white particles of relatively small particle sizes, resulting in improved reflectivity in the layer, thus making it possible to extract the emitted light efficiently through the front surface of the layer.

Further, it is effective to make the average particle size of the phosphor particles 1.5 μm or larger for suppressing deterioration due to crystal defects from appearing significantly, while it is effective to keep the average particle size within 5 μm for achieving a sufficient level of percentage of loading in the layer. It is also made possible to efficiently fill the voids between the phosphor particles by setting the average particle size of the non-fluorescent white particles to 1.5 μm or smaller. While the percentage of loading begins to increase when the average particle size of the non-fluorescent white particles decreases below a half that of the phosphor particles, this effect becomes remarkable when the average particle size of the non-fluorescent white particles is ⅕ that of the phosphor particles or smaller.

The effect of increasing the percentage of loading can be made greater by making the particle size distributions of the phosphor particles and the white particles steeper around the peaks. That is, when the average particle size is denoted as A, minimum particle size be dmin, maximum particle size be dmax and coefficient of particle size concentration be x (%) with x being calculated as x=100/(A+dmax−dmin), then the distributions can be made clearer by increasing the coefficient of particle size concentration of the distributions, thus making it easier to fill the voids between the phosphor particles with the non-fluorescent white particles. While this effect appears when the coefficient of particle size concentration increases past around 50%, the effect becomes remarkable when the coefficient of particle size concentration is 80% or higher.

While the phosphor layer of the plasma display panel generally employs the phosphor particles individually, in such a case it is effective in increasing the emission efficiency to use the flaky phosphor particles as shown in the first and the second embodiments. However, when the phosphor particles and the non-fluorescent white particles are used together as in the third embodiment, remarkable effect of increasing the percentage of loading can be achieved by making the particles in spherical or near spherical shape.

In the phosphor layer 319 of the third embodiment, the reflectivity approaches a plateau when the thickness reaches 50 μm or more, and the luminance decreased due to low coverage ratio when the thickness was less than 5 μm. Therefore thickness of the phosphor layer 319 is preferably in a range from 5 μm to 50 μm inclusive.

The phosphor particles of different colors used in the third embodiment are made as described below. The blue phosphor particles are made by, first, mixing the raw materials of barium carbonate ($BaCO_3$), magnesium carbonate ($MgCO_3$) and aluminum oxide ($\alpha$-$Al_2O_3$) in a proportion of 1: 1: 10 by the numbers of atoms of Ba, Mg and Al.

Then a predetermined amount of europium oxide ($Eu_2O_3$) is added to the mixture. Then the mixture is mixed with a proper amount of flux ($AlF_2$, $BaCl_2$) in a ball mill and the mixture is fired in a weakly reducing atmosphere ($H_2$, $N_2$) at a temperature in a range from 1400 to 1650° C. for a predetermined period of time (for example, 0.5 hours), before being sieved.

The red phosphor particles are made by mixing the raw materials of yttrium hydroxide $Y_2(OH)_3$ and boric acid ($H_3BO_3$) in a proportion of 1: 1 by the numbers of atoms of Y and B.

Then a predetermined amount of europium oxide ($Eu_2O_3$) is added to the mixture, which is mixed with a proper amount of flux in a ball mill. After firing the mixture at a temperature in a range from 1200 to 1450° C. in air for a predetermined period of time (for example, one hour), the fired powder is sieved.

The green phosphor particles are made by mixing the raw materials of zinc oxide (ZnO) and silicon oxide ($SiO_2$) in a proportion of 2: 1 by the numbers of atoms of Zn and Si. Then a predetermined amount of manganese oxide ($Mn_2O_3$) is added to the mixture, which is then mixed in a ball mill. After firing the mixture at a temperature in a range from 1200 to 1350° C. in air for a predetermined period of time (for example, 0.5 hours), the fired mixture is sieved.

The desired mixed phosphor material powder is obtained by mixing the phosphor particles of different colors, that have the predetermined average particle size that have been sieved in the processes described above, with the non-fluorescent white particles. The coefficient of particle size concentration can also be controlled in the above process.

Spherical or near spherical phosphor particles can be made by using spherical $\alpha$-$Al_2O_3$ particles as the material for the blue phosphor particles and spherical $SiO_2$ particles as the material for the green phosphor particles. Spherical blue phosphor particles can also be made by the process described in, for example, Unexamined Patent Publication (Kokai) Nos. 62201989 and 7-268319.

Now the third example according to the third embodiment will be described below.

TABLE 8

Panel constitution and characteristics (phosphor layer thickness: 20 μm, discharge gas pressure: 500 Torr)

| | Blue phosphor material ($BaMgAl_{10}O_{17}$: Eu + $TiO_2$) | | | | | Green phosphor material ($ZnSiO_4$: Mn + $TiO_2$) | | | | |
|---|---|---|---|---|---|---|---|---|---|---|
| Sample No. | Average phosphor particles size (μm) | Average $TiO_2$ particle size (μm) | Coefficient of particle size (%) Phosphor | $TiO_2$ | Phosphor particles shape | Average phosphor particles size (μm) | Average $TiO_2$ particle size (μm) | Coefficient of particle size (%) Phosphor | $TiO_2$ | Phosphor particles shape |
| 301 | 6.0 | 0.4 | 60 | 60 | Spherical | 6.0 | 0.4 | 60 | 60 | Spherical |
| 302 | 3.5 | 2.0 | 60 | 60 | Spherical | 3.5 | 2.0 | 60 | 60 | Spherical |
| 303 | 3.5 | 1.2 | 60 | 60 | Spherical | 3.5 | 1.2 | 60 | 60 | Spherical |
| 304 | 3.5 | 0.4 | 40 | 40 | Spherical | 3.5 | 0.4 | 40 | 40 | Spherical |
| 305 | 3.5 | 0.4 | 60 | 60 | Spherical | 3.5 | 0.4 | 60 | 60 | Spherical |
| 306 | 3.5 | 0.4 | 85 | 85 | Spherical | 3.5 | 0.4 | 85 | 85 | Spherical |
| 307 | 3.5 | 0.4 | 85 | 85 | Spherical | 3.5 | 0.4 | 85 | 85 | Spherical |
| 308 | 1.0 | 0.4 | 85 | 85 | Spherical | 1.0 | 0.4 | 85 | 85 | Spherical |
| 309 | 6.0 | | 40 | 40 | Spherical | 6.0 | | 40 | 40 | Spherical |
| 310 | 3.5 | | 40 | 40 | Spherical | 3.5 | | 40 | 40 | Spherical |
| 311 | 3.5 | | 40 | 40 | Spherical | 3.5 | | 40 | 40 | Spherical |
| 312 | 3.5 | | 85 | 85 | Spherical | 3.5 | | 85 | 85 | Spherical |
| 313 | 1.0 | | 40 | 40 | Spherical | 1.0 | | 40 | 40 | Spherical |

| | Red phosphor material ($YBO_3$: Eu + $TiO_2$) | | | | | |
|---|---|---|---|---|---|---|
| Sample No. | Average phosphor particles size (μm) | Average $TiO_2$ particle size (μm) | Coefficient of particle size (%) Phosphor | $TiO_2$ | Phosphor particles shape | Luminance |
| 301 | 6.0 | 0.4 | 60 | 60 | Spherical | 395 |
| 302 | 3.5 | 2.0 | 60 | 60 | Spherical | 425 |
| 303 | 3.5 | 1.2 | 60 | 60 | Spherical | 510 |
| 304 | 3.5 | 0.4 | 40 | 40 | Spherical | 525 |
| 305 | 3.5 | 0.4 | 60 | 60 | Spherical | 560 |
| 306 | 3.5 | 0.4 | 85 | 85 | Spherical | 590 |
| 307 | 3.5 | 0.4 | 85 | 85 | Spherical | 545 |
| 308 | 1.0 | 0.4 | 85 | 85 | Spherical | 410 |
| 309 | 6.0 | | 40 | 40 | Spherical | 360 |
| 310 | 3.5 | | 40 | 40 | Spherical | 405 |
| 311 | 3.5 | | 40 | 40 | Spherical | 410 |
| 312 | 3.5 | | 85 | 85 | Spherical | 380 |
| 313 | 1.0 | | 40 | 40 | Spherical | 350 |

The plasma display panels of samples Nos. 301 through 308 shown in Table 8 are the plasma display panel of this example of the present invention produced according to the third embodiment described above, while changing the particle size, coefficient of particle size concentration or particle shape. The particle size distribution is determined by the coal tar counter method wherein the number of particles falling in an interval of 0.1 μm is converted to the proportion to the total number of particles. The plasma display panels of samples Nos. 309 through 313 are the plasma display panels of Comparative Examples.

Spherical $TiO_2$ particles were used as the non-fluorescent white particles, with the proportion of the number of phosphor particles to the number of $TiO_2$ particles set to 2: 1 for every color.

In the plasma display panels described above, thickness of the phosphor layer was set to 20 μm and discharge gas pressure was set to 500 Torr. Luminance of the plasma display panels was measured under electric discharge conditions of 150V for discharge holding voltage and 30 kHz for frequency.

Luminance was measured on each plasma display panel while illuminating in white color over the entire surface, as the phosphor layer of every color is set to achieve white balance while emitting light.

As will be clear by comparing the luminance between the samples Nos. 301 through 308 and the samples Nos. 309 through 313, it is verified that the luminance can be increased by mixing the non-fluorescent white particles having particle sizes smaller than the phosphor particles.

In sample No.301 where phosphor particles of which average particle size was relatively large were used, sufficient coverage ratio cannot be obtained with a film of 20 μm in thickness and therefore resulted in only small improvement in luminance. In sample No.308 where phosphor particles of which average particle size was relatively small were used, the phosphor included much crystal defects and therefore resulted in only small improvement in luminance.

With respect to the coefficient of particle size concentration, as demonstrated by the samples Nos. 304 through 306, 311 and 312, luminance increases as the coefficient of particle size concentration becomes lower in Comparative Examples (Nos. 311, 312), while luminance increases as the coefficient of particle size concentration becomes higher in this Example (Nos. 304 through 306). This may be because, in the constitution of this Example, increasing the coefficient of particle size concentration causes the $TiO_2$ particles to fill the voids between the phosphor particles more densely thus resulting in improved reflectivity of the film. In the conventional constitution, on the other hand, it is considered that since the particles approach uniform particle sizes when the coefficient of particle size concentration increases, voids between the phosphor particles increase resulting in lower reflectivity of the film.

Although significant difference in luminance was not found in the constitution of Comparative Examples (Nos. 310, 311) with different shapes of the phosphor particles, spherical phosphor particles showed higher luminance in this Example (Nos. 306, 307). Supposedly this is because spherical shape of the phosphor particles causes the voids between the phosphor particles to be densely filled with the $TiO_2$ particles which results in increased reflectivity of the film, compared to flaky phosphor particles.

Although $Zn_2SiO_4:Mn^{2+}$ was used for the green phosphor particles and $YBO_3: Eu^{3+}$ is used for the red phosphor particles in this Example, similar effect of improving the luminance was obtained by using $BaMgAl_{12}O_{19}: Mn^{2+}$ and $(Y_xGd_{1-x})BO_3: Eu^{3+}$, too.

Improvement in the luminance was verified also when $Al_2O_3$ was used as the non-fluorescent white particles, although luminance decreased by several percentage points due to lower reflectivity of the $Al_2O_3$ compared to $TiO_2$.

Embodiment 4

Figure 14:
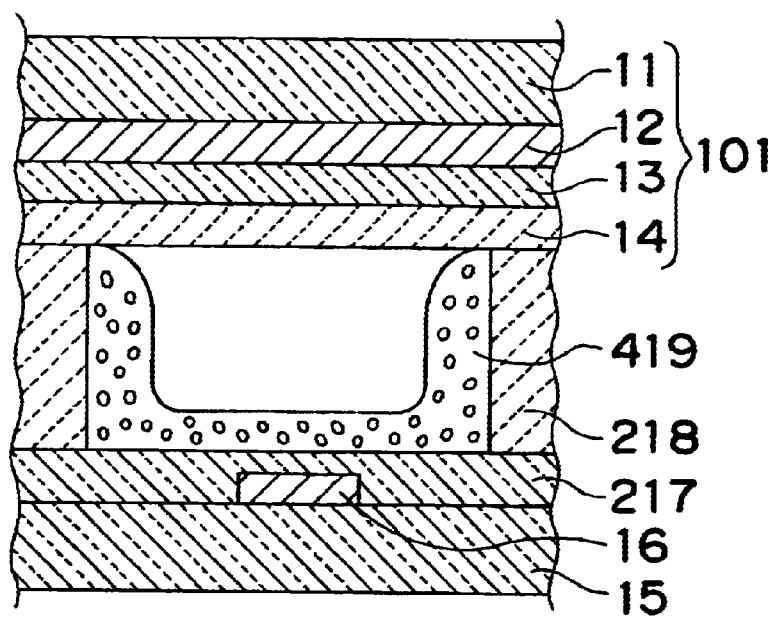
FIG. 14 is a schematic sectional view of the plasma display panel according to the fourth embodiment of the present invention.

The plasma display panel of the fourth embodiment of the present invention will be described below. FIG. 14 is a schematic sectional view of an AC discharge type plasma display panel according to the fourth embodiment of the present invention. While FIG. 14 shows only one cell, the plasma display panel comprises a number of cells that emit red, green and blue light being arranged thereon.

The plasma display panel of the fourth embodiment has a constitution similar to that of the second embodiment, except that the phosphor layers 219 of the second embodiment are replaced by phosphor layers 419 that includes phosphor material powder comprising phosphor particles having predetermined particle size distribution. The plasma display panel of the fourth embodiment, being constituted by using the phosphor layers 419, has various excellent features to be described later. The phosphor layers 419 are formed by continuously spouting the phosphor ink from the nozzles while scanning thereby applying the phosphor ink and firing the ink, similarly to the second embodiment.

(Phosphor Material of the Fourth Embodiment)

In the fourth embodiment, the phosphor material commonly used in the phosphor layer of the plasma display panel may be used. Specifically, the following materials may be used.

Blue phosphor material: $BaMgAl_{10}O_{17}: Eu^{2+}$

Green phosphor material: $Zn_2SiO_4: Mn^{2+}$ or $BaAl_{12}O_{19}: Mn^{2+}$

Red phosphor material: $YBO_3: Eu^{3+}$, $(Y_xGd_{1-x})BO_3: Eu^{3+}$

Figure 13:
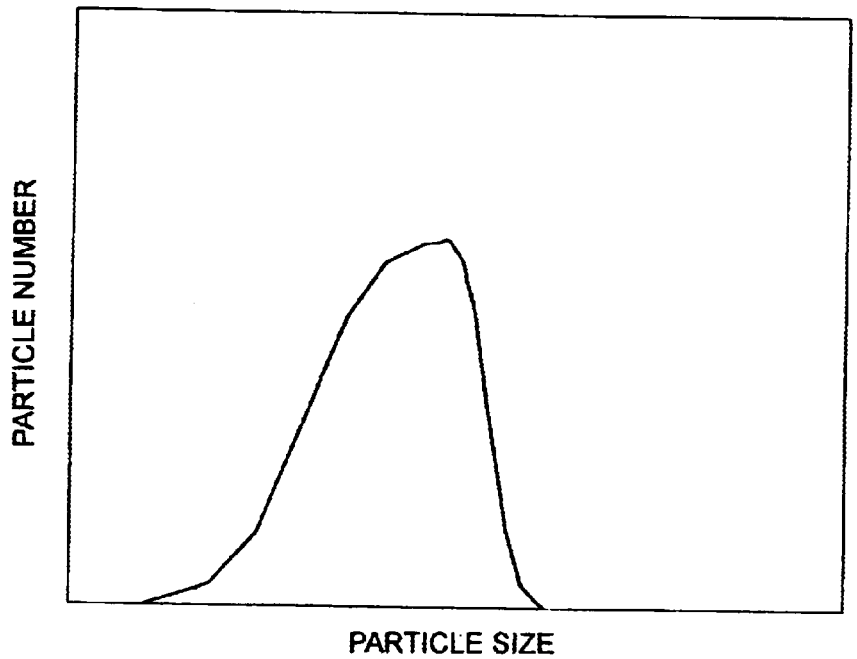
FIG. 13 is a graph showing the particle size distribution of a phosphor material powder used in a plasma display panel of the fourth embodiment according to the present invention.
Figure 15:
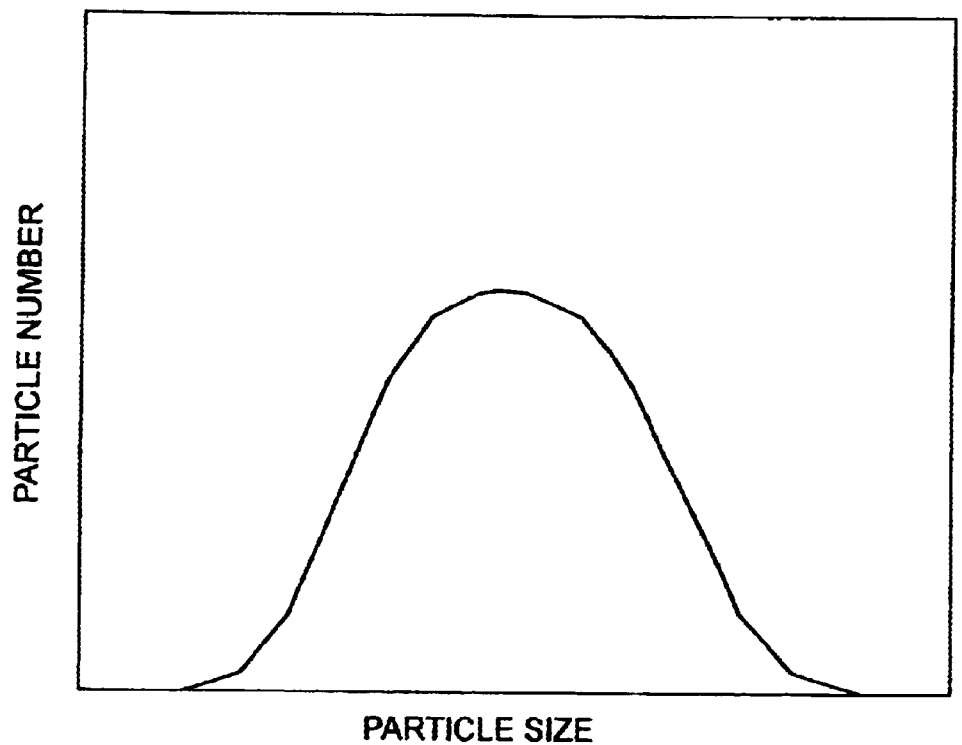
FIG. 15 is a graph showing the particle size distribution of the phosphor material powder used in the plasma display panel of the prior art.

To obtain the phosphor layer 419 having high light emission efficiency, it is effective to employ such a constitution as, with the peak particle size in the particle size distribution of the phosphor material powder being denoted as Dp, number of phosphor particles greater than Dp is less than the number of phosphor particles smaller than Dp. FIG. 15 schematically shows the particle size distribution of the conventional phosphor material powder, and FIG. 13 schematically shows the particle size distribution of the phosphor material powder of the fourth embodiment.

In the phosphor layer in general, higher percentage of loading of the phosphor particles leads to higher reflecting effect inside the layer and makes it possible to extract the emitted visible light effectively through the front surface of the layer.

Therefore, the phosphor material powder of the fourth embodiment is made such as the proportion of relatively small phosphor particles is increased and the proportion of relatively large phosphor particles is decreased, so that voids between the large phosphor particles are filled with the small phosphor particles to increase the percentage of loading, resulting in higher reflecting effect inside the layer, thus making it possible to extract the emitted visible light effectively through the front surface of the layer.

In this case, with the peak particle size in the particle size distribution being denoted as Dp, the percentage of loading can be increased by setting the number of phosphor particles greater than Dp to 70% or less of the number of phosphor particles smaller than Dp, and the percentage of loading is increased further by setting the proportion to 50% or lower.

Moreover, with Dp representing the peak particle size, Dmin the minimum particle size and Dmax the maximum particle size, similar effect is obtained also by setting Dmax–

Dp less than Dp−Dmin. Even higher percentage of loading can be achieved by setting the value of Dmax−Dp less than 0.5 times the value of Dp−Dmin, and further higher by setting the former less than 0.3 times the latter.

It is preferable to set the average particle size to 1.5 μm or larger for suppressing deterioration due to crystal defects from appearing significantly, while it is preferable to set the average particle size to 5 μm or smaller for achieving a sufficient level of coverage in the phosphor layer.

In the case of such a particle size distribution, unlike the first and second embodiments, remarkable effect of increasing the percentage of loading can be achieved by making the particles in spherical or near spherical shape, rather than flaky shape.

The reflectivity approached a plateau when the thickness of the phosphor layer, where such phosphor material powders as described above was used, exceeded 50 μm; showing no significant difference in luminance from the phosphor of the conventional particle size distribution. When the thickness was less than 5 μm, on the other hand, the luminance decreased due to low coverage ratio.

The phosphor materials of different colors used in the fourth embodiment are made as described below. The blue phosphor particles are made by, first, mixing the raw materials of barium carbonate ($BaCO_3$), magnesium carbonate ($MgCO_3$) and aluminum-oxide ($\alpha$-$Al_2O_3$) in a proportion of 1: 1: 10 by the numbers of atoms of Ba, Mg and Al.

Then a predetermined amount of europium oxide ($Eu_2O_3$) is added to the mixture. The mixture is mixed with a proper amount of flux ($AlF_2$, $BaCl_2$) in a ball mill and the mixture is fired in a weakly reducing atmosphere ($H_2$, $N_2$) at a temperature in a range from 1400 to 1650° C. for a predetermined period of time (for example, 0.5 hours).

The red phosphor particles are made by mixing the raw materials of yttrium hydroxide $Y_2(OH)_3$ and boric acid ($H_3BO_3$) in a proportion of 1: 1 by the numbers of atoms of Y and B. Then a predetermined amount of europium oxide ($Eu_2O_3$) is added to the mixture, which is mixed with a proper amount of flux in a ball mill and fired at a temperature in a range from 1200 to 1450° C. in air for a predetermined period of time (for example, one hour).

The green phosphor particles are made by mixing the raw materials of zinc oxide (ZnO) and silicon oxide ($SiO_2$) in a proportion of 2: 1 by the numbers of atoms of Zn and Si. Then a predetermined amount of manganese oxide ($Mn_2O_3$) is added to the mixture and then mixed in a ball mill. The mixture is fired at a temperature in a range from 1200 to 1350° C. in air for a predetermined period of time (for example, 0.5 hours).

The phosphor material powder having the desired particle size distribution is obtained by sieving the phosphor particles made in the processes described above.

Spherical or near spherical phosphor particles of the blue phosphor and the green phosphor can be made by making $\alpha$-$Al_2O_3$ particles used as the material for the blue phosphor particles and $SiO_2$ particles used as the material for the green phosphor particles in spherical shape. Spherical blue phosphor particles can also be made by the process described in, for example, Unexamined Patent Publication (Kokai) Nos. 62-201989 and 7-268319.

Now the fourth example according to the fourth embodiment will be described below.

TABLE 9

Panel constitution and characteristics (phosphor layer thickness: 20 μm, discharge gas pressure: 500 Torr)

| | Blue phosphor material ($BaMgAl_{10}O_{17}$: Eu) | | | | | | Green phosphor material ($Zn_2SiO_4$: Mn) | | | | | |
|---|---|---|---|---|---|---|---|---|---|---|---|---|
| | Dp (μm) | Proportion of particle size (%) | | Dmin (μm) | Dmax (μm) | Phosphor particles shape | Dp (μm) | Proportion of particle size (%) | | Dmin (μm) | Dmax (μm) | Phosphor particles shape |
| Sample No. | | Dp or greater | Dp or smaller | | | | | Dp or greater | Dp or smaller | | | |
| 401 | 6.0 | 30 | 70 | 1.5 | 8.0 | Spherical | 6.0 | 30 | 70 | 1.5 | 8.0 | Spherical |
| 402 | 3.5 | 30 | 70 | 0.5 | 5.0 | Spherical | 3.5 | 30 | 70 | 0.5 | 5.0 | Spherical |
| 403 | 3.5 | 30 | 70 | 0.5 | 4.0 | Spherical | 3.5 | 30 | 70 | 0.5 | 4.0 | Spherical |
| 404 | 3.5 | 40 | 60 | 0.5 | 4.0 | Spherical | 3.5 | 40 | 60 | 0.5 | 4.0 | Spherical |
| 405 | 3.5 | 30 | 70 | 0.5 | 4.0 | Spherical | 3.5 | 30 | 70 | 0.5 | 4.0 | Spherical |
| 406 | 1.0 | 30 | 70 | 0.3 | 1.5 | Spherical | 1.0 | 30 | 70 | 0.3 | 1.5 | Spherical |
| 407 | 6.0 | 50 | 50 | 1.5 | 13.0 | Spherical | 6.0 | 50 | 50 | 1.5 | 13.0 | Spherical |
| 408 | 3.5 | 50 | 50 | 0.5 | 8.0 | Spherical | 3.5 | 50 | 50 | 0.5 | 8.0 | Spherical |
| 409 | 3.5 | 50 | 50 | 0.5 | 8.0 | Spherical | 3.5 | 50 | 50 | 0.5 | 8.0 | Spherical |
| 410 | 1.0 | 50 | 50 | 0.3 | 4.0 | Spherical | 1.0 | 50 | 50 | 0.3 | 4.0 | Spherical |

| | Red phosphor material ($YBO_3$: Eu) | | | | | | |
|---|---|---|---|---|---|---|---|
| Sample No. | Dp (μm) | Proportion of particles size (%) | | Dmin (μm) | Dmax (μm) | Phosphor particles shape | Luminance |
| | | Dp or greater | Dp or smaller | | | | |
| 401 | 6.0 | 30 | 70 | 1.5 | 8.0 | | 395 |
| 402 | 3.5 | 30 | 70 | 0.5 | 5.0 | | 510 |
| 403 | 3.5 | 30 | 70 | 0.5 | 4.0 | | 560 |
| 404 | 3.5 | 40 | 60 | 0.5 | 4.0 | | 525 |
| 405 | 3.5 | 30 | 70 | 0.5 | 4.0 | | 500 |
| 406 | 1.0 | 30 | 70 | 0.3 | 1.5 | | 410 |
| 407 | 6.0 | 50 | 50 | 1.5 | 13.0 | | 360 |
| 408 | 3.5 | 50 | 50 | 0.5 | 8.0 | | 375 |
| 409 | 3.5 | 50 | 50 | 0.5 | 8.0 | | 380 |
| 410 | 1.0 | 50 | 50 | 0.3 | 4.0 | | 350 |

The plasma display panels of samples Nos. 401 through 406 are the plasma display panels of this example produced according to the fourth embodiment described above, while changing the peak particle size Dp, minimum particle size Dmin, maximum particle size Dmax, particle size distribution and phosphor particles shape.

The particle size distribution shown in Table 9 is determined by the coal tar counter method wherein the number of particles falling in an interval of 0.1 $\mu$m is converted to the proportion to the total number of particles. The plasma display panels of samples Nos. 407 through 410 are plasma display panels of Comparative Examples.

In the plasma display panels shown in Table 9, thickness of the phosphor layer was set to 20 $\mu$m and discharge gas pressure was set to 500 Torr. Luminance of the plasma display panels was measured under electric discharge conditions of 150V for discharge holding voltage and 30 kHz for frequency.

Luminance was measured on each plasma display panel while illuminating in white color over the entire surface, as the phosphor layer of every color is set to achieve white balance while emitting light.

As will be clear by comparing the luminance between the samples Nos. 401 through 406 and the samples Nos. 407 through 410, it is verified that the luminance can be increased by setting the number of phosphor particles that are greater than Dp less than the number of phosphor particles that are smaller than Dp, or setting the value of Dmax–Dp less than the value of Dp–Dmin. This may be because, in the constitution of this example, voids between the phosphor particles of relatively large particle sizes are filled densely with the phosphor particles of smaller particle sizes, resulting in higher reflectivity of the phosphor layer.

Comparison of samples No. 403 and No. 404 shows that the luminance can be increased more remarkably by decreasing the proportion of the number of phosphor particles greater than Dp to the number of phosphor particles smaller than Dp from within 70% to 50%.

Comparison of samples No. 402 and No. 403 also shows that improvement in the luminance becomes remarkable by setting the value of Dmax–Dp less than 0.5 times the value of Dp–Dmin, and further higher by setting the former less than 0.3 times the latter.

In sample No. 401, improvement in the luminance was small because the peak particle size was relatively large and sufficient coverage ratio could not be obtained with a film of 20 mm in thickness. In sample No. 406, because the peak particle size was relatively small, the phosphor included much crystal defects and therefore resulted in small improvement in luminance.

Although significant difference of luminance was not observed in the constitution of Comparative Examples (Nos. 8, 9) with different shapes of the phosphor particles, spherical phosphor particles showed higher luminance in this Example (Nos. 3, 5). Supposedly this is because spherical shape of the phosphor particles causes the voids between the phosphor particles to be densely filled with the phosphor particles of relatively small particle size resulting in increased reflectivity of the film, compared to flaky phosphor particles.

Although $Zn_2SiO_4:Mn^{2+}$ was used for the green phosphor particles and $YBO_3: Eu^{3+}$ was used for the red phosphor particles in this Example, similar effect of improving the luminance was obtained by using $BaAl_{12}O_{19}: Mn^{2+}$ and $(Y_xGd_{1-x})BO_3: Eu^{3+}$, too.

Embodiment 5

The plasma display panel of the fifth embodiment of the present invention will be described below.

Figure 20:
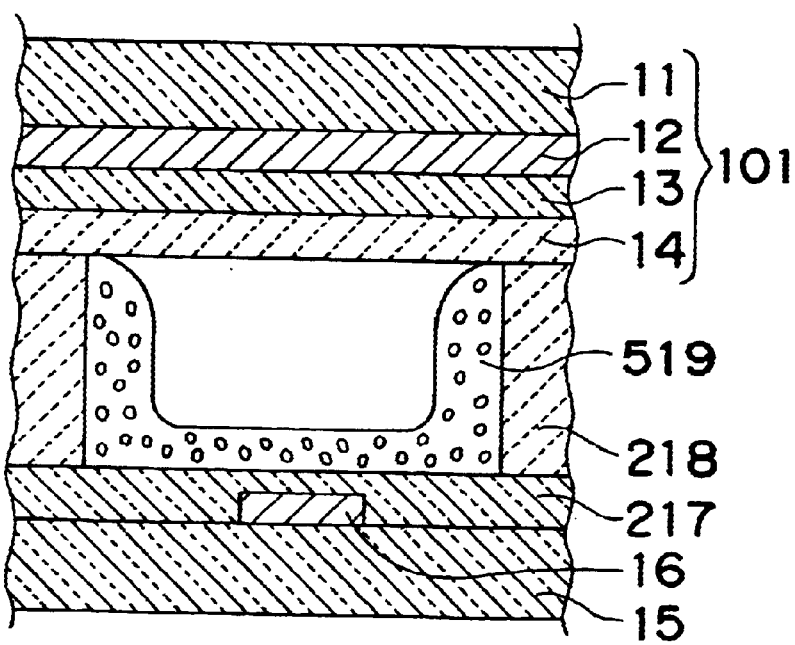
FIG. 20 is a schematic sectional view of the plasma display panel according to the fifth embodiment of the present invention.

FIG. 20 is a schematic sectional view of an AC discharge type plasma display panel according to the fifth embodiment. While FIG. 20 shows only one cell, the plasma display panel comprises a number of cells that emit red, green and blue light being arranged thereon.

The plasma display panel of the fifth embodiment has a constitution similar to that of the second embodiment, except that the phosphor layers 219 of the second embodiment are replaced by phosphor layers 519 that include a phosphor material having predetermined composition. The plasma display panel of the fifth embodiment, being constituted by using the phosphor layers 519 that include the phosphor material of the predetermined composition which will be described in detail later has various excellent features to be described later. The phosphor layers 519 are formed by continuously spouting the phosphor ink from the nozzles while scanning thereby applying the phosphor ink and firing the ink, similarly to the second embodiment. Although FIG. 20 shows only one cell, the plasma display panel comprises a number of cells that emit red, green and blue light being arranged thereon.

Now the phosphor layer 519 will be described in detail below.

(Phosphor Material)

The phosphor material commonly used in the phosphor layer of the plasma display panel of the prior art may be used except for the blue phosphor. Specifically, the following materials may be used.

Green phosphor material: $Zn_2SiO_4$: Mn or $BaAl_{12}O_{19}$: Mn

Red phosphor material: $YBO_3$: Eu or $(Y_xGd_{1-x})BO_3$: Eu

Composition of $Ba_{(1-x-y)}Sr_yMg_aAl_bO_c$: $Eu_x$ was used for the blue phosphor.

Figure 16A:
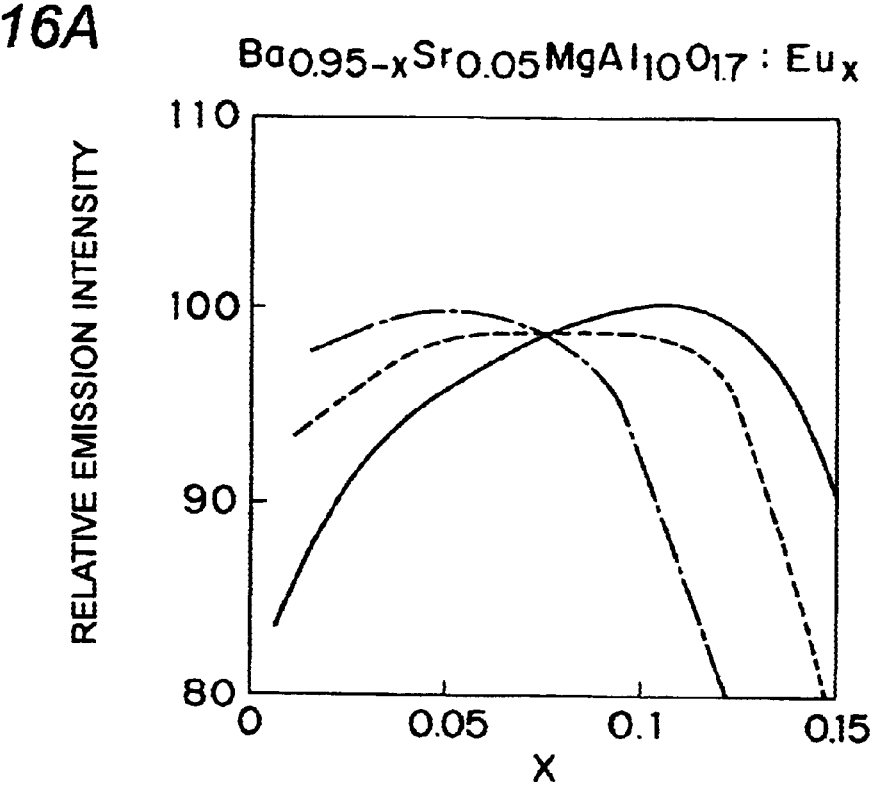
FIG. 16A is a graph showing the heat resistance characteristic of a phosphor material $(Ba_{0.95-x}Sr_{0.05}MgAl_{10}O_{17}:Eu_x)$ used in a plasma display panel of the fifth embodiment according to the present invention.
Figure 16B:
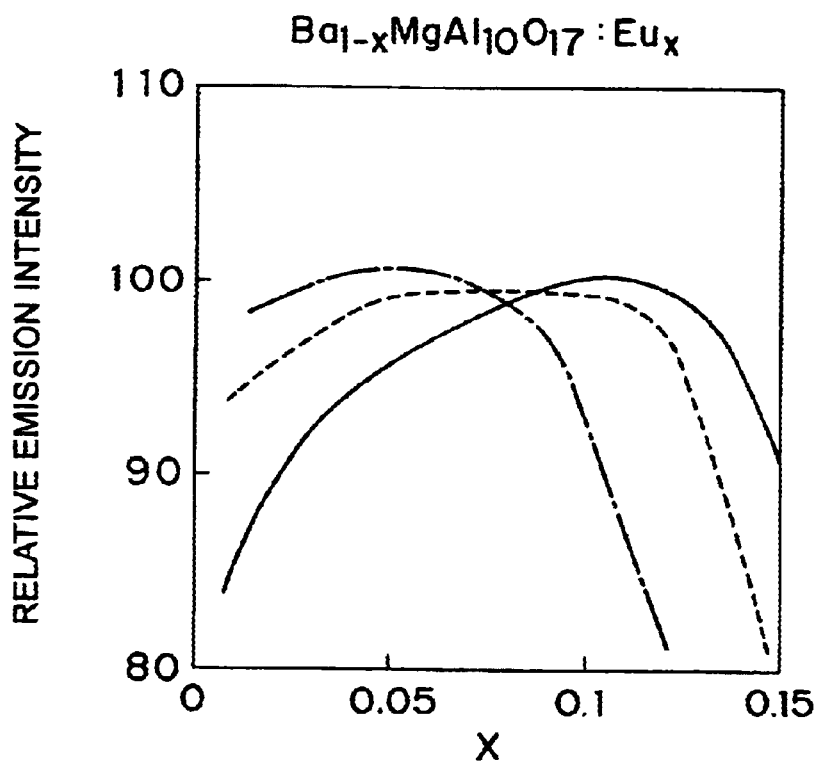
FIG. 16B is a graph showing the heat resistance characteristic of a phosphor material $Ba_{(1-x)}MgAl_{10}O_{17}:Eu_x$ used in the plasma display panel of the fifth embodiment according to the present invention.

To obtain the phosphor layer having good light emitting characteristics, heat resistance of the raw materials used to make these phosphor materials must be studied. FIG. 16A and FIG. 16B show the relative emission intensity of the phosphor materials of $Ba_{0.95-x}Sr_{0.05}MgAl_{10}O_{17}$: $Eu_x$ and $Ba_{1-x}MgAl_{10}O_{17}$: $Eu_x$ before and after the firing process when the value of x changed. Relative emission intensity is given relative to the emission intensity of $Ba_{0.95}MgAl_{10}O_{17}:Eu_{0.1}$ before firing that is assumed to be 100.

Solid lines in FIGS. 16A, 16B show the characteristics of the phosphor materials of different colors before firing, dashed lines show the characteristics of the phosphor materials after firing at 520° C. in air, and alternate dot and dash lines show the characteristics of the phosphor materials after firing at 460° C. in air following the firing at 520° C. While $Ba_{0.95-x}Sr_{0.95}MgAl_{10}O_{17}:Eu_x$ and $Ba_{1-x}MgAl_{10}O_{17}: Eu_x$ show similar properties, in a comparison of the emission intensity, composition without Sr showed about 1 to 2% higher emission intensity.

In comparison of the emission intensity of the materials after firing, substantially uniform values were obtained below x=0.1 after firing at 520° C., and the highest value was obtained around x=0.3 to 0.06 after another firing at 460° C.

Thus in the evaluation of emission intensity, the emission intensity tends to decrease with firing in the region above x=0.08, while the emission intensity tends to increase with firing in the region below x=0.08, with best characteristic being obtained around x=0.3 to 0.06 in such a case where heating of the phosphor material is repeated twice or more as in the fabrication of the plasma display panel This result may be explained by the tendency of $Eu^{2+}$ ions to be oxidized during firing that leads to a decrease in the emission intensity when Eu content is high.

When Eu content is relatively low, on the other hand, less $Eu^{2+}$ ions are oxidized during firing while the emission intensity increases due to the removal of moisture, improvement in the crystallinity, etc. during firing.

The tendency of heat resistance to increase as the Eu content becomes smaller is not limited to $Ba_{0.95-x}Sr_{0.05}MgAl_{10}O_{17}$: $Eu_x$, and similar tendency is shown also in $Ba_{(1-x-y)}Sr_yMg_aAl_bO_c$: $Eu_x$ regardless of the Sr content y. Best characteristic was obtained around x=0.3 to 0.06 when the emission intensity before firing was taken into consideration.

The phosphor material that is activated by $Eu^{2+}$ ions and has the composition in the form of $Ba_{(1-x-y)}Sr_yMg_aAl_bO_c$: $Eu_x$ is not limited to $Ba_{(1-x-y)}Sr_yMgAl_{10}O_{17}$: $Eu_x$, and similar effect was obtained also by using $Ba_{(1-x-y)}Sr_yMgAl_{14}O_{23}$: $Eu_x$ and the like.

Meanwhile the blue phosphor material used in the plasma display panel of the fifth embodiment has a problem in service life, and it is necessary to study the durability of the phosphor material to be used.

Figure 17:
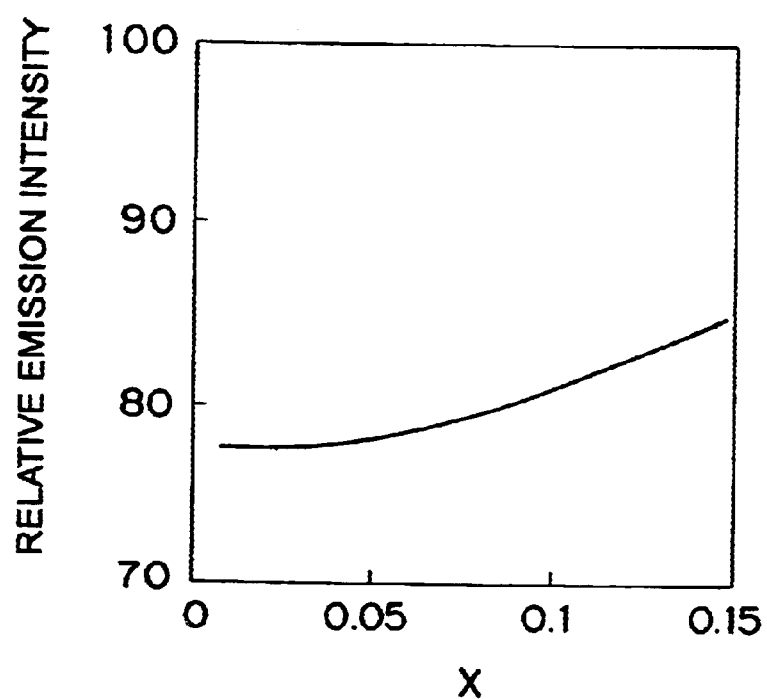
FIG. 17 is a graph showing the heat resistance characteristic of a phosphor material used in the plasma display panel of the prior art.

FIG. 17 shows the durability of the phosphor material $Ba_{1-x}MgAl_{10}O_{17}$: $Eu_x$ when the value of x is changed. Emission intensity after illuminating for 5000 hours relative to the emission intensity in the early stage of panel illumination that is assumed to be 100 is plotted along ordinate and the value of x is plotted along abscissa.

In the conventional blue phosphor material $Ba_{1-x}MgAl_{10}O_{17}$: $Eu_x$, durability increases as the value of x increases. This may be because ionic radius of the Eu ion is smaller than that of the Ba ion that is substituted thereby, and therefore bond distance between Eu and oxygen increases as the value of x increases, resulting in increasing bond energy.

In $Ba_{1-x}MgAl_{10}O_{17}$: $Eu_x$, however, x dependency of durability and x dependency of heat resistance are in trade-off relationship and therefore value of x is set in a range from 0.1 to 0.15.

Figure 18:
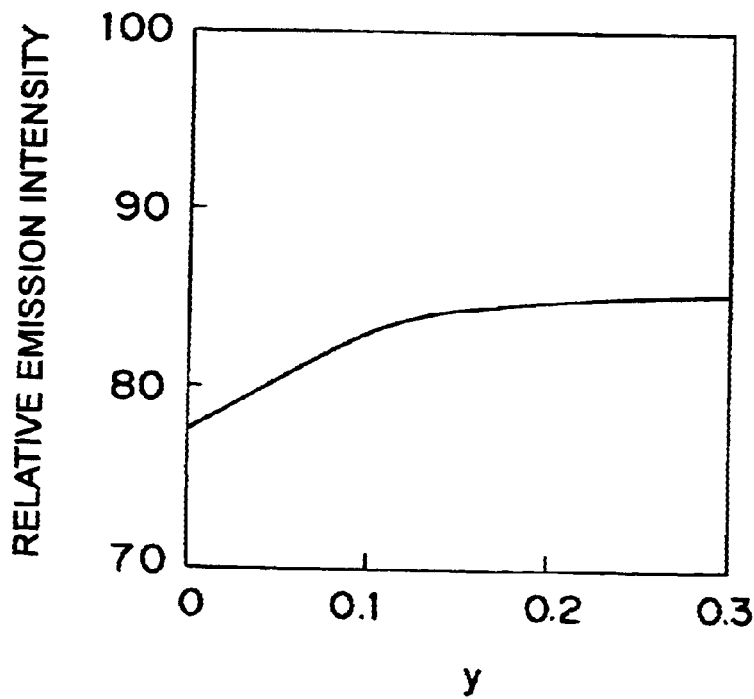
FIG. 18 is a graph showing the durability of the phosphor material used in the plasma display panel of the fifth embodiment according to the present invention.

FIG. 18 shows the durability of the phosphor material having composition of $Ba_{0.95-y}Sr_yMgAl_{10}O_{17}$: $Eu_{0.05}$ with different values of y. Emission intensity after illuminating for 5000 hours relative to the emission intensity in the early stage of panel illumination that is assumed to be 100 is plotted along ordinate and the value of y is plotted along abscissa. Given a constant content of Eu (x), durability increases as the value of Y increases. This may be because, similarly to the case of the Eu dependency, ionic radius of the Sr ion is smaller than that of the Ba ion that is substituted thereby, and therefore bond distance between Eu and oxygen increases as the value of y increases, resulting in increasing bond energy.

Figure 19:
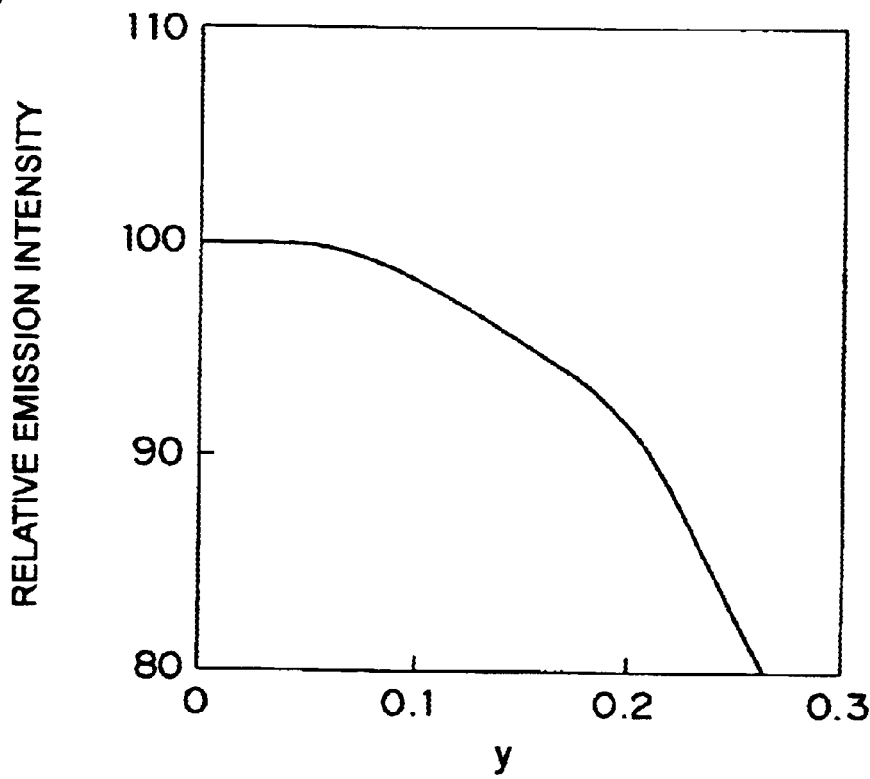
FIG. 19 is a graph showing the heat resistance characteristic of the phosphor material used in the plasma display panel of the fifth embodiment according to the present invention.

FIG. 19 shows y dependency of relative emission intensity of the phosphor material having composition of $Ba_{0.95-y}Sr_yMgAl_{10}O_{17}$:$Eu_{0.05}$ after firing at 520° C. and then firing again at 460° C. in air. The relative emission intensity is given in values relative to the emission intensity of a composition where y=0 $Ba_{0.95}MgAl_{10}O_{17}$:$Eu_{0.05}$) before firing. It can be seen that the emission intensity decreases as the Sr content increases, but the decrease is restrained to about 8% compared to the phosphor without Sr content in a region where value of y is within 0.2.

As shown by the results described above, the blue phosphor $Ba_{1-x}MgAl_{10}O_{17}$: $Eu_x$ of the prior art has such a problem that the durability decreases as the value of x is decreased for the purpose of improving the heat resistance, and a range of x from 0.1 to 0.15 has been used for this reason. According to the fifth embodiment, a phosphor material that is better in both heat resistance and durability than the conventional phosphor can be obtained by setting the Eu content x in a range from 0.08 to 0.01 and Sr content y in a range of 0.2 to 0.01 or lower in the phosphor material including Sr represented by $Ba_{(1-x-y)}Sr_yMgAl_{10}O_{17}$: $Eu_x$.

Heat resistance improves further when the value of x is in a range from 0.02 to 0.075 inclusive, and the best result is achieved within a range from 0.03 to 0.06 inclusive. Comprehensive evaluation of heat resistance and durability is better in a range of y from 0.02 to 0.15 inclusive, and best in a range of y from 0.02 to 0.1 inclusive.

Since x and y influence the heat resistance and durability, the value of x+y is preferably in a range from 0.05 to 0.2 inclusive and most preferably in a range from 0.09 to 0.15 inclusive when these effects are taken into consideration.

The phosphor materials of different colors used in the fifth embodiment are made as described below. The blue phosphor material is made by, first, mixing the predetermined quantities of the raw materials of barium carbonate ($BaCO_3$), magnesium carbonate ($MgCO_3$), aluminum oxide ($\alpha$-$Al_2O_3$), strontium carbonate ($SrCO_3$) and europium oxide ($Eu_2O_3$). The mixture is mixed with a proper amount of flux ($AlF_2$, $BaCl_2$) in a ball mill and the mixture is fired in a weakly reducing atmosphere ($H_2$, $N_2$) at a temperature in a range from 1400 to 1650° C. for a predetermined period of time (for example, 0.5 hours).

The red phosphor material is made by mixing the raw materials of yttrium hydroxide $Y_2(OH)_3$ and boric acid ($H_3BO_3$) in a proportion of 1: 1 by the numbers of atoms of Y and B. Then a predetermined amount of europium oxide ($Eu_2O_3$) is added to the mixture, which is mixed with a proper amount of flux in a ball mill and fired at a temperature in a range from 1200 to 1450° C. in air for a predetermined period of time (for example, one hour).

The green phosphor material is made by mixing the raw materials of zinc oxide (ZnO) and silicon oxide ($SiO_2$) in a proportion of 2: 1 by the numbers of atoms of Zn and Si. Then a predetermined amount of manganese oxide ($Mn_2O_3$) is added to the mixture and then mixed in a ball mill. The mixture is fired at a temperature in a range from 1200 to 1350° C. in air for a predetermined period of time (for example, 0.5 hours).

Now the fifth example according to the fifth embodiment will be described below.

TABLE 10

Panel constitution and characteristics (phosphor layer thickness: 20 μm, discharge gas pressure: 500 Torr)

| Panel No. | Blue phosphor material $Ba_{1-x-y}Sr_yMgAl_{10}O_{17}$: $Eu_x$ | | Initial luminance (cd/m²) | Luminance after 5000 hours of operation (cd/m²) |
|---|---|---|---|---|
| | x | y | | |
| 501 | 0.050 | 0.010 | 550 | 490 |
| 502 | 0.050 | 0.050 | 550 | 500 |

TABLE 10-continued

Panel constitution and characteristics (phosphor layer thickness: 20 μm, discharge gas pressure: 500 Torr)

| Panel No. | Blue phosphor material $Ba_{1-x-y}Sr_yMgAl_{10}O_{17}: Eu_x$ | | Initial luminance (cd/m$^2$) | Luminance after 5000 hours of operation (cd/m$^2$) |
|---|---|---|---|---|
| | x | y | | |
| 503 | 0.050 | 0.150 | 520 | 490 |
| 504 | 0.080 | 0.050 | 530 | 490 |
| 505 | 0.050 | 0 | 550 | 480 |
| 506 | 0.100 | 0 | 500 | 460 |

The plasma display panels Nos. 501 through 504 shown in Table 10 are the plasma display panels of this example produced according to the fifth embodiment, while changing the values of x and y in $Ba_{(1-x-y)}Sr_yMgAl_{10}O_{17}: Eu_x$ of the blue phosphor. The plasma display panels of samples Nos. 505 and 506 are the plasma display panels of Comparative Examples.

In the plasma display panels described above, firing after forming the phosphor layer was done at 520° C. and firing for laminating the panels was done at 460° C. Thickness of the phosphor layer was set to 20 μm and discharge gas pressure was set to 500 Torr. Luminance of the plasma display panels was measured under electric discharge conditions of 150V for discharge holding voltage and 30 kHz for frequency.

Luminance shown in the table gives the value of luminance when the signals of different colors were controlled to achieve color temperature of 9500 degrees for white display.

Evaluation of the display panel shows that the initial luminance depends on the values of x and y, and that the display panel shows higher luminance when x=0.05 and the value of y is smaller. Evaluation of luminance after 5000 hours of illuminating the display panel shows that durability becomes higher as the value of x+y is larger. Based on these results, highest effect of improving the luminance was obtained with the display panel of setting x=0.05 and y=0.05 (No.2).

Embodiment 6

Outline of the sixth embodiment of the present invention will be described below.

As described previously, the phosphor layer of the plasma display panel uses much of phosphor materials that have such composition as a metal element that constitutes the base material is partially substituted with an activating agent. In the blue phosphor material represented by $BaMgAl_{10}O_{17}: Eu^{2+}$, for example, Ba atoms are substituted by $Eu^{2+}$ ions.

The blue phosphor material of this type has been used in the prior art, as described previously, by setting the substitution ratio of Ba atoms by $Eu^{2+}$ ions to about 10 to 10 atomic %, supposedly for the following reason.

The phosphor layer is formed basically in such a process as the phosphor particles mixed with a binder is applied and then fired at about 500° C. thereby removing the binder.

In the phosphor material such as $BaMgAl_{10}O_{17}: Eu^{2+}$, while the initial luminance of the phosphor material becomes higher as the substitution ratio by $Eu^{2+}$ ions is increased, heat resistance becomes lower leading to more significant decreases in the luminance and emission intensity of the phosphor that accompany the firing. Thus the range of substitution ratio by $Eu^{2+}$ ions (10 to 10 atomic %) described above is thought to have been employed in the prior art in order to achieve satisfactory levels of luminance and emission intensity of the phosphor layer after firing.

In the practical process of producing the plasma display panel, the front panel and the back panel are sealed to each other after forming the phosphor layer, by firing the panels at a temperature normally around 400° C. This means that the phosphor of the phosphor layer is subjected to firing twice.

Because the firing in the sealing process is carried out at a temperature significantly lower than the firing for forming the phosphor layer (around 500° C.), it has been believed in the prior art that the firing for sealing does not affect the phosphor material significantly. The inventor of the present application found, however, that the second firing has substantial influence on the emission intensity of the phosphor layer.

It was found that, in case the phosphor material is subjected to two steps of firing, higher luminance and higher emission intensity of the phosphor layer can be obtained by setting the substitution ratio by $Eu^{2+}$ ions in the phosphor material to within 8 atomic %, lower than practiced in the prior art, and it is preferable to set the substitution ratio by $Eu^{2+}$ ions in a range from 1 to 6 atomic %.

The plasma display panel of the sixth embodiment of the present invention will be described below.

Figure 21:
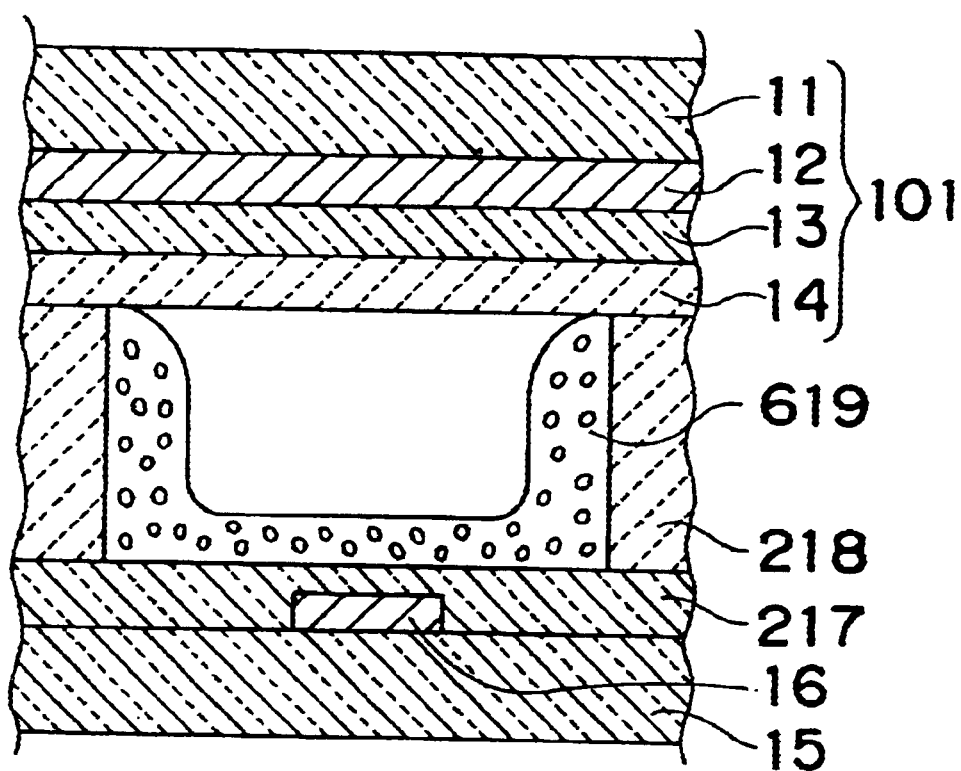
FIG. 21 is a schematic sectional view of a plasma display panel according to the sixth embodiment of the present invention.

FIG. 21 is a schematic sectional view of an AC discharge type plasma display panel according to the sixth embodiment. While FIG. 21 shows only one cell, the plasma display panel comprises a number of cells that emit red, green and blue light being arranged thereon.

The plasma display panel of the sixth embodiment has a constitution similar to that of the second embodiment, except that the phosphor layers 219 of the second embodiment are replaced by phosphor layers 619 that include phosphor materials having predetermined composition. The plasma display panel of the sixth embodiment, being constituted by using the phosphor layers 619 that include the phosphor materials of the predetermined composition which will be described in detail later, has various excellent features to be described later. The phosphor layers 619 are formed by continuously spouting the phosphor ink from the nozzles while scanning thereby applying the phosphor ink and firing the ink, similarly to the second embodiment.

(Phosphor Material and Phosphor Ink of the Sixth Embodiment and Application Thereof)

$YBO_3: Eu^{3+}$ and $(Y_xGd_{1-x})BO_3: Eu^{3+}$, for example, may be used as the red phosphor material.

$YBO_3: Eu^{3+}$ has such a structure that Y atoms that constitute the matrix of $YBO_3$ are substituted by $Eu^{3+}$, and $(Y_xGd_{1-x}) BO_3: Eu^{3+}$ has such a structure that Y atoms and Gd atoms that constitute the matrix of $(Y_xGd_{1-x})BO_3: EU^{3+}$ are substituted by $Eu^{3+}$.

$Zn_2SiO_4$: $Mn^{2+}$ and $BaAl_{12}O_{19}$: $Mn^{2+}$, for example, may be used as the green phosphor material.

$Zn_2SiO_4$: $Mn^{2+}$ has such a structure that Zn atoms that constitute the matrix of $Zn_2SiO_4$ are substituted by $Mn^{2+}$, and $BaAl_{12}O_{19}$: $Mn^{2+}$ has such a structure that Ba atoms that constitute the matrix of $BaAl_{12}O_{19}$ are substituted by $Mn^{2+}$.

These red and green phosphor materials that are commonly used may be used without modification for the plasma display panel of the sixth embodiment.

For the blue phosphor, on the other hand, the material represented by $BaMgAl_{10}O_{17}$: $Eu^{2+}$ is used. While a phosphor material wherein about 10 to 15% of the Ba atoms that constitute the matrix of $BaMgAl_{10}O_{17}$ are substituted by $Eu^{2+}$ has been used in the plasma display panels, this embodiment employs a phosphor material wherein substitution ratio of Ba atoms by $Eu^{2+}$ ions is set within 8 atomic %, lower than the prior art.

These red, green and blue phosphor material powders are used in the form of particles having average particle size in a range from 1 to 7 $\mu$m.

For the binder of the phosphor ink used in forming the phosphor layer, it is preferable to use ethylcellulose or acrylic resin (0.1 to 10% by weight of ink) and to use terpineol ($C_{10}H_{18}O$) as the solvent. Alternatively, high polymers such as PMMA and polyvinyl alcohol may be used as the binder, and organic solvent such as diethylene glycol methyl ether or water may also be used as the solvent.

After forming the phosphor layers of red, blue and green colors, the back glass substrate 15 is put in a furnace and fired at a temperature around 500° C. for 10 to 20 minutes.

The organic binder included in the phosphor ink or fat included in the sheet is burned out in this firing process, thereby forming the phosphor layer 619 comprising the phosphor particles bonded in the form of film.

While the phosphor is applied in the process described above by spouting the phosphor ink from the nozzles while scanning, the phosphor may also be applied by screen printing of phosphor paste.

Furthermore, the phosphor may also be applied by such a process as photosensitive resin sheets that contain phosphor materials of different colors are attached to the back glass substrate 15 on the side where the barrier ribs 18 are formed, whereon a pattern is formed by photolithography and development thereby removing unnecessary portions.

(Method of Producing Phosphor Material)

The phosphor materials of different colors described above can be made, for example, as follows.

Prodcution of $BaMgAl_{10}O_{17}$:$Eu^{2+}$ for blue phosphor

First, the raw materials of barium carbonate ($BaCO_3$), magnesium carbonate ($MgCO_3$), aluminum oxide ($\alpha$-$Al_2O_3$) and europium oxide ($Eu_2O_3$) are mixed so that molar ratio of the sum of Ba and Eu to Mf and Al is 1: 1: 10.

Molar ratio of Mg and Eu is determined according to the desired substitution ratio of Ba atoms by $Eu^{2+}$ ions.

To set the substitution ratio of Ba atoms by $Eu^{2+}$ ions to 8 atomic %, for example, molar ratio of Mg and Eu becomes 92: 8. Accordingly, molar ratio of barium carbonate, magnesium carbonate, aluminum oxide and europium oxide is set to 92: 4: 100: 500.

Then the mixture is mixed with a proper amount of flux ($AlF_2$, $BaCl_2$) in a ball mill and the mixture is fired in a weakly reducing atmosphere ($H_2$, $N_2$) at a temperature in a range from 1400 to 1650° C. for a predetermined period of time (for example, 0.5 hours), thereby to obtain the $BaMgAl_{10}O_{17}$:$Eu^{2+}$ particles of the predetermined substitution ratio by $Eu^{2+}$ ions.

Prodcution of $YBO_3$: $Eu^{3+}$ for red phosphor

The raw materials of yttrium hydroxide $Y_2(OH)_3$, boric acid ($H_3BO_3$) and europium oxide ($Eu_2O_3$) are mixed in molar ratio of 1: 1 for the sum of Y and Eu to B.

Molar ratio of Y to Eu is determined according to the desired substitution ratio of Y atoms by $Eu^{3+}$ ions.

Then the mixture is mixed with a proper amount of flux in a ball mill and the mixture is fired in air at a temperature in a range from 1200 to 1450° C. for a predetermined period of time (for example, 1 hour), thereby to obtain the $YBO_3$: $Eu^{3+}$ particles of the predetermined substitution ratio by $Eu^{3+}$ ions.

Prodcution of $Zn_2SiO_4$: $Mn^{2+}$ for green phosphor

The raw materials of zinc oxide (ZnO), silicon oxide ($SiO_2$) and manganese oxide ($Mn_2O_3$) are mixed in molar ratio of 2: 1 for the sum of Zn and Mn to Si. Molar ratio of Zn to Mn is determined according to the desired substitution ratio of Zn atoms by $Mn^{2+}$ ions.

Then the mixture is mixed in a ball mill and fired in air at a temperature in a range from 1200 to 1350° C. for a predetermined period of time (for example, 0.5 hours), thereby to obtain the $Zn_2SiO_4$: $Mn^{2+}$ particles of the predetermined substitution ratio by $Mn^{2+}$ ions.

The plasma display panel of the sixth example was produced according to the sixth embodiment.

In the sixth example, $Zn_2SiO_4$: $Mn^{2+}$ (content of Mn is 2.3 weight %) was used for the green phosphor material and $YBO_3$: $Eu^{3+}$ (substitution ratio by $Eu^{2+}$ ions 0.1) was used for the red phosphor.

In the sixth example, $BaMgAl_{10}O_{17}$: $Eu^{2+}$ was used for the blue phosphor, where substitution ratio of Ba atoms by $Eu^{2+}$ ions was set to 0.5, 2.0, 5.0, and 8.0 atomic % for Nos. 601 through 604, respectively, as shown in Table 11.

In Table 11, composition of the blue phosphor is given as $Ba_{1-x}MgAl_{10}O_{17}$: $Eu_x$ which represents the same phosphor that is represented by $BaMgAl_{10}O_{17}$: $Eu^{2+}$, while the substitution ratio of Ba atoms in the base material by $Eu^{2+}$ ions is represented in the formula by x.

TABLE 11

Panel constitution and characteristics (phosphor layer thickness: 20 $\mu$m, discharge gas pressure: 500 Torr)

| Panel No. | Blue phosphor material $Ba_{1-x}MgAl_{10}O_{17}$: $Eu_x$ x | Color temperature non-adjusted luminance (cd/m$^2$) | Color temperature-adjusted luminance (cd/m$^2$) |
|---|---|---|---|
| 601 | 0.005 | 460 | 400 |
| 602 | 0.020 | 500 | 450 |
| 603 | 0.050 | 520 | 460 |
| 604 | 0.080 | 540 | 425 |
| 605 | 0.100 | 550 | 350 |

Average particle size was set to about 3 μm for the phosphor material powders of all colors. Firing for the formation of the phosphor layer was carried out at 520° C. for 10 minutes and firing for the lamination of the panels was carried out at 460° C. for 10 minutes. Thickness of the phosphor layer was set to 20 μm and discharge gas pressure was set to 500 Torr.

The panel No. 605 shown in Table 11 is for the plasma display panel of Comparative Example, that was produced similarly to the example except that substitution ratio of Ba atoms by $Eu^{2+}$ ions was set to 10 atomic % (x=0.100).

Color temperature non-adjusted luminance and color temperature-adjusted luminance were measured on the plasma display panels of this example and Comparative Example produced as described above.

The color temperature non-adjusted luminance refers to the luminance of white display with the same signals given for all colors (namely having the discharge spaces of the three colors emit equivalent ultraviolet rays), and color temperature-adjusted luminance refers to the luminance when the signals of different colors are adjusted to achieve color temperature of 9500 degrees in white display.

Luminance was measured under electric discharge conditions of 150 V for discharge holding voltage and 30 kHz for frequency. The measurements results are shown in Table 11.

The results of measurements shown in Table 11 show that No. 605 (x=0.100) demonstrates higher color temperature non-adjusted luminance than Nos. 601 through 604 (x=0.005 to 0.080), while higher values of color temperature-adjusted luminance are obtained with Nos.601 through 604 (x=0.005 to 0.080) than No.605 (x=0.100).

This means that higher luminance of the plasma display panel than that achieved in the prior art can be obtained by setting the value of x for the blue phosphor to 0.08 or less, that is smaller than in the prior art.

No. 602 (x=0.020) and No.603 (x=0.050) show particularly high values of color temperature-adjusted luminance.

The color temperature-adjusted luminance is measured while giving consideration to the fact that improving the picture quality of the plasma display panel requires it to take white balance. Higher luminance can be achieved while maintaining good picture quality, as the color temperature-adjusted luminance is increased, It is because the emission intensity of the blue phosphor was increased that high luminance was obtained by setting the value of x for the blue phosphor to 0.08 or less.

To be more specific, it is necessary to achieve a color temperature of 9000 degrees or higher with white balance in order to obtain good picture quality on the plasma display panel. However, since the blue phosphor material has, in general, lower luminance than the phosphor materials of other the colors, emitting the light of all colors with the same signal results in a color temperature of around 6000 degrees and good picture quality cannot be obtained.

While achieving a color temperature of 9000 degrees or higher requires it to make the luminance of blue light lower than those of green and red light, the higher the emission intensity of the blue phosphor, the less decrease in the luminance of red and green light is required, thereby making it possible to achieve higher color temperature-adjusted luminance.

No. 601 (x=0.005) shows lower color temperature-adjusted luminance than No. 602 (x=0.020), which is supposedly because of insufficient content of $Eu^{2+}$ ions in the blue phosphor material that leads to lower probability of ultraviolet excitation.

Then the relationship between substitution ratio by $Eu^{2+}$ ions and heat resistance in the blue phosphor of $BaMgAl_{10}O_{17}$: $Eu^{2+}$ was investigated as described below.

In conjunction with the preparation of $BaMgAl_{10}O_{17}$: $Eu^{2+}$ in the process described above, materials represented by $Ba_{1-x}MgAl_{10}O_{17}$: $Eu_x$ with various values of x (substitution ratio by $Eu^{2+}$ ions) were made by changing the quantity of europium oxide ($Eu_2O_3$) to be added.

Phosphor pastes were made by using the phosphor materials made as described above and applied to substrates that were then fired at 520° C. in air for 10 minutes thereby forming phosphor layers. The phosphor layers thus formed were further fired at 460° C. in air for 10 minutes.

Luminance and emission intensity of these phosphor layers were measured by irradiating the phosphor layer with ultraviolet rays emitted by a UV lamp before being fired at 520° C. (pre-firing), after being fired at 520° C. (after first firing) and after being fired at 460° C. (after second firing).

Luminance was measured with a luminance meter. Intensity was determined by measuring the emission spectrum from the phosphor layer with a spectrophotometer, calculating y value of chromaticity from the measurement and calculating the emission intensity from the y value of chromaticity and the measured luminance (luminance/y value of chromaticity).

Figure 22A:
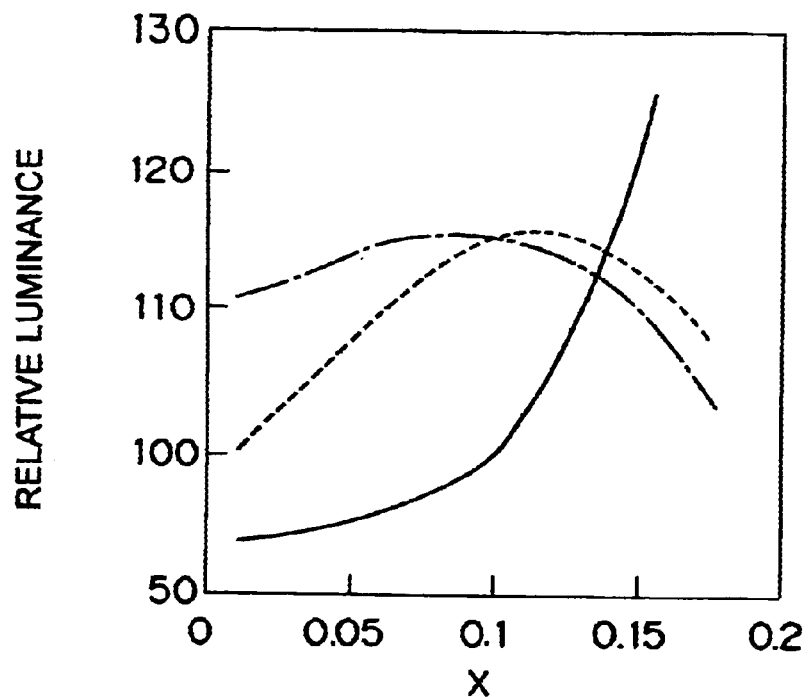
FIG. 22A is a graph showing relative luminance versus composition of phosphor material used in the plasma display panel of the sixth embodiment according to the present invention.
Figure 22B:
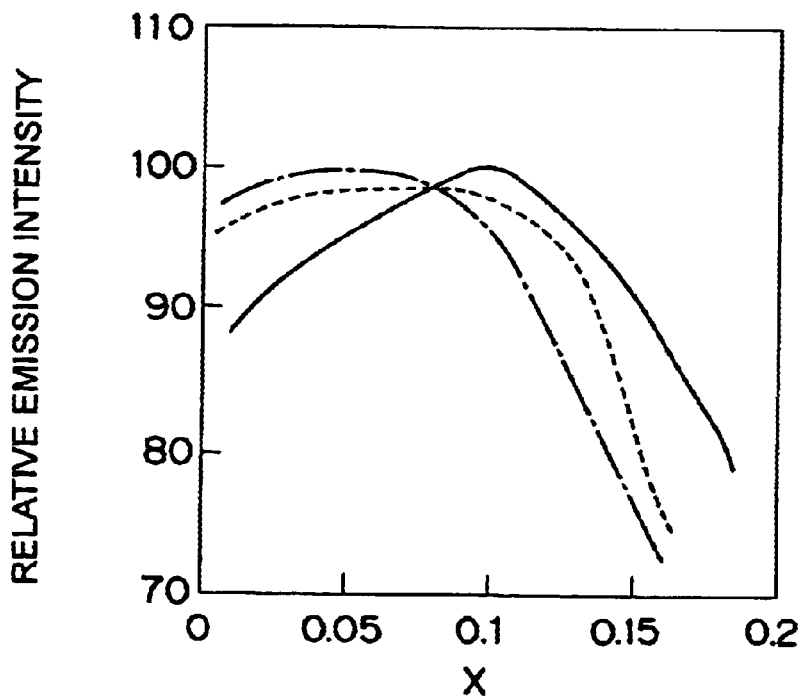
FIG. 22B is a graph showing emission intensity versus composition of phosphor material used in the plasma display panel of the sixth embodiment according to the present invention.
Figure 23:
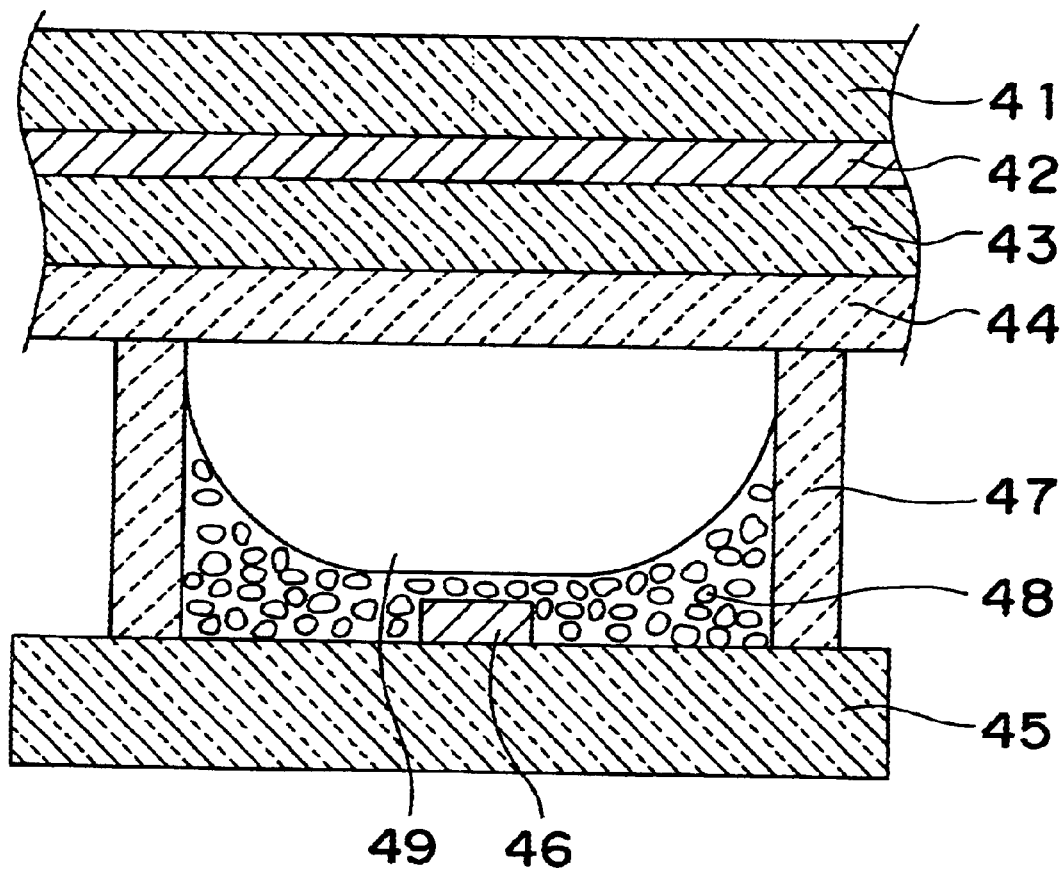
FIG. 23 is a schematic sectional view of an AC discharge type plasma display panel of the prior art.

FIGS. 22A, 22B show the results of measurement described above, with FIG. 22A showing the relation between the value of x and relative luminance and FIG. 22B showing the relation between the value of x and relative emission intensity.

In FIGS. 22A, 22B, solid lines represent the characteristic before firing, dashed lines represent the characteristic after the first firing, and alternate dot and dash lines represent the characteristic after the second firing. Relative luminance and relative emission intensity in FIGS. 22A, 22B are given in values relative to the value measured on a phosphor of x=0.1 before firing that is assumed to be 100.

From the graphs shown in FIGS. 22A, 22B, the following findings can be drawn.

1: Before firing, luminance increases as the value of x increases, while emission intensity has a peak around x=0.1.
2: After the first firing, luminance reaches a peak at a point where the value of x is a little larger than 0.1. Emission intensity remains substantially constant in the region where x is below 0.1, but decreases as the value of x increases beyond 0.1.

Thus when judging according to the measurements after the first firing, it may be concluded that setting the value of x in a range from 0.1 to 0.15 as in the prior art is appropriate for making phosphor layers of high performance.

However, after the second firing, luminance reaches a peak at a point where the value of x is a little larger than 0.1 and maintains high level even when the value of x decreases significantly. Emission intensity has a peak at a point around x=0.03 to 0.06 and decreases significantly as x increases over 0.08. These results show that the value of x is preferably not greater than 0.08, particularly in a range from 0.01 to 0.06, and more preferably in a range from 0.03 to 0.06, for a phosphor material that is fired twice as in the plasma display panel.

Particularly worth notice is the fact that the firing process has opposite effects on the emission intensity depending on whether the value of x is below 0.08 or greater than 0.08. That is, in the range of x greater than 0.08, emission intensity after firing is lower than that before firing. In the range of x below 0.08, on the contrary, emission intensity becomes higher after firing than that before firing, and both the luminance and the emission intensity become higher after the second firing than after the first firing.

The result described above may be explained as follows. When the phosphor material is fired, $Eu^{2+}$ ions are oxidized, while impurities such as moisture are removed so that the crystallinity improves, which contribute to the increase in emission intensity. In the region of x greater than 0.08, the former effect is predominant but the latter effect becomes predominant in the region of x below 0.08.

Although the process that involves firing at 520° C. followed by firing at 460° C. is described in this example, similar effects can be achieved also by firing at 500° C. followed firing at 350° C., or by firing twice at similar temperatures (for example, 460° C.)

FIGS. 22A, 22B show the results of measurements carried out up to the point after two firing steps; firing at 520° C. followed by firing at 460° C. However, similar effects were also obtained from measurement made after third firing at 460° C. following the two firing steps.

This means that the behaviors of luminance and emission intensity represented by the alternate dot and dash lines in FIGS. 22A, 22B that were observed after the two firing steps remain without significant changes after being fired further.

In the sixth embodiment, the phosphor represented by $BaMgAl_{10}O_{17}$: $Eu^{2+}$ is described as an example of blue phosphor that contains $Eu^{2+}$ ions as the activation agent. But the present invention is not limited to this configuration, and can also be applied to a case where $BaMgAl_{14}O_{23}$: $Eu^{2+}$ or $Ba_aSr_{1-a}MgAl_{10}O_{17}$: $Eu^{2+}$ is used as the blue phosphor.

Specifically, similar effects can be achieved also by setting the substitution ratio by $Eu^{2+}$ ions in the case of $BaMgAl_{14}O_{23}$: $Eu^{2+}$ and substitution ratio of Ba atoms and Sr atoms by $Eu^{2+}$ ions in the case of $Ba_aSr_{1-a}MgAl_{10}O_{17}$: $Eu^{2+}$ to 8 atomic % or lower (preferably in a range from 1 to 6 atomic %)

The embodiments described above take the AC discharge type plasma display panel as an example, but the foregoing description applies also to a DC type plasma display panel.

Moreover, application of the blue phosphor material described in the sixth embodiment is not limited to the plasma display panel, and is applicable also to a fluorescent lamp, for example, with similar effects.

INDUSTRIAL APPLICABILITY

As described above, the present invention provides the phosphor material and the phosphor material powder having high emission intensity and high luminance, of which application to the plasma display panel makes it possible to provide high luminance and high definition plasma display panel.

What is claimed is:

1. A phosphor material for a plasma display panel, wherein the phosphor material has a composition represented by the formula $Ba_{(1-x-y)}Sr_yMg_aAl_bO_c$: $Eu_x$,
   wherein the value of y is in a range from 0.01 to 0.2 inclusive,
   wherein the value of x represents a substitution ratio by $Eu^{2+}$, and
   wherein the value of a is 1, the value of b is 10 and the value of c is 17, or the value of a is 1, the value of b is 14 and the value of c is 23.

2. A phosphor material for a plasma display panel according to claim 1, wherein the value of y is in a range from 0.02 to 0.15 inclusive.

3. A phosphor material for a plasma display panel according to claim 1, wherein the value of y is in a range from 0.02 to 0.1 inclusive.

4. A phosphor material for a plasma display panel according to claim 1, wherein the value of x is in a range from 0.01 to 0.08 inclusive.

5. A phosphor material for a plasma display panel according to claim 1, wherein the value of x is in a range from 0.02 to 0.075 inclusive.

6. A phosphor material for a plasma display panel according to claim 1, wherein the value of x is in a range from 0.03 to 0.06 inclusive.

7. A phosphor material for a plasma display panel according to claim 1, wherein the value of x+y is in a range from 0.05 to 0.2 inclusive.

8. A phosphor material for a plasma display panel according to claim 1, wherein the value of x+y is in a range from 0.09 to 0.15 inclusive.

9. A phosphor material for a plasma display panel according to claim 1, which emits visible light when excited by ultraviolet rays.

10. A phosphor material for a plasma display panel according to claim 1, which emits visible light when excited by ultraviolet rays of wavelength 200 nm or less.

11. A plasma display panel, comprising a front panel, a back panel, and a plurality of discharge spaces formed between the front panel and the back panel, at least one of the discharge spaces having a phosphor layer that includes blue phosphor particles,
    wherein the phosphor layer that contains the blue phosphor particles includes the phosphor material according to any one of claims 1–10.

12. A method for producing the plasma display panel according to claim 11,
    wherein the phosphor layer that contains the blue phosphor particles is produced through at least one firing process at a temperature of 400° C. or higher.

13. A method for producing the plasma display panel according to claim 11,
    wherein the phosphor layer that contains the blue phosphor particles is produced through at least one firing process at a temperature of 500° C. or higher.

14. A method for producing the plasma display panel according to claim 11,
    wherein the phosphor layer that contains the blue phosphor particles is produced through at least two firing processes.

15. A method for producing the plasma display panel according to claim 14,
    wherein a firing temperature for the phosphor layer that contains the blue phosphor particles is lower in the second firing process than in the first firing process.

* * * * *